(12) United States Patent
Kumar et al.

(10) Patent No.: US 8,545,015 B2
(45) Date of Patent: Oct. 1, 2013

(54) POLARIZING PHOTOCHROMIC ARTICLES

(75) Inventors: Anil Kumar, Murrysville, PA (US);
Rachael L. Yoest, Gibsonia, PA (US);
Chenguang Li, Monroeville, PA (US);
Delwin S. Jackson, Clearwater, FL (US); Henry Nguyen, Largo, FL (US)

(73) Assignee: Transitions Optical, Inc., Pinellas Park, FL (US)

( * ) Notice: Subject to any disclaimer, the term of this patent is extended or adjusted under 35 U.S.C. 154(b) by 136 days.

(21) Appl. No.: 13/296,867

(22) Filed: Nov. 15, 2011

(65) Prior Publication Data

US 2012/0120473 A1 May 17, 2012

Related U.S. Application Data

(60) Continuation-in-part of application No. 13/153,748, filed on Jun. 6, 2011, which is a continuation-in-part of application No. 11/590,055, filed on Oct. 31, 2006, now Pat. No. 7,978,391, which is a division of application No. 10/846,650, filed on May 17, 2004, now Pat. No. 7,256,921.

(60) Provisional application No. 60/484,100, filed on Jul. 1, 2003.

(51) Int. Cl.
*G02C 3/00* (2006.01)
*G02B 5/30* (2006.01)
*G02B 5/23* (2006.01)

(52) U.S. Cl.
USPC ............. 351/159.61; 359/487.01; 359/492.01

(58) Field of Classification Search
CPC ............ G02B 5/23; G02B 5/30; G02B 1/104; G02C 7/12; G02C 7/102
USPC ................... 252/582, 585, 586; 351/159.16; 359/241, 487.01, 492.01
See application file for complete search history.

(56) References Cited

U.S. PATENT DOCUMENTS

| | | |
|---|---|---|
| 2,319,826 A | 5/1943 | Pellett |
| 2,334,446 A | 11/1943 | Serrell |
| 2,475,921 A | 7/1949 | Smith |
| 2,481,830 A | 9/1949 | Dreyer |
| 2,544,659 A | 3/1951 | Dreyer |
| 3,276,316 A | 10/1966 | Makas |
| 3,361,706 A | 1/1968 | Meriwether et al. |
| 3,653,863 A | 4/1972 | Araujo et al. |
| 4,039,254 A | 8/1977 | Harsch |
| 4,043,637 A | 8/1977 | Hovey |

(Continued)

FOREIGN PATENT DOCUMENTS

WO    WO 2012170066 A1 * 12/2012

*Primary Examiner* — David N Spector
(74) *Attorney, Agent, or Firm* — Deborah M. Altman

(57) ABSTRACT

Provided are photochromic articles including a substrate, a primer layer that includes a first photochromic compound, and a photochromic-dichroic layer over the primer layer that includes a photochromic-dichroic compound. The first photochromic compound and the photochromic-dichroic compound each are selected such that the photochromic-dichroic compound has an unactivated state terminal minimum absorbance wavelength that is less than or equal to the unactivated state terminal minimum absorbance of the underlying first photochromic compound. The present invention also relates to such photochromic articles that further include a topcoat layer over the photochromic-dichroic layer, the topcoat layer including a second photochromic compound that has an unactivated state terminal minimum absorbance wavelength that is less than the unactivated state terminal minimum absorbance wavelength of the underlying photochromic-dichroic compound.

33 Claims, 2 Drawing Sheets

(56) References Cited

U.S. PATENT DOCUMENTS

| | | |
|---|---|---|
| 4,049,338 A | 9/1977 | Slocum |
| 4,166,043 A | 8/1979 | Uhlmann et al. |
| 4,190,330 A | 2/1980 | Berreman |
| 4,367,170 A | 1/1983 | Uhlmann et al. |
| 4,549,894 A | 10/1985 | Araujo et al. |
| 4,556,605 A | 12/1985 | Mogami et al. |
| 4,637,896 A | 1/1987 | Shannon |
| 4,648,925 A | 3/1987 | Goepfert et al. |
| 4,683,153 A | 7/1987 | Goepfert et al. |
| 4,728,173 A | 3/1988 | Toth |
| 4,731,264 A | 3/1988 | Lin et al. |
| 4,756,605 A | 7/1988 | Okada et al. |
| 4,756,973 A | 7/1988 | Sakagami et al. |
| 4,810,433 A | 3/1989 | Takayanagi et al. |
| 4,838,673 A | 6/1989 | Richards et al. |
| 4,863,763 A | 9/1989 | Takeda et al. |
| 4,865,668 A | 9/1989 | Goepfert et al. |
| 4,873,026 A | 10/1989 | Behre et al. |
| 4,873,029 A | 10/1989 | Blum |
| 4,931,220 A | 6/1990 | Haynes et al. |
| 4,974,941 A | 12/1990 | Gibbons et al. |
| 4,977,028 A | 12/1990 | Goepfert et al. |
| 5,024,850 A | 6/1991 | Broer et al. |
| 5,067,795 A | 11/1991 | Senatore |
| 5,073,294 A | 12/1991 | Shannon et al. |
| 5,130,353 A | 7/1992 | Fischer et al. |
| 5,134,191 A | 7/1992 | Takarada et al. |
| 5,155,607 A | 10/1992 | Inoue et al. |
| 5,180,470 A | 1/1993 | Smith et al. |
| 5,185,390 A | 2/1993 | Fischer et al. |
| 5,189,448 A | 2/1993 | Yaguchi |
| 5,202,053 A | 4/1993 | Shannon |
| 5,231,156 A | 7/1993 | Lin |
| 5,247,377 A | 9/1993 | Omeis et al. |
| 5,462,806 A | 10/1995 | Konishi et al. |
| 5,464,669 A | 11/1995 | Kang et al. |
| 5,602,661 A | 2/1997 | Schadt et al. |
| 5,608,567 A | 3/1997 | Grupp |
| 5,641,846 A | 6/1997 | Bieringer et al. |
| 5,644,416 A | 7/1997 | Morikawa et al. |
| 5,645,767 A | 7/1997 | Van Gemert |
| 5,658,501 A | 8/1997 | Kumar et al. |
| 5,698,141 A | 12/1997 | Kumar |
| 5,723,072 A | 3/1998 | Kumar |
| 5,746,949 A | 5/1998 | Shen et al. |
| 5,846,452 A | 12/1998 | Gibbons et al. |
| 5,903,330 A | 5/1999 | Funfschilling et al. |
| 5,943,104 A | 8/1999 | Moddel et al. |
| 5,952,515 A | 9/1999 | Melzig et al. |
| 5,962,617 A | 10/1999 | Slagel |
| 6,022,497 A | 2/2000 | Kumar |
| 6,025,026 A | 2/2000 | Smith et al. |
| 6,036,890 A | 3/2000 | Melzig et al. |
| 6,049,428 A | 4/2000 | Khan et al. |
| 6,060,001 A | 5/2000 | Welch et al. |
| 6,080,338 A | 6/2000 | Kumar |
| 6,113,814 A | 9/2000 | Gemert et al. |
| 6,136,968 A | 10/2000 | Chamontin et al. |
| 6,150,430 A | 11/2000 | Walters et al. |
| 6,153,126 A | 11/2000 | Kumar |
| 6,160,597 A | 12/2000 | Schadt et al. |
| 6,175,450 B1 | 1/2001 | Andreani et al. |
| 6,187,444 B1 | 2/2001 | Bowles, III et al. |
| 6,239,778 B1 | 5/2001 | Palffy-Muhoray et al. |
| 6,245,399 B1 | 6/2001 | Sahouani et al. |
| 6,268,055 B1 | 7/2001 | Walters et al. |
| 6,281,366 B1 | 8/2001 | Frigoli et al. |
| 6,284,418 B1 | 9/2001 | Trantolo |
| 6,296,785 B1 | 10/2001 | Nelson et al. |
| 6,312,811 B1 | 11/2001 | Frigoli et al. |
| 6,334,681 B1 | 1/2002 | Perrott et al. |
| 6,338,808 B1 | 1/2002 | Kawata et al. |
| 6,348,604 B1 | 2/2002 | Nelson et al. |
| 6,353,102 B1 | 3/2002 | Kumar |
| 6,369,869 B2 | 4/2002 | Schadt et al. |
| 6,432,544 B1 | 8/2002 | Stewart et al. |
| 6,433,043 B1 | 8/2002 | Misura et al. |
| 6,436,525 B1 | 8/2002 | Welch et al. |
| 6,474,695 B1 | 11/2002 | Schneider et al. |
| 6,506,488 B1 | 1/2003 | Stewart et al. |
| 6,531,076 B2 | 3/2003 | Crano et al. |
| 6,555,028 B2 | 4/2003 | Walters et al. |
| 6,597,422 B1 | 7/2003 | Funfschilling et al. |
| 6,602,603 B2 | 8/2003 | Welch et al. |
| 6,613,433 B2 | 9/2003 | Yamamoto et al. |
| 6,630,597 B1 | 10/2003 | Lin et al. |
| 6,641,874 B2 | 11/2003 | Kuntz et al. |
| 6,690,495 B1 | 2/2004 | Kosa et al. |
| 6,705,569 B1 | 3/2004 | Sanders et al. |
| 6,717,644 B2 | 4/2004 | Schadt et al. |
| 6,761,452 B2 | 7/2004 | Moravec et al. |
| 6,844,686 B1 | 1/2005 | Schneck et al. |
| 6,874,888 B1 | 4/2005 | Dudai |
| 7,256,921 B2 | 8/2007 | Kumar et al. |
| 7,342,112 B2 | 3/2008 | Kumar et al. |
| 7,349,138 B2 | 3/2008 | Kumar et al. |
| 7,394,585 B2 | 7/2008 | Kumar et al. |
| 7,410,691 B2 | 8/2008 | Blackburn et al. |
| 7,452,611 B2 | 11/2008 | Blackburn et al. |
| 7,465,414 B2 | 12/2008 | Knox et al. |
| 7,465,415 B2 | 12/2008 | Wang et al. |
| 7,505,189 B2 | 3/2009 | Kumar et al. |
| 7,910,019 B2 | 3/2011 | He et al. |
| 2002/0039627 A1 | 4/2002 | Ichihashi et al. |
| 2002/0090516 A1 | 7/2002 | Loshak et al. |
| 2002/0167639 A1 | 11/2002 | Coates et al. |
| 2002/0180916 A1 | 12/2002 | Schadt et al. |
| 2003/0008958 A1 | 1/2003 | Momoda et al. |
| 2003/0045612 A1 | 3/2003 | Misura et al. |
| 2003/0189684 A1 | 10/2003 | Kuntz et al. |
| 2004/0046927 A1 | 3/2004 | Montgomery |
| 2004/0125337 A1 | 7/2004 | Boulineau et al. |
| 2004/0158028 A1 | 8/2004 | Buhler |
| 2004/0223221 A1 | 11/2004 | Sugimura et al. |
| 2005/0003107 A1 | 1/2005 | Kumar et al. |
| 2005/0004361 A1 | 1/2005 | Kumar et al. |
| 2005/0012998 A1 | 1/2005 | Kumar et al. |
| 2005/0146680 A1 | 7/2005 | Muisener et al. |
| 2007/0275234 A1 | 11/2007 | Lim et al. |
| 2011/0042629 A1 | 2/2011 | Chopra et al. |
| 2011/0049445 A1 | 3/2011 | Chopra et al. |
| 2011/0129678 A1 | 6/2011 | He et al. |
| 2011/0135850 A1 | 6/2011 | Saha et al. |
| 2011/0143141 A1 | 6/2011 | He et al. |

* cited by examiner

POLARIZING PHOTOCHROMIC ARTICLES

CROSS REFERENCE TO RELATED APPLICATIONS

This application is a continuation-in-part of U.S. patent application Ser. No. 13/153,748 filed on Jun. 6, 2011, which is a continuation-in-part of U.S. patent application Ser. No. 11/590,055 filed Oct. 31, 2006, which is a divisional of U.S. patent application Ser. No. 10/846,650, filed May 17, 2004 (issued as U.S. Pat. No. 7,256,921 B2), which claims and is entitled to the benefit of priority from U.S. Provisional Patent Application No. 60/484,100, filed Jul. 1, 2003, each of which is incorporated herein by reference in its entirety.

FIELD OF THE INVENTION

The present invention relates to photochromic articles that include a substrate, a primer layer that includes a first photochromic compound, and a photochromic-dichroic layer over the primer layer that includes a photochromic-dichroic compound, in which the first photochromic compound and the photochromic-dichroic compound are each selected such that the photochromic-dichroic compound has an unactivated state terminal minimum absorbance wavelength that is less than or equal to the unactivated state terminal minimum absorbance wavelength of the underlying first photochromic compound.

BACKGROUND OF THE INVENTION

Conventional linearly polarizing elements, such as linearly polarizing lenses for sunglasses and linearly polarizing filters, are typically formed from stretched polymer sheets containing a dichroic material, such as a dichroic dye. Consequently, conventional linearly polarizing elements are static elements having a single, linearly polarizing state. Accordingly, when a conventional linearly polarizing element is exposed to either randomly polarized radiation or reflected radiation of the appropriate wavelength, some percentage of the radiation transmitted through the element will be linearly polarized.

In addition, conventional linearly polarizing elements are typically tinted. Typically, conventional linearly polarizing elements contain a coloring agent and have an absorption spectrum that does not vary in response to actinic radiation. The color of the conventional linearly polarizing element will depend upon the coloring agent used to form the element, and most commonly, is a neutral color (for example, brown or gray). Thus, while conventional linearly polarizing elements are useful in reducing reflected light glare, because of their tint, they are typically not well suited for use under low-light conditions. Further, because conventional linearly polarizing elements have only a single, tinted linearly polarizing state, they are limited in their ability to store or display information.

Conventional linearly polarizing elements are typically formed using sheets of stretched polymer films containing a dichroic material. Correspondingly, while dichroic materials are capable of preferentially absorbing one of two orthogonal plane polarized components of transmitted radiation, if the molecules of the dichroic material are not suitably positioned or arranged, no net linear polarization of transmitted radiation will be achieved. Without intending to be bound by any theory it is believed that due to the random positioning of the molecules of the dichroic material, selective absorption by the individual molecules will cancel each other such that no net or overall linear polarizing effect is achieved. As such, it is typically necessary to position or arrange the molecules of the dichroic material by alignment with another material so as to achieve a net linear polarization.

A common method of aligning the molecules of a dichroic dye involves heating a sheet or layer of polyvinyl alcohol ("PVA") to soften the PVA and then stretching the sheet to orient the PVA polymer chains. Thereafter, the dichroic dye is impregnated into the stretched sheet, and the impregnated dye molecules adopt the orientation of the polymer chains. Resultantly, at least some of the dye molecules become aligned, such that the long axis of each aligned dye molecule is generally parallel to the oriented polymer chains. Alternatively, the dichroic dye can be first impregnated into the PVA sheet, and thereafter the sheet can be heated and stretched as described above to orient the PVA polymer chains and associated dye. In this manner, the molecules of the dichroic dye can be suitably positioned or arranged amongst the oriented polymer chains of the PVA sheet, and a net linear polarization can be correspondingly achieved. As a result, the PVA sheet can be made to linearly polarize transmitted radiation, and correspondingly a linearly polarizing filter can thus be formed.

In contrast to the dichroic elements discussed above, conventional photochromic elements, such as photochromic lenses that are formed using conventional thermally reversible photochromic materials are generally capable of converting from a first state, for example a "clear state," to a second state, for example a "colored state," in response to actinic radiation, and reverting back to the first state in response to thermal energy. Thus, conventional photochromic elements are generally well suited for use in both low-light and bright conditions. Conventional photochromic elements, however, that do not include linearly polarizing filters are generally not capable of linearly polarizing radiation. The absorption ratio of conventional photochromic elements, in either state, is generally less than two. Therefore, conventional photochromic elements are not capable of reducing reflected light glare to the same extent as conventional linearly polarizing elements. In addition, conventional photochromic elements have a limited ability to store or display information.

Photochromic-dichroic compounds and materials have been developed that provide both photochromic properties and dichroic properties, if properly and at least sufficiently aligned. When in a colored or darkened state, such as when exposed to actinic light, photochromic-dichroic compounds, however, typically have a larger percent transmittance than non-polarizing or conventional photochromic compounds at equivalent concentrations and sample thickness. While not intending to be bound by any theory, and based on the evidence at hand, it is believed that the increased percent transmittance of photochromic-dichroic materials in the darkened or colored state is due to the percent transmittance being an average of the two orthogonal plane polarized components of the polarized radiation. A photochromic-dichroic material will more strongly absorb one of the two orthogonal plane polarized components of the incident random radiation, resulting in one of the planes of transmitted polarized light (passing through and out of the sample) having a greater percent transmittance than the other orthogonal plane polarized component. The average of the two orthogonal plane polarized components typically results in an average percent transmittance of greater magnitude. In general, as the linearly polarizing efficiency, which can be quantified in terms of absorption ratio, of photochromic-dichroic compounds increases, the percent transmittance associated therewith also increases.

It would be desirable to develop new polarizing photochromic articles that include photochromic-dichroic compounds, and which provide a combination of linear polarizing properties, and reduced percent transmittance when in a colored or darkened state, such as when exposed to actinic light.

SUMMARY OF THE INVENTION

In accordance with the present invention, there is provided a photochromic article comprising a substrate and at least two layers thereof including, a primer layer positioned over the substrate, and a photochromic-dichroic layer positioned over the primer layer.

The primer layer comprises a first photochromic compound having a first unactivated state absorbance of greater than 0 at all wavelengths from 340 nm to 380 nm, and a first unactivated state terminal minimum absorbance wavelength of greater than 380 nm.

The photochromic-dichroic layer comprises a photochromic-dichroic compound having a second unactivated state absorbance of greater than 0 over at least a portion of wavelengths from 340 nm to 380 nm, and a second unactivated state terminal minimum absorbance wavelength of greater than 340 nm.

The second unactivated state terminal minimum absorbance wavelength (of the photochromic-dichroic compound) is less than or equal to the first unactivated state terminal minimum absorbance wavelength (of the underlying first photochromic compound).

In accordance with a further embodiment of the present invention, there is provided a photochromic article that includes, a substrate and at least three layers thereover including, a primer layer that is positioned over the substrate, a photochromic-dichroic layer that is positioned over the primer layer, and a topcoat layer that is positioned over the photochromic-dichroic layer.

The primer layer includes a first photochromic compound having a first unactivated state absorbance of greater than 0 at all wavelengths from 340 nm to 380 nm, and a first unactivated state terminal minimum absorbance wavelength of greater than 380 nm.

The photochromic-dichroic layer comprises a photochromic-dichroic compound having a second unactivated state absorbance of greater than 0 over at least a portion of wavelengths from 340 nm to 380 nm, and a second unactivated state terminal minimum absorbance wavelength of greater than 340 nm.

The topcoat layer, of the at least three-layered embodiment, includes an optional ultraviolet light absorber, and a third unactivated state absorbance of greater than 0 over at least a portion of wavelengths from 330 nm to 380 nm, and a third unactivated state terminal minimum absorbance wavelength that is greater than 330 nm.

With the at least three-layered embodiment, the third unactivated state terminal minimum absorbance wavelength (of the second photochromic compound of the topcoat layer) is less than the second unactivated state terminal minimum absorbance wavelength (of the photochromic-dichroic compound of the underlying coating layer), and the second unactivated state terminal minimum absorbance wavelength (of the photochromic-dichroic compound of the coating layer) is less than or equal to the first terminal minimum absorbance wavelength (of the first photochromic compound of the underlying primer layer).

DETAILED DESCRIPTION OF THE INVENTION

Figure 1:
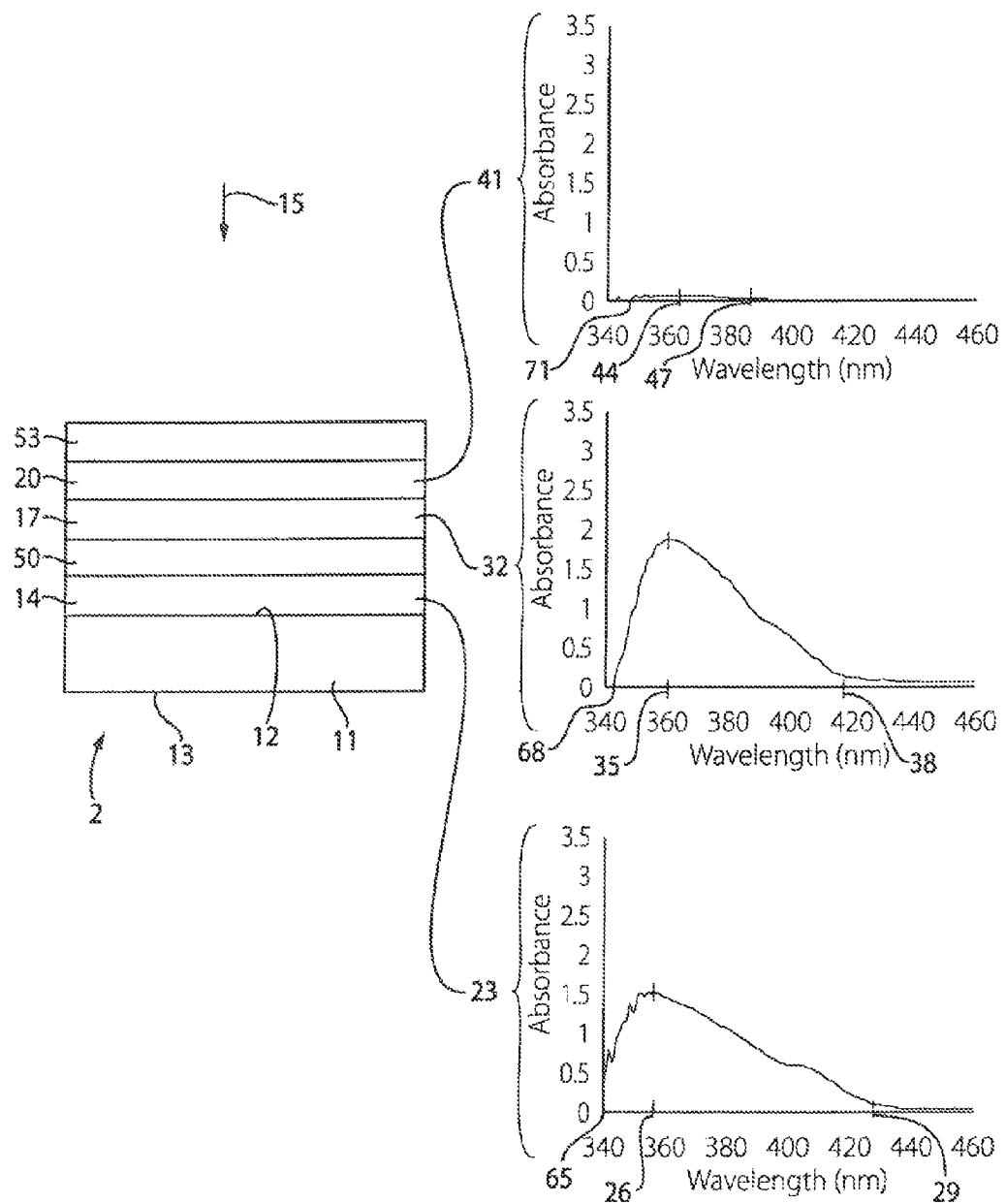
FIG. 1 is a representative side elevation sectional view of a photochromic article according to the present invention, which includes graphical representations of plots of absorbance vs. wavelength for the first photochromic compound of the primer layer, the photochromic-dichroic compound of the photochromic-dichroic layer, and the second photochromic compound of the topcoat layer.

As used herein, the term "actinic radiation" means electromagnetic radiation that is capable of causing a response in a material, such as, but not limited to, transforming a photochromic material from one form or state to another as will be discussed in further detail herein.

As used herein, the term "photochromic" and similar terms, such as "photochromic compound" means having an absorption spectrum for at least visible radiation that varies in response to absorption of at least actinic radiation. Further, as used herein the term "photochromic material" means any substance that is adapted to display photochromic properties (i.e. adapted to have an absorption spectrum for at least visible radiation that varies in response to absorption of at least actinic radiation) and which includes at least one photochromic compound.

As used herein, the term "photochromic compound" includes thermally reversible photochromic compounds and non-thermally reversible photochromic compounds. The term "thermally reversible photochromic compounds/material's" as used herein means compounds/materials capable of converting from a first state, for example a "clear state," to a second state, for example a "colored state," in response to actinic radiation, and reverting back to the first state in response to thermal energy. The term "non-thermally reversible photochromic compounds/materials" as used herein means compounds/materials capable of converting from a first state, for example a "clear state," to a second state, for example a "colored state," in response to actinic radiation, and reverting back to the first state in response to actinic radiation of substantially the same wavelength(s) as the absorption(s) of the colored state (e.g., discontinuing exposure to such actinic radiation).

As used herein the term "dichroic" means capable of absorbing one of two orthogonal plane polarized components of at least transmitted radiation more strongly than the other.

As used herein, the term "photochromic-dichroic" and similar terms, such as "photochromic-dichroic materials" and "photochromic-dichroic compounds" means materials and compounds that possess and/or provide both photochromic properties (i.e., having an absorption spectrum for at least visible radiation that varies in response to at least actinic radiation), and dichroic properties (i.e., capable of absorbing one of two orthogonal plane polarized components of at least transmitted radiation more strongly than the other).

As used herein the term "absorption ratio" refers to the ratio of the absorbance of radiation linearly polarized in a first plane to the absorbance of the same wavelength radiation linearly polarized in a plane orthogonal to the first plane, in which the first plane is taken as the plane with the highest absorbance.

As used herein to modify the term "state," the terms "first" and "second" are not intended to refer to any particular order or chronology, but instead refer to two different conditions or properties. For purposes of non-limiting illustration, the first state and the second state of the photochromic-dichroic compound of the photochromic-dichroic layer can differ with respect to at least one optical property, such as but not limited to the absorption or linearly polarization of visible and/or UV radiation. Thus, according to various non-limiting embodiments disclosed herein, the photochromic-dichroic compound of the photochromic-dichroic layer can have a different absorption spectrum in each of the first and second state. For example, while not limiting herein, the photochromic-dichroic compound of the photochromic-dichroic layer can be clear in the first state and colored in the second state. Alternatively, the photochromic-dichroic compound of the photochromic-dichroic layer can have a first color in the first state and a second color in the second state. Further, as discussed below in more detail, the photochromic-dichroic compound of the photochromic-dichroic layer can be non-linearly polarizing (or "non-polarizing") in the first state, and linearly polarizing in the second state.

As used herein the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein the term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein the term "ophthalmic substrate" means lenses, partially formed lenses, and lens blanks.

As used herein the term "display" means the visible or machine-readable representation of information in words, numbers, symbols, designs or drawings. Non-limiting examples of display articles, elements and devices include screens, monitors, and security elements, such as security marks.

As used herein the term "window" means an aperture adapted to permit the transmission of radiation therethrough. Non-limiting examples of windows include automotive and aircraft transparencies, filters, shutters, and optical switches.

As used herein the term "mirror" means a surface that specularly reflects a large or substantial fraction of incident light.

As used herein the term "liquid crystal cell" refers to a structure containing a liquid crystal material that is capable of being ordered. Active liquid crystal cells are cells in which the liquid crystal material is capable of being reversibly and controllably switched or converted between ordered and disordered states, or between two ordered states by the application of an external force, such as electric or magnetic fields. Passive liquid crystal cells are cells in which the liquid crystal material maintains an ordered state. A non-limiting example of an active liquid crystal cell element or device is a liquid crystal display.

As used herein the term "coating" means a supported film derived from a flowable composition, which may or may not have a uniform thickness, and specifically excludes polymeric sheets. The primer layer, the photochromic-dichroic layer and the optional topcoat layer of the photochromic articles of the present invention can, in some embodiments, each independently be a coating.

As used herein the term "sheet" means a pre-formed film having a generally uniform thickness and capable of self-support.

As used herein the term "connected to" means in direct contact with an object or indirect contact with an object through one or more other structures or materials, at least one of which is in direct contact with the object. For purposes of non-limiting illustration, the primer layer, for example, can be in direct contact (e.g., abutting contact) with at least a portion of the substrate or it can be in indirect contact with at least a portion of the substrate through one or more other interposed structures or materials, such as a monomolecular layer of a coupling or adhesive agent. For example, although not limiting herein, the primer layer can be in contact with one or more other interposed coatings, polymer sheets or combinations thereof, at least one of which is in direct contact with at least a portion of the substrate.

As used herein, the term "photosensitive material" means materials that physically or chemically respond to electromagnetic radiation, including, but not limited to, phosphorescent materials and fluorescent materials.

As used herein, the term "non-photosensitive materials" means materials that do not physically or chemically respond to electromagnetic radiation, including, but not limited to, static dyes.

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth)acrylic acid" means methacrylic acid and/or acrylic acid.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein and in the claims, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

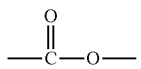

or equivalently —C(O)O—, is inclusive of the right-to-left representation thereof,

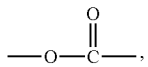

or equivalently —O(O)C— or —OC(O)—.

As used herein, the articles "a," "an," and "the" include plural referents unless otherwise expressly and unequivocally limited to one referent.

As used herein, the term "a first photochromic compound" means at least one first photochromic compound. When two or more first photochromic compounds are present, they together have and provide a (e.g., an average) first unactivated state peak absorbance wavelength, a (e.g., an average) first unactivated state absorbance of greater than 0 over a particular wavelength range, a (e.g., an average) first unactivated state terminal minimum absorbance wavelength, and a (e.g., an average) first unactivated state initial minimum absorbance wavelength.

As used herein, the term "a photochromic-dichroic compound" means at least one photochromic-dichroic compound. When two or more photochromic-dichroic compounds are present, they together have and provide a (e.g., an average) second unactivated state peak absorbance wavelength, a (e.g., an average) second unactivated state absorbance of greater than 0 over a particular wavelength range, a (e.g., an average) second unactivated state terminal minimum absorbance wavelength, and a (e.g., an average) second unactivated state initial minimum absorbance wavelength.

As used herein, the term "a second photochromic compound" means at least one second photochromic compound. When two or more second photochromic compounds are present, they together have and provide a (e.g., an average) third unactivated state peak absorbance, a (e.g., an average) third unactivated state absorbance wavelength of greater than 0 over a particular wavelength range, a (e.g., an average) third unactivated state terminal minimum absorbance wavelength, and a (e.g., an average) third unactivated state initial minimum absorbance wavelength.

As used herein, the term "unactivated state" with regard to photochromic compounds, such as the first photochromic compound, the photochromic-dichroic compound and the second photochromic compound, means the photochromic compound has been exposed to actinic radiation having sufficient energy to result in the photochromic compound having or producing: (i) measurable absorbance at wavelengths of greater than or equal to 330 nm and less than or equal to 450 nm, such as less than or equal to 430 nm or less than or equal to 410 nm; and (ii) minimal or substantially no measurable absorbance at wavelengths of greater than 450 nm.

As used herein, the term "activated state" with regard to photochromic compounds, such as the first photochromic compound, the photochromic-dichroic compound and the second photochromic compound, and photochromic articles, means the photochromic compound and/or photochromic article has been exposed to actinic radiation having sufficient energy to result in the photochromic compound and/or photochromic article having or producing: (i) measurable absorbance at wavelengths of greater than or equal to 330 nm and less than or equal to 450 nm, such as less than or equal to 430 nm or less than or equal to 410 nm; and (ii) measurable absorbance at wavelengths of greater than 450 nm.

As used herein, the term "a first unactivated state absorbance of greater than 0" over a certain wavelength range, such as "over all wavelengths from 340 nm to 380 nm" means the first photochromic compound has an unactivated state absorbance of greater than 0 over a certain wavelength range, such as at all wavelengths from 340 nm to 380 nm.

As used herein, the term "a first unactivated state peak absorbance wavelength" means the wavelength at which the first photochromic compound (of the primer layer), in an unactivated state, has a peak (or maximum) absorbance. The first unactivated state peak absorbance wavelength typically resides between 340 nm and 380 nm.

As used herein, the term "a first unactivated state terminal minimum absorbance wavelength" means the wavelength at which the first photochromic compound (of the primer layer), in an unactivated state, has a terminal (or upper) minimum absorbance. The first unactivated state terminal minimum absorbance wavelength is at higher wavelength than the first unactivated state peak absorbance wavelength.

As used herein, the term "a first unactivated state initial minimum absorbance wavelength" means the wavelength at which the first photochromic compound (of the primer layer), in an unactivated state, has an initial (or lower) minimum absorbance. The first unactivated state minimum absorbance wavelength is at lower wavelength than the first unactivated state peak absorbance wavelength and the first unactivated state terminal minimum absorbance wavelength.

As used herein, the term "a second unactivated state absorbance of greater than 0" over a certain wavelength range, such as "over at least a portion of wavelengths from 340 nm to 380 nm" means the photochromic-dichroic has an unactivated state absorbance of greater than 0 over a certain wavelength range, such as over at least a portion of wavelengths from 340 nm to 380 nm, such as from 340 nm to 370 nm, or from 350 nm to 380 nm, or from 340 nm to 380 nm.

As used herein, the term "over at least a portion of wavelengths from x nm to y nm" with regard to an unactivated state absorbance of greater than 0, means over at least a portion of consecutive wavelengths within the recited range, inclusive of the recited upper and lower wavelength values.

As used herein, the term "a second unactivated state peak absorbance wavelength" means the wavelength at which the photochromic-dichroic compound (of the coating layer, or photochromic-dichroic coating layer), in an unactivated state, has a peak (or maximum) absorbance. The second unactivated state peak absorbance wavelength typically resides between 340 nm and 380 nm.

As used herein, the term "a second unactivated state terminal minimum absorbance wavelength" means the wavelength at which the photochromic-dichroic compound (of the coating layer, or photochromic-dichroic coating layer), in an unactivated state, has a terminal (or upper) minimum absorbance. The second unactivated state terminal minimum absorbance wavelength is at higher wavelength than the second unactivated state peak absorbance wavelength.

As used herein, the term "a second unactivated state initial minimum absorbance wavelength" means the wavelength at which the photochromic-dichroic compound (of the photochromic-dichroic layer), in an unactivated state, has an initial (or lower) minimum absorbance. The second unactivated state minimum absorbance wavelength is at lower wavelength than the second unactivated state peak absorbance wavelength and the second unactivated state terminal minimum absorbance wavelength.

As used herein, the term "a third unactivated state absorbance of greater than 0" over a certain wavelength range, such as "over a portion of wavelengths from 330 nm to 380 nm" means the second photochromic compound has an unactivated state absorbance of greater than 0 over a certain wavelength range, such as over at least a portion of wavelengths from 330 nm to 380 nm, such as from 330 nm to 370 nm, or from 340 nm to 380 nm.

As used herein, the term "a third unactivated state peak absorbance wavelength" means the wavelength at which the second photochromic compound (of the topcoat layer), in an unactivated state, has a peak (or maximum) absorbance. The third unactivated state peak absorbance wavelength typically resides between 330 nm and 380 nm.

As used herein, the term "a third unactivated state terminal minimum absorbance wavelength" means the wavelength at which the second photochromic compound (of the topcoat layer), in an unactivated state, has a terminal (or upper) minimum absorbance. The third unactivated state terminal minimum absorbance wavelength is at higher wavelength than the third unactivated state peak absorbance wavelength.

As used herein, the term "a third unactivated state initial minimum absorbance wavelength" means the wavelength at which the second photochromic compound (of the topcoat layer), in an unactivated state, has an initial (or lower) minimum absorbance. The third unactivated state minimum absorbance wavelength is at lower wavelength than the third unactivated state peak absorbance wavelength and the third unactivated state terminal minimum absorbance wavelength.

The unactivated state initial minimum absorbance wavelength values, such as the first, second and/or third unactivated state initial minimum absorbance wavelength values, can each be affected by the analytical method and equipment employed, and the substrate and/or the matrix, such as the coating matrix, in which the particular photochromic compound resides (which is referred herein as a "USIMAWV affect"). The USIMAWV affect can be more pronounced when the unactivated state initial minimum absorbance wavelength value is less than 360 nm. The USIMAWV affect can be additive or subtractive, resulting in higher or lower unactivated state initial minimum absorbance wavelength values. Alternatively or additionally, the USIMAWV affect can result in unactivated state initial minimum absorbance wavelength values having negative absorbance values. Still further, the USIMAWV affect can result in positive and/or negative absorbance spikes, in particular at wavelength values less than 360 nm. While not intending to be bound by any theory, it is believed that, in the case of organic polymer substrates and organic polymer coatings, the USIMAWV affect is due, at least in part, to the presence of aromatic rings in the substrate and/or the coating matrix, coupled with instrument reference subtraction. With some embodiments, when the substrate is quartz, the USIMAWV affect can be minimized. Since substrates and coatings composed of organic polymer materials, and instrument reference subtraction were used, it is believed that the first, second and third unactivated state initial minimum absorbance wavelength values (65, 68 and 71) as described in further detail herein with reference to FIGS. 1 and 3, may have been subject to the USIMAWV affect.

As used herein, and unless otherwise indicated, "percent transmittance" was determined using an ULTRASCAN PRO spectrometer obtained commercially from HunterLab, in accordance with instructions provided in the spectrometer user manual.

As used herein the term "linearly polarize" means to confine the vibrations of the electric vector of electromagnetic waves, such as light waves, to one direction or plane.

Other than in the operating examples, or where otherwise indicated, all numbers expressing quantities of ingredients, reaction conditions, and so forth used in the specification and claims are to be under stood as modified in all instances by the term "about."

As used herein, spatial or directional terms, such as "left", "right", "inner", "outer", "above", "below", and the like, relate to the invention as it is depicted in the drawing figures. However, it is to be understood that the invention can assume various alternative orientations and, accordingly, such terms are not to be considered as limiting.

As used herein, the terms "formed over," "deposited over," "provided over," "applied over," residing over," or "positioned over," mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

With reference to FIG. 1, and for purposes of non-limiting illustration, a photochromic article 2 according to the present invention is depicted. Photochromic article 2 includes a substrate 11 having a first surface 12 and a second surface 13, in which the first 12 and second 13 surfaces are opposed to each other. First surface 12 of substrate 11 faces incident actinic radiation depicted by arrow 15. Photochromic article 2 further includes a primer layer 14 over (e.g., abutting) substrate 11 and in particular over (e.g., abutting) first surface 12 of substrate 11. Photochromic article 2 further includes a coating layer 17 (which is also referred to herein as a photochromic-dichroic layer 17) over primer layer 14, and an optional topcoat layer 20 over photochromic-dichroic layer 17. Photochromic article 2 of FIG. 1 includes other optional layers, which will be described further herein.

Primer layer 14 includes a first photochromic compound having absorbance properties represented by graph 23, which is a representative plot of absorbance vs. wavelength for the first photochromic compound in an unactivated state. More particularly, graph 23 is obtained from analysis of primer 14 applied to substrate 11 in the absence of other underlying or overlying layers. With reference to graph 23 of FIG. 1, the first photochromic compound has a first unactivated state peak absorbance wavelength 26, a first unactivated state terminal minimum absorbance wavelength 29, and a first unactivated state initial minimum absorbance wavelength 65 that is not depicted in graph 23, but which is less than 340 nm. The first unactivated state terminal minimum absorbance wavelength 29 of the first photochromic compound is at higher wavelength than the first unactivated state peak absorbance wavelength 26 thereof. The first unactivated state initial minimum absorbance wavelength 65 is at lower wavelength than the first unactivated state peak absorbance wavelength 26.

For purposes of non-limiting illustration, and with further reference to graph 23 of FIG. 1, the first unactivated state peak absorbance wavelength 26 of the first photochromic compound of primer layer 14 is 355 nm, the first unactivated state terminal minimum absorbance wavelength 29 is 425 nm, and the first unactivated state initial minimum absorbance wavelength 65 is 333 nm (not depicted).

The unactivated state terminal minimum absorbance wavelength values of the photochromic compounds and photochromic-dichroic compounds of the photochromic articles of the present invention can be determined in accordance with art-recognized methods. In some embodiments, the unactivated state absorbance of the photochromic or photochromic-dichroic compounds clearly drops to zero, and the wavelength at the zero point is recorded. In other embodiments, the unactivated state absorbance of the photochromic or photochromic-dichroic compound drops to a minimum plateau value, which may not reach a measured absorbance of zero. In the case of a minimum plateau value, the unactivated state terminal minimum absorbance wavelength values are typically estimated. For purposes of non-limiting illustration and with reference to FIG. 3, the third unactivated state terminal minimum absorbance wavelength 47 is estimated by extending a line, represented by dashed line 62, from a linear portion 56 of the absorbance vs. wavelength trace that resides to the left of (i.e., at lower wavelength relative to) the inflection point 59 of the trace. The point at which the extended line 62 intersects the x-axis is recorded as the third unactivated state terminal minimum absorbance wavelength value. The estimated unactivated state terminal minimum absorbance wavelength points and values as described can be determined by calculation (typically with the use of a computer graphing program) or manually (e.g., using a ruler). Unless otherwise indicated, the estimated unactivated state terminal minimum absorbance wavelength points and values depicted and discussed with reference to FIG. 1 were determined manually.

The unactivated state initial minimum absorbance wavelength values can be estimated in accordance with a method similar to that described with regard to the terminal minimum absorbance wavelength values. A line is extended from a linear portion of the absorbance vs. wavelength trace that resides to the right of (i.e., at higher wavelength relative to) the lower inflection point of the trace. With some embodiments, the unactivated state initial minimum absorbance clearly occurs at a value of zero absorbance along the x-axis, and as such does not have to be estimated.

Photochromic-dichroic layer 17 of photochromic article 2 includes a photochromic-dichroic compound having absorbance properties represented by graph 32, which is a plot of absorbance vs. wavelength for the photochromic-dichroic compound. More particularly, graph 32 is obtained from analysis of photochromic-dichroic layer 17 applied to substrate 11 in the absence of other underlying or overlying layers. With reference to graph 32 of FIG. 1, the photochromic-dichroic compound has a second unactivated state peak absorbance wavelength 35, a second unactivated state terminal minimum absorbance wavelength 38, and a second unactivated state initial minimum absorbance 68. The unactivated state second terminal minimum absorbance wavelength 38 of the photochromic-dichroic compound is at higher wavelength than the second peak absorbance wavelength 35 thereof. The unactivated state second initial minimum absorbance wavelength 68 of the photochromic-dichroic compound is at lower wavelength than the second peak absorbance wavelength 35.

For purposes of non-limiting illustration, and with further reference to graph 32 of FIG. 1, the second unactivated state peak absorbance wavelength 35 of the photochromic-dichroic compound of photochromic-dichroic layer 17 is 360 nm, the second unactivated state terminal minimum absorbance wavelength 38 is 417 nm, and the second unactivated state initial minimum absorbance wavelength 68 is 342 nm.

The optional topcoat layer 20 of photochromic article 2 can in some embodiments of the present invention include a second photochromic compound having absorbance properties represented by graph 41, which is a plot of absorbance vs. wavelength for the second photochromic compound. More particularly, graph 41 is obtained from analysis of topcoat layer 20 applied to substrate 11 in the absence of other underlying or overlying layers. With reference to graph 41 of FIG. 1 and FIG. 3, the second photochromic compound has a third unactivated state peak absorbance 44, a third unactivated state terminal minimum absorbance wavelength 47, and a third unactivated state initial minimum absorbance wavelength 71. The third unactivated state terminal minimum absorbance wavelength 47 of the second photochromic compound is at higher wavelength than the third unactivated state peak absorbance wavelength 44 thereof. The third unactivated state initial minimum absorbance wavelength 71 is at lower wavelength than third unactivated state peak absorbance wavelength 44.

Figure 3:
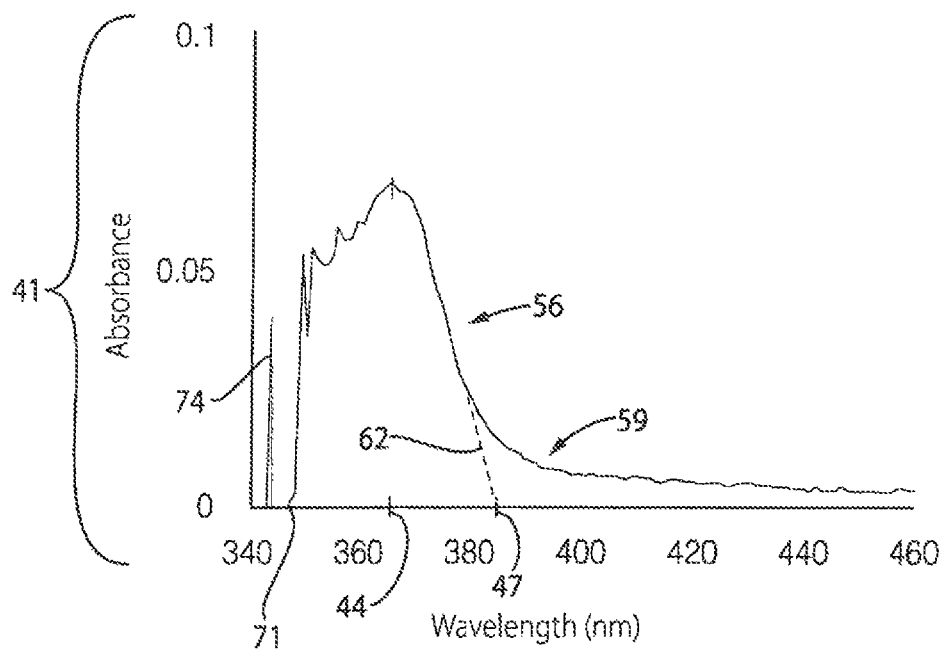
FIG. 3 is a graphical representation of graph 41 of FIG. 1, in which the y-axis range has been changed from 0 to 3.5 (FIG. 1) to 0 to 0.1 (FIG. 3), for purposes of better illustrating the absorbance vs. wavelength plot.

For purposes of non-limiting illustration, and with further reference to graph 41 of FIG. 1 and FIG. 3, the third unactivated state peak absorbance wavelength 44 of the second photochromic compound of topcoat layer 20 is 364 nm, the third unactivated state terminal minimum absorbance wavelength 47 is 386 nm, and the third unactivated state initial minimum absorbance wavelength 71 is 346 nm. In FIG. 3, line or spike 74 is believed to be the result of the polymer matrix of the topcoat layer and/or the substrate, and is not believed to be the result of (or due to) the second photochromic compound. As such, spike 74 is not considered when determining the third unactivated state peak absorbance wavelength, the third unactivated state terminal minimum absorbance wavelength, or the third unactivated state initial minimum absorbance wavelength of the second photochromic compound of the topcoat layer.

Graph 41 of FIG. 1 and FIG. 3 is the same, but the y-axis of graph 41 in FIG. 3 extends from 0 to 0.1 rather than from 0 to 3.5 as in FIG. 1, for purposes of better illustrating and determining the peak, terminal minimum, and initial minimum values associated with the second photochromic compound of the topcoat layer.

Graphs 23, 32, and 41 of FIG. 1, and graph 41 of FIG. 3 each depict absorbance as a function of wavelength from 340 nm to 460 nm. As recited previously herein, FIG. 1 and FIG. 3, including graphs 23, 32, and 41, are referenced for purposes of non-limiting illustration. As such, absorbance as a function of wavelength of the first photochromic compound, the photochromic-dichroic compound, and the second photochromic compound in each case is not limited to that depicted in FIG. 1 and FIG. 3.

The first photochromic compound of the primer layer has a first unactivated state absorbance of greater than 0 at all wavelengths from 340 nm to 380 nm, and the first unactivated state terminal minimum absorbance wavelength is greater than 380 nm. With some embodiments, the first photochromic compound of the primer layer has a first unactivated state absorbance of greater than 0 at all wavelengths from 340 nm to 400 nm, and the first unactivated state terminal minimum absorbance wavelength is greater than 400 nm. With some additional embodiments, the first photochromic compound of the primer layer has a first unactivated state absorbance of greater than 0 at all wavelengths from 340 nm to 410 nm, and the first unactivated state terminal minimum absorbance wavelength is greater than 410 nm. For purposes of non-limiting illustration and with reference to graph 23 of FIG. 1, the first photochromic compound of primer layer 14 has a first unactivated state absorbance of greater than 0 at all wavelengths from 340 nm to 380 nm, and a first unactivated state terminal minimum absorbance wavelength that is greater than 380 nm. As discussed previously herein, the first unactivated state terminal minimum absorbance wavelength of the first photochromic compound of the primer layer 14 of photochromic article 2 of FIG. 1 is 425 nm.

The photochromic-dichroic compound of the photochromic-dichroic coating layer has a second unactivated state absorbance of greater than 0 over at least a portion of wavelengths from 340 nm to 380 nm, and a second unactivated state terminal minimum absorbance wavelength that is greater than 340 nm. For purposes of non-limiting illustration, the photochromic-dichroic compound can, with some embodiments, have: a second unactivated state absorbance of greater than 0 over all wavelengths from 340 nm to 370 nm, and a second unactivated state terminal minimum absorbance wavelength that is greater than 370 nm; or a second unactivated state absorbance of greater than 0 over all wavelengths from 350 nm to 380 nm, and a second unactivated state terminal minimum absorbance wavelength that is greater than 380 nm.

With some embodiments, the photochromic-dichroic compound of the photochromic-dichroic coating layer has a second unactivated state absorbance of greater than 0 over at least a portion of wavelengths from 340 nm to 380 nm, and a second unactivated state terminal minimum absorbance wavelength that is greater than 380 nm.

With some additional embodiments, the photochromic-dichroic compound of the photochromic-dichroic coating layer has a second unactivated state absorbance of greater than 0 at all (or, over all) wavelengths from 340 nm to 380 nm, and a second unactivated state terminal minimum absorbance wavelength that is greater than 380 nm.

In accordance with some embodiments of the present invention, the first unactivated state terminal minimum absorbance wavelength is greater than 380 nm and less than or equal to 450 nm, such as less than or equal to 440 nm, or less than or equal to 430 nm. With additional embodiments, the second unactivated state terminal minimum absorbance wavelength is greater than 340 nm and less than or equal to 450 nm, such as less than or equal to 440 nm, or less than or equal to 440 nm.

The second unactivated state terminal minimum absorbance wavelength, with some embodiments of the present invention, is less than the first unactivated state terminal minimum absorbance wavelength.

The photochromic-dichroic compound of photochromic-dichroic layer 17 and the first photochromic compound of the underlying primer layer 14 are each selected so as to have the absorbance properties as described above. According to some embodiments of the present invention, they are selected such that the photochromic article has an unactivated state percent transmittance of less than 5% at all wavelengths from 340 nm to 380 nm. The unactivated state percent transmittance all wavelengths from 340 nm to 380 nm can, with some embodiments, be less than 4%, or less than 3%, or less than 2%, or less than 1%, or less than 0.5%. With some embodiments, the unactivated state percent transmittance is substantially 0% at all wavelengths from 340 nm to 380 nm. Reducing and minimizing the percent transmittance of electromagnetic radiation through the photochromic articles of the present invention at all wavelengths from 340 nm to 380 nm is desirable for reasons including, but not limited to, protecting objects behind the photochromic article, such as a human eye, from exposure to electromagnetic radiation having wavelengths from 340 nm to 380 nm. Percent transmittance over the recited wavelength range or ranges is determined in accordance with art-recognized methods using art-recognized and commercially available analytical equipment.

With some additional embodiments, the photochromic article of the present invention has an unactivated state percent transmittance of less than 5% at all wavelengths from 340 nm to 400 nm. The unactivated state percent transmittance at all wavelengths from 340 nm to 400 nm can, with some embodiments, be less than 4%, or less than 3%, or less than 2%, or less than 1%, or less than 0.5%. With some embodiments, the unactivated state percent transmittance is substantially 0% at all wavelengths from 340 nm to 400 nm. As discussed above with regard to 340 nm to 380 nm, reducing and minimizing the percent transmittance of electromagnetic radiation through the photochromic articles of the present invention at all wavelengths from 340 nm to 400 nm is desirable for reasons including, but not limited to, protecting objects behind the photochromic article, such as a human eye, from exposure to electromagnetic radiation having wavelengths from 340 nm to 400 nm.

When including the primer layer and photochromic-dichroic layer as described previously herein, the photochromic article with some embodiments of the present invention has an activated state optical density that is greater than a control activated state optical density of a control photochromic article comprising the substrate and the coating layer (i.e., photochromic-dichroic layer) in the absence of the primer layer. The substrate of the photochromic article and the control photochromic article is in each case substantially the same, and has substantially the same properties and thickness. The coating layers of the photochromic article and the control photochromic article are in each case substantially the same, and have substantially the same properties and thickness.

Correspondingly with the increased optical density, photochromic articles according to the present invention are typically darker, in an activated state, when exposed to the same level of incident actinic radiation as comparative photochromic articles, in an activated state, having, for example, a photochromic-dichroic layer containing a photochromic-dichroic compound in the absence of an underlying primer layer containing a first photochromic compound as described above.

The activated state optical density of the and the control activated state optical density are typically determined over at least a portion of the visible light spectrum. With some embodiments, the activated state optical density and the control activated state optical density are each determined from 410 nm to 800 nm. Optical density is determined in accordance with art-recognized methods using art-recognized and commercially available equipment.

With some embodiments the photochromic article includes a topcoat layer that resides over the photochromic-dichroic layer. The topcoat layer can include an ultraviolet light absorber and/or a second photochromic compound. With some embodiments, the topcoat layer includes a second photochromic compound and optionally an ultraviolet light absorber. The topcoat layer, with some embodiments, includes an ultraviolet light absorber and is free of photochromic compounds, such as the second photochromic compound. The topcoat layer, with additional embodiments, includes a second photochromic compound and is free of an ultraviolet light absorber. The primer and first photochromic compound, and the photochromic-dichroic layer and photochromic-dichroic compound are each as described previously herein.

The second photochromic compound, of the topcoat layer, has a third unactivated state absorbance of greater than 0 over at least a portion of wavelengths from 330 nm to 380 nm, and a third unactivated state terminal minimum absorbance wavelength that is greater than 330 nm. As discussed previously herein, the third unactivated state terminal minimum absorbance wavelength (of the second photochromic compound of the topcoat layer) is less than the second unactivated state terminal minimum absorbance wavelength (of the photochromic-dichroic compound of the photochromic-dichroic layer).

With some embodiments, the third unactivated state terminal minimum absorbance wavelength is greater than 330 nm and less than 380 nm. The third unactivated state terminal minimum absorbance wavelength, with some additional embodiments, is greater than 330 nm and less than 370 nm.

In accordance with some embodiments of the photochromic articles of the present invention: the first unactivated state terminal minimum absorbance wavelength is greater than 380 nm and less than or equal to 450 nm; the second unactivated state terminal minimum absorbance wavelength is greater than 340 nm and less than or equal to 450 nm; and the third unactivated state terminal minimum absorbance wavelength is greater than 330 nm and less than 380 nm.

In accordance with some embodiments of the photochromic articles of the present invention: the first unactivated state terminal minimum absorbance wavelength is greater than 380 nm and less than or equal to 450 nm; the second unactivated state terminal minimum absorbance wavelength is greater than 340 nm and less than or equal to 450 nm; and the third unactivated state terminal minimum absorbance wavelength is greater than 330 nm and less than 370 nm.

The second photochromic compound of the topcoat layer 20, the photochromic-dichroic compound of photochromic-dichroic layer 17, and the first photochromic compound of the underlying primer layer 14 are each selected so as to have or provide the absorbance properties as described above. According to some embodiments of the present invention, they are selected such that the photochromic article has an unactivated state percent transmittance of less than 5% at all wavelengths from 340 nm to 380 nm. The unactivated state percent transmittance at all wavelengths from 340 nm to 380 nm can, with some embodiments, be less than 4%, or less than 3%, or less than 2%, or less than 1%, or less than 0.5%. With some embodiments, the unactivated state percent transmittance is substantially 0% at all wavelengths from 340 nm to 380 nm.

With some additional embodiments, the photochromic article of the present invention, when including the topcoat layer and second photochromic compound, has an unactivated state percent transmittance of less than 5% at all wavelengths from 340 nm to 400 nm. The unactivated state percent transmittance at all wavelengths from 340 nm to 400 nm can, with some embodiments, be less than 4%, or less than 3%, or less than 2%, or less than 1%, or less than 0.5%. With some embodiments, the unactivated state percent transmittance is substantially 0% at all wavelengths from 340 nm to 400 nm.

When including the topcoat layer with the second photochromic compound, photochromic-dichroic layer and primer layer as described previously herein, the photochromic article with some embodiments of the present invention has an activated state optical density that is greater than a control activated state optical density of a control photochromic article that comprises the substrate and the coating layer (i.e., photochromic-dichroic layer) in the absence of both of the topcoat layer with the second photochromic compound and the primer layer. The substrate of the photochromic article and the control photochromic article is in each case substantially the same, and has substantially the same properties and thickness. The coating layer of the photochromic article and the control photochromic article are in each case substantially the same, and have substantially the same properties and thickness.

The activated state optical density and the control activated state optical density are each typically determined over at least a portion of the visible light spectrum. With some embodiments, the activated state optical density and the control activated state optical density are each determined from 410 nm to 800 nm. Optical density is determined in accordance with art-recognized methods using art-recognized and commercially available equipment.

Correspondingly with the increased optical density, photochromic articles according to the present invention are typically darker, in an activated state, when exposed to the same level of incident actinic radiation as comparative photochromic articles, in an activated state, having, for example, a photochromic-dichroic layer containing a photochromic-dichroic compound in the absence of an overlying topcoat layer containing a second photochromic compound, and an underlying primer layer containing a first photochromic compound as described above.

With some embodiments of the photochromic articles of the present invention, the unactivated state peak absorbance wavelength values of the first photochromic compound, the photochromic-dichroic compound and the optional second photochromic compound are not equivalent to each other. More particularly, the first unactivated state peak absorbance wavelength (of the first photochromic compound of the primer layer), the second unactivated state peak absorbance wavelength (of the photochromic-dichroic compound of the photochromic-dichroic layer), and the third unactivated state peak absorbance wavelength (of the optional second photochromic compound of the optional topcoat layer) are not equivalent to each other.

Selecting the first photochromic compound, the photochromic-dichroic compound and the optional second photochromic compound such that the unactivated state peak absorbance wavelength values thereof are not equivalent to each other is desirable, with some embodiments, for reasons including, but not limited to, increasing the total amount of incident radiation (having wavelengths from 340 nm to 380 nm or from 340 nm to 400 nm) that is absorbed by the photochromic article. When the unactivated state peak absorbance wavelength values are not equivalent to each other, the amount of incident radiation (having wavelengths from 340 nm to 380 nm or from 340 nm to 400 nm) that is absorbed by each of the optional second photochromic compound, the photochromic-dichroic compound and the first photochromic compound can be increased or optimized as the incident radiation passes down through the optional topcoat layer (20), the photochromic-dichroic layer (17) and the primer layer (14). Increasing and/or optimizing the amount of incident radiation (having wavelengths from 340 nm to 380 nm or from 340 nm to 400 nm) absorbed by each of the optional second photochromic compound, the photochromic-dichroic compound and the first photochromic compound can increase and/or optimize the photochromic and/or photochromic-dichroic response of the recited compounds, and correspondingly improve the photochromic and/or photochromic-dichroic response and properties of the photochromic articles of the present invention. Alternatively or in addition, the percent transmittance of incident radiation having wavelengths from 340 nm to 380 nm or from 340 nm to 400 nm through the photochromic articles of the present invention can be minimized when the first, second, and third unactivated state peak wavelengths are non-equivalent and offset as described above and further herein.

In accordance with some embodiments, the difference between the second unactivated state peak absorbance wavelength and the first unactivated state peak absorbance wavelength is greater than or equal to 0.5 nm and less than or equal to 20 nm, or greater than or equal to 1 nm and less than or equal to 15 nm, or greater than or equal to 2 nm and less than or equal to 10 nm, or greater than or equal to 2 nm and less than or equal to 7 nm, or any combination of these recited upper and lower wavelength values.

The second unactivated state peak absorbance wavelength can be greater than or less than the first unactivated state peak absorbance wavelength. Correspondingly, the first unactivated state peak absorbance wavelength can be greater than or less than the second unactivated state peak absorbance wavelength. With some embodiments, the second unactivated state peak absorbance wavelength is greater than the first unactivated state peak absorbance wavelength, and correspondingly, the first unactivated state peak absorbance wavelength is less than the second unactivated state peak absorbance wavelength.

In accordance with some further embodiments, and in addition to the first, second and third unactivated state peak absorbance wavelength values being non-equivalent to each other, the difference between the third unactivated state peak absorbance wavelength and the second unactivated state peak absorbance wavelength is greater than or equal to 0.5 nm and less than or equal to 20 nm, or greater than or equal to 1 nm and less than or equal to 15 nm, or greater than or equal to 2 nm and less than or equal to 10 nm, or greater than or equal to 2 nm and less than or equal to 7 nm, or any combination of these recited upper and lower wavelength values.

In addition to the first, second and third unactivated state peak absorbance wavelength values being non-equivalent to each other, with some further embodiments, the third unactivated state peak absorbance wavelength can be greater than or less than the second unactivated state peak absorbance wavelength. Correspondingly, the second unactivated state peak absorbance wavelength can be greater than or less than the third unactivated state peak absorbance wavelength. With some embodiments, the third unactivated state peak absorbance wavelength is greater than the second unactivated state peak absorbance wavelength, and correspondingly, the second unactivated state peak absorbance wavelength is less than the third unactivated state peak absorbance wavelength.

With some further embodiments, in addition to the first, second and third unactivated state peak absorbance wavelength values being non-equivalent to each other: the first unactivated state peak absorbance wavelength is less than the second unactivated state peak absorbance wavelength; and the second unactivated state peak absorbance wavelength is less than the third unactivated state peak absorbance wavelength (when the topcoat and second photochromic compound are present).

Substrates from which the substrate of the photochromic articles of the present invention can be selected include, but are not limited to, substrates formed from organic materials, inorganic materials, or combinations thereof (for example, composite materials). Non-limiting examples of substrates that can be used in accordance with various non-limiting embodiments disclosed herein are described in more detail below.

Non-limiting examples of organic materials that can be used to form the substrate of the photochromic articles of the present invention, include polymeric materials, for example, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly (ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

The substrate can, with some embodiments, be an ophthalmic substrate. Non-limiting examples of organic materials suitable for use in forming ophthalmic substrates include, but are not limited to, the art-recognized polymers that are useful as ophthalmic substrates, such as organic optical resins that are used to prepare optically clear castings for optical applications, such as ophthalmic lenses.

Other non-limiting examples of organic materials suitable for use in forming the substrate of the photochromic articles of the present invention include both synthetic and natural organic materials, including without limitation: opaque or transluscent polymeric materials, natural and synthetic textiles, and cellulosic materials such as, paper and wood.

Non-limiting examples of inorganic materials suitable for use in forming the substrate of the photochromic articles of the present invention include glasses, minerals, ceramics, and metals. For example, in one non-limiting embodiment the substrate can include glass. In other non-limiting embodiments, the substrate can have a reflective surface, for example, a polished ceramic substrate, metal substrate, or mineral substrate. In other non-limiting embodiments, a reflective coating or layer can be deposited or otherwise applied to a surface of an inorganic or an organic substrate to make it reflective or to enhance its reflectivity.

Further, according to certain non-limiting embodiments disclosed herein, the substrate can have a protective coating, such as, but not limited to, an abrasion-resistant coating, such as a "hard coat," on its exterior surfaces. For example, commercially available thermoplastic polycarbonate ophthalmic lens substrates are often sold with an abrasion-resistant coating already applied to its exterior surfaces because these surfaces tend to be readily scratched, abraded or scuffed. An example of such a lens substrate is the GENTEX™ polycarbonate lens (available from Gentex Optics). Therefore, as used herein the term "substrate" includes a substrate having a protective coating, such as but not limited to an abrasion-resistant coating, on its surface(s).

Still further, the substrate of the photochromic article of the present invention can be untinted, tinted, linearly polarizing, circularly polarizing, elliptically polarizing, photochromic, or tinted-photochromic substrates. As used herein with reference to substrates the term "untinted" means substrates that are essentially free of coloring agent additions (such as, but not limited to, conventional dyes) and have an absorption spectrum for visible radiation that does not vary significantly in response to actinic radiation. Further, with reference to substrates the term "tinted" means substrates that have a coloring agent addition (such as, but not limited to, conventional dyes) and an absorption spectrum for visible radiation that does not vary significantly in response to actinic radiation.

As used herein the term "linearly polarizing" with regard to the substrate means substrates that are adapted to linearly polarize radiation. As used herein the term "circularly polarizing" with regard to the substrate means substrates that are adapted to circularly polarize radiation. As used herein the term "elliptically polarizing" with regard to the substrate means substrates that are adapted to elliptically polarize radiation. As used herein with the term "photochromic" with regard to the substrate means substrates having an absorption spectrum for visible radiation that varies in response to at least actinic radiation. Further, as used herein with regard to the substrate, the term "tinted-photochromic" means substrates containing a coloring agent addition as well as a photochromic material, and having an absorption spectrum for visible radiation that varies in response to at least actinic radiation. Thus, for example and without limitation, a tinted-photochromic substrate can have a first color characteristic of the coloring agent and a second color characteristic of the combination of the coloring agent the photochromic material when exposed to actinic radiation.

The photochromic articles of the present invention include a photochromic-dichroic layer that further includes a photochromic-dichroic compound. The photochromic-dichroic layer can, in some embodiments, be non-polarizing in a first state (that is, the coating will not confine the vibrations of the electric vector of light waves to one direction), and be linearly polarizing in a second state with regard to transmitted radiation. As used herein the term "transmitted radiation" refers to radiation that is passed through at least a portion of an object. Although not limiting herein, the transmitted radiation can be ultraviolet radiation, visible radiation, infrared radiation, or a combination thereof. Thus, according to various non-limiting embodiments disclosed herein, the photochromic-dichroic layer can be non-polarizing in the first state and linearly polarizing transmitted ultraviolet radiation, transmitted visible radiation, or a combination thereof in the second state.

According to still other non-limiting embodiments, the photochromic-dichroic layer can have a first absorption spectrum in the first state, a second absorption spectrum in the second state, and can be linearly polarizing in both the first and second states.

With some embodiments, the photochromic-dichroic layer can have an average absorption ratio of at least 1.5 in at least one state. With some further embodiments, the photochromic-dichroic layer can have an average absorption ratio ranging from at least 1.5 to 50 (or greater) in at least one state. The term "absorption ratio" refers to the ratio of the absorbance of radiation linearly polarized in a first plane to the absorbance of radiation linearly polarized in a plane orthogonal to the first plane, in which the first plane is taken as the plane with the highest absorbance. Thus, the absorption ratio (and the average absorption ratio which is described below) is an indication of how strongly one of two orthogonal plane polarized components of radiation is absorbed by an object or material.

The average absorption ratio of a photochromic-dichroic layer that includes a photochromic-dichroic compound can be determined as set forth below. For example, to determine the average absorption ratio of a photochromic-dichroic layer that includes a photochromic-dichroic compound, a substrate having a coating is positioned on an optical bench and the coating is placed in a linearly polarizing state by activation of the photochromic-dichroic compound. Activation is achieved by exposing the coating to UV radiation for a time sufficient to reach a saturated or near saturated state (that is, a state wherein the absorption properties of the coating do not substantially change over the interval of time during which the measurements are made). Absorption measurements are taken over a period of time (typically 10 to 300 seconds) at 3 second intervals for light that is linearly polarized in a plane perpendicular to the optical bench (referred to as the 0° polarization plane or direction) and light that is linearly polarized in a plane that is parallel to the optical bench (referred to as the 90° polarization plane or direction) in the following sequence: 0°, 90°, 90°, 0° etc. The absorbance of the linearly polarized light by the coating is measured at each time interval for all of the wavelengths tested and the unactivated absorbance (i.e., the absorbance of the coating in an unactivated state) over the same range of wavelengths is subtracted to obtain absorption spectra for the coating in an activated state in each of the 0° and 90° polarization planes to obtain an average difference absorption spectrum in each polarization plane for the coating in the saturated or near-saturated state.

Figure 2:
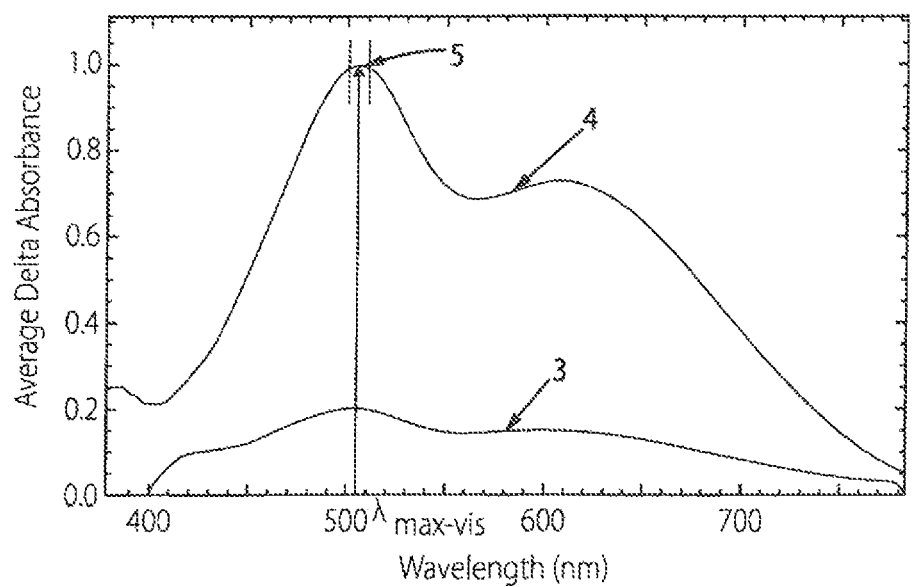
FIG. 2 is a graphical representation of average delta absorbance as a function of wavelength (over a visible wavelength region after activation with actinic radiation), and depicts two average difference absorption spectra obtained in two orthogonal planes for a photochromic-dichroic layer that includes a photochromic-dichroic compound that can be included in the photochromic articles of the present invention.

For example, with reference to FIG. 2, there is shown the average difference absorption spectrum (generally indicated 4) in one polarization plane that was obtained for a photochromic-dichroic layer according to one non-limiting embodiment disclosed herein. The average absorption spectrum (generally indicated 3) is the average difference absorption spectrum obtained for the same photochromic-dichroic layer in the orthogonal polarization plane.

Based on the average difference absorption spectra obtained for the photochromic-dichroic layer, the average absorption ratio for the photochromic-dichroic layer is obtained as follows. The absorption ratio of the photochromic-dichroic layer at each wavelength in a predetermined range of wavelengths corresponding to $\lambda_{max\text{-}vis}+/-5$ nanometers (generally indicated as 5 in FIG. 2), wherein $\lambda_{max\text{-}vis}$ is the wavelength at which the coating had the highest average absorbance in any plane, is calculated according to the following equation (Eq. 1):

$$AR_{\lambda_i} = Ab^1_{\lambda_i}/Ab^2_{\lambda_i} \qquad \text{Eq. 1}$$

With reference to equation Eq. 1, $AR_{\lambda_i}$ is the absorption ratio at wavelength $\lambda_i$, $Ab^1_{\lambda_i}$ is the average absorption at wavelength $\lambda_i$ in the polarization direction (i.e., 0° or 90°) having the higher absorbance, and $Ab^2_{\lambda_i}$ is the average absorption at wavelength $\lambda_i$ in the remaining polarization direction. As previously discussed, the "absorption ratio" refers to the ratio of the absorbance of radiation linearly polarized in a first plane to the absorbance of the same wavelength radiation linearly polarized in a plane orthogonal to the first plane, wherein the first plane is taken as the plane with the highest absorbance.

The average absorption ratio ("AR") for the photochromic-dichroic layer is then calculated by averaging the individual absorption ratios over the predetermined range of wavelengths (i.e., $\lambda_{max\text{-}vis}$+/−5 nanometers) according to the following equation (Eq. 2):

$$AR = (\Sigma AR_{\lambda i})/n_i \qquad \text{Eq. 2}$$

With reference to equation Eq. 2, AR is average absorption ratio for the coating, $AR_{\lambda i}$ are the individual absorption ratios (as determined above in Eq. 1) for each wavelength within the predetermined range of wavelengths, and $n_i$ is the number of individual absorption ratios averaged. A more detailed description of this method of determining the average absorption ratio is provided in the Examples of U.S. Pat. No. 7,256,921 at column 102, line 38 through column 103, line 15, the disclosure of which is specifically incorporated herein by reference.

With some embodiments, the photochromic-dichroic compound of the photochromic-dichroic layer can be at least partially aligned. As previously discussed, the term "photochromic-dichroic" means displaying both photochromic and dichroic (i.e., linearly polarizing) properties under certain conditions, which properties are at least detectable by instrumentation. Accordingly, "photochromic-dichroic compounds" are compounds displaying both photochromic and dichroic (i.e., linearly polarizing) properties under certain conditions, which properties are at least detectable by instrumentation. Thus, photochromic-dichroic compounds have an absorption spectrum for at least visible radiation that varies in response to at least actinic radiation and are capable of absorbing one of two orthogonal plane polarized components of at least transmitted radiation more strongly than the other. Additionally, as with conventional photochromic compounds discussed above, the photochromic-dichroic compounds disclosed herein can be thermally reversible. That is, the photochromic-dichroic compounds can switch from a first state to a second state in response to actinic radiation and revert back to the first state in response to thermal energy. As used herein the term "compound" means a substance formed by the union of two or more elements, components, ingredients, or parts and includes, without limitation, molecules and macromolecules (for example polymers and oligomers) formed by the union of two or more elements, components, ingredients, or parts.

For example, the photochromic-dichroic layer can have a first state having a first absorption spectrum, a second state having a second absorption spectrum that is different from the first absorption spectrum, and can be adapted to switch from the first state to the second state in response to at least actinic radiation and to revert back to the first state in response to thermal energy. Further, the photochromic-dichroic compound can be dichroic (i.e., linearly polarizing) in one or both of the first state and the second state. For example, although not required, the photochromic-dichroic compound can be linearly polarizing in an activated state and non-polarizing in the bleached or faded (i.e., not activated) state. As used herein, the term "activated state" refers to the photochromic-dichroic compound when exposed to sufficient actinic radiation to cause at least a portion of the photochromic-dichroic compound to switch from a first state to a second state. Further, although not required, the photochromic-dichroic compound can be dichroic in both the first and second states. While not limiting herein, for example, the photochromic-dichroic compound can linearly polarize visible radiation in both the activated state and the bleached state. Further, the photochromic-dichroic compound can linearly polarize visible radiation in an activated state, and can linearly polarize UV radiation in the bleached state.

Although not required, according to various non-limiting embodiments disclosed herein, the photochromic-dichroic compound of the photochromic-dichroic layer can have an average absorption ratio of at least 1.5 in an activated state as determined according to the CELL METHOD. According to other non-limiting embodiments disclosed herein, the photochromic-dichroic compound can have an average absorption ratio greater than 2.3 in an activated state as determined according to the CELL METHOD. According to still other non-limiting embodiments, the at least partially aligned photochromic-dichroic compound of the photochromic-dichroic layer can have an average absorption ratio ranging from 1.5 to 50 in an activated state as determined according to the CELL METHOD. According to other non-limiting embodiments, the at least partially aligned photochromic-dichroic compound of the photochromic-dichroic layer can have an average absorption ratio ranging from 4 to 20, can further have an average absorption ratio ranging from 3 to 30, and can still further have an average absorption ratio ranging from 2.5 to 50 in an activated state as determined according to the CELL METHOD. More typically, however, the average absorption ratio of the at least partially aligned photochromic-dichroic compound can be any average absorption ratio that is sufficient to impart the desired properties to the photochromic article of the present invention. Non-limiting examples of suitable photochromic-dichroic compounds are described in detail herein below.

The CELL METHOD for determining the average absorption ratio of the photochromic-dichroic compound is essentially the same as the method used to determine the average absorption ratio of the photochromic-dichroic layer, except that, instead of measuring the absorbance of a coated substrate, a cell assembly containing an aligned liquid crystal material and the photochromic-dichroic compound is tested. More specifically, the cell assembly includes two opposing glass substrates that are spaced apart by 20 microns +/−1 micron. The substrates are sealed along two opposite edges to form a cell. The inner surface of each of the glass substrates is coated with a polyimide coating, the surface of which has been at least partially ordered by rubbing. Alignment of the photochromic-dichroic compound is achieved by introducing the photochromic-dichroic compound and the liquid crystal medium into the cell assembly, and allowing the liquid crystal medium to align with the rubbed polyimide surface. Once the liquid crystal medium and the photochromic-dichroic compound are aligned, the cell assembly is placed on an optical bench (which is described in detail in the Examples) and the average absorption ratio is determined in the manner previously described for the coated substrates, except that the unactivated absorbance of the cell assembly is subtracted from the activated absorbance to obtain the average difference absorption spectra.

As previously discussed, while dichroic compounds are capable of preferentially absorbing one of two orthogonal components of plane polarized light, it is generally necessary to suitably position or arrange the molecules of a dichroic compound in order to achieve a net linear polarization effect. Similarly, it is generally necessary to suitably position or arrange the molecules of a photochromic-dichroic compound to achieve a net linear polarization effect. That is, it is generally necessary to align the molecules of the photochromic-dichroic compound such that the long axis of the molecules of the photochromic-dichroic compound in an activated state are generally parallel to each other. Therefore, as discussed above, according to various non-limiting embodiments disclosed herein, the photochromic-dichroic compound is at least partially aligned. Further, if the activated state of the photochromic-dichroic compound corresponds to a dichroic state of the material, the photochromic-dichroic compound can be at least partially aligned such that the long axis of the molecules of the photochromic-dichroic compound in the activated state are aligned. As used herein the term "align" means to bring into suitable arrangement or position by interaction with another material, compound or structure.

Further, although not limiting herein, the photochromic-dichroic layer of the photochromic article of the present invention can include a plurality of photochromic-dichroic compounds. Although not limiting herein, when two or more photochromic-dichroic compounds are used in combination, the photochromic-dichroic compounds can be chosen to complement one another to produce a desired color or hue. For example, mixtures photochromic-dichroic compounds can be used according to certain non-limiting embodiments disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors. Additionally or alternatively, the at least partial coating can comprise mixtures of photochromic-dichroic compounds having complementary linear polarization states. For example, the photochromic-dichroic compounds can be chosen to have complementary linear polarization states over a desired range of wavelengths to produce an optical element that is capable of polarizing light over the desired range of wavelengths. Still further, mixtures of complementary photochromic-dichroic compounds having essentially the same polarization states at the same wavelengths can be chosen to reinforce or enhance the overall linear polarization achieved. For example, according to one non-limiting embodiment, the photochromic-dichroic layer can include at least two at least partially aligned photochromic-dichroic compounds, in which each at least partially aligned photochromic-dichroic compounds have: complementary colors; and/or complementary linear polarization states.

The photochromic-dichroic layer can further include at least one additive that may facilitate one or more of the processing, the properties, or the performance of the at least partial coating. Non-limiting examples of such additives include dyes, alignment promoters, kinetic enhancing additives, photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and adhesion promoters (such as hexanediol diacrylate and coupling agents).

Examples of dyes that can be present in the photochromic-dichroic layer include, but are not limited to, organic dyes that are capable of imparting a desired color or other optical property to the photochromic-dichroic layer.

As used herein, the term "alignment promoter" means an additive that can facilitate at least one of the rate and uniformity of the alignment of a material to which it is added. Non-limiting examples of alignment promoters that can be present in the photochromic-dichroic layer include, but are not limited to, those described in U.S. Pat. No. 6,338,808 and U.S. Patent Publication No. 2002/0039627, which are hereby specifically incorporated by reference herein.

Non-limiting examples of kinetic enhancing additives that can be present in the various layers of the photochromic article of the present invention, such as the photochromic-dichroic layer, include epoxy-containing compounds, organic polyols, and/or plasticizers. More specific examples of such kinetic enhancing additives are disclosed in U.S. Pat. No. 6,433,043 and U.S. Patent Publication No. 2003/0045612, which are hereby specifically incorporated by reference herein.

Non-limiting examples of photoinitiators that can be present in the various layers of the photochromic article of the present invention, such as the primer layer, the photochromic-dichroic layer, and/or the topcoat layer, include, but are not limited to, cleavage-type photoinitiators and abstraction-type photoinitiators. Non-limiting examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DAROCURE® 4265, which is available from Ciba Chemicals, Inc. Non-limiting examples of abstraction-type photoinitiators include benzophenone, Michler's ketone, thioxanthone, anthraquinone, camphorquinone, fluorone, ketocoumarin or mixtures of such initiators.

Another non-limiting example of a photoinitiator that can be present in one or more of the layers of the photochromic article of the present invention, such as the primer layer, the photochromic-dichroic layer, and/or the topcoat layer, is a visible light photoinitiator. Non-limiting examples of suitable visible light photoinitiators are set forth at column 12, line 11 to column 13, line 21 of U.S. Pat. No. 6,602,603, which is specifically incorporated by reference herein.

Examples of thermal initiators include, but are not limited to, organic peroxy compounds and azobis(organonitrile) compounds. Examples of organic peroxy compounds that are useful as thermal initiators include, but are not limited to, peroxymonocarbonate esters, such as tertiarybutylperoxy isopropyl carbonate; peroxydicarbonate esters, such as di(2-ethylhexyl)peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide and p-chlorobenzoyl peroxide; peroxyesters such as t-butylperoxy pivalate, t-butylperoxy octylate and t-butylperoxyisobutyrate; methylethylketone peroxide, and acetylcyclohexane sulfonyl peroxide. In one non-limiting embodiment the thermal initiators used are those that do not discolor the resulting polymerizate. Examples of azobis(organonitrile) compounds that can be used as thermal initiators include, but are not limited to, azobis(isobutyronitrile), azobis(2,4-dimethylvaleronitrile) or a mixture thereof.

Examples of polymerization inhibitors include, but are not limited to: nitrobenzene, 1,3,5,-trinitrobenzene, p-benzoquinone, chloranil, DPPH, $FeCl_3$, $CuCl_2$, oxygen, sulfur, aniline, phenol, p-dihydroxybenzene, 1,2,3-trihydroxybenzene, and 2,4,6-trimethylphenol.

Examples of solvents that can be present in forming the various layers of the photochromic articles of the present invention, such as the primer layer, the photochromic-dichroic layer, and/or the topcoat layer, include, but are not limited to, those that will dissolve solid components of the coating, that are compatible with the coating and the elements and substrates, and/or can ensure uniform coverage of the exterior surface(s) to which the coating is applied. Examples of solvents include, but are not limited to, the following: propylene glycol monomethyl ether acetate and their derivates (sold as DOWANOL® industrial solvents), acetone, amyl propionate, anisole, benzene, butyl acetate, cyclohexane, dialkyl ethers of ethylene glycol, e.g., diethylene glycol dimethyl ether and their derivates (sold as CELLOSOLVE® industrial solvents), diethylene glycol dibenzoate, dimethyl sulfoxide, dimethyl formamide, dimethoxybenzene, ethyl acetate, isopropyl alcohol, methyl cyclohexanone, cyclopentanone, methyl ethyl ketone, methyl isobutyl ketone, methyl propionate, propylene carbonate, tetrahydrofuran, toluene, xylene, 2-methoxyethyl ether, 3-propylene glycol methyl ether, and mixtures thereof.

In another non-limiting embodiment, the photochromic-dichroic layer can include at least one conventional dichroic compound. Examples of suitable conventional dichroic compounds include, but are not limited to, azomethines, indigoids, thioindigoids, merocyanines, indans, quinophthalonic dyes, perylenes, phthaloperines, triphenodioxazines, indoloquinoxalines, imidazo-triazines, tetrazines, azo and (poly) azo dyes, benzoquinones, naphthoquinones, anthroquinone and (poly)anthroquinones, anthropyrimidinones, iodine and iodate. In another non-limiting embodiment, the dichroic material can include at least one reactive functional group that is capable of forming at least one covalent bond with another materials. With some embodiments, the dichroic material can be a polymerizable dichroic compound. Correspondingly, the dichroic material can include at least one group that is capable of being polymerized (i.e., a "polymerizable group"). For example, although not limiting herein, in one non-limiting embodiment the dichroic compound can have at least one alkoxy, polyalkoxy, alkyl, or polyalkyl substituent terminated with at least one polymerizable group.

With some embodiments, the photochromic-dichroic layer can include at least one conventional photochromic compound. As used herein, the term "conventional photochromic compound" includes both thermally reversible and non-thermally reversible (or photo-reversible) photochromic compounds. Generally, although not limiting herein, when two or more conventional photochromic materials are used in combination with each other or with a photochromic-dichroic compound, the various materials can be chosen to complement one another to produce a desired color or hue. For example, mixtures of photochromic compounds can be used according to certain non-limiting embodiments disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

In accordance with some embodiments, the photochromic-dichroic layer is free of conventional photochromic compounds.

The photochromic-dichroic layer can include one or more suitable photochromic-dichroic compounds. Examples of photochromic-dichroic compounds that can be included in the photochromic-dichroic layer of the photochromic articles of the present invention include, but are not limited to, the following:

(PCDC-1) 3-phenyl-3-(4-(4-(3-piperidin-4-yl-propyl)piperidino)phenyl)-13,13-dimethyl-3H,13-indeno[2',3':3,4] naphtho[1,2-b]pyran;

(PCDC-2) 3-phenyl-3-(4-(4-(3-(1-(2-hydroxyethyl)piperidin-4-yl)propyl)piperidino)phenyl)-13,13-dimethyl-3H, 13H-indeno[2',3':3,4]naphtho[1,2-b]pyran;

(PCDC-3) 3-phenyl-3-(4-(4-(4-butyl-phenylcarbamoyl)-piperidin-1-yl) phenyl)-13,13-dimethyl-6-methoxy-7-(4-phenyl-piperazin-1-yl)-3H,13H-indeno[2',3':3,4]naphtho [1,2-b]pyran;

(PCDC-4) 3-phenyl-3-(4-([1,4']bipiperidinyl-1'-yl)phenyl)-13,13-dimethyl-6-methoxy-7-([1,4']bipiperidinyl-1'-yl)-3H,13H-indeno[2',3':3,4]naphtho[1,2-b]pyran;

(PCDC-5) 3-phenyl-3-(4-(4-phenyl-piperazin-1-yl)phenyl)-13,13-dimethyl-6-methoxy-7-(4-(4-hexylbenzoyloxy)-piperidin-1-yl)-3H,13H-indeno[2',3':3,4]naphtho[1,2-b]pyran;

(PCDC-6) 3-phenyl-3-(4-(4-phenyl-piperazin-1-yl)phenyl)-13,13-dimethyl-6-methoxy-7-(4-(4'-octyloxy-biphenyl-4-carbonyloxy)-piperidin-1-yl)-3H,13H-indeno[2',3':3,4] naphtho[1,2-b]pyran;

(PCDC-7) 3-phenyl-3-(4-(4-phenyl-piperazin-1-yl)phenyl)-13,13-dimethyl-6-methoxy-7-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-3H,13H-indeno[2',3': 3,4]naphtho[1,2-b]pyran;

(PCDC-8) 3-phenyl-3-(4-{4-[17-(1,5-dimethyl-hexyl)-10, 13-dimethyl-2,3,4,7,8,9,10,11,12,13,14,15,16,17-tetradecahydro-1H-cyclopenta[a]phenanthren-3-yloxycarbonyloxy]-piperidin-1-yl}-phenyl)-13,13-dimethyl-6-methoxy-7-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-3H,13H-indeno[2',3':3,4]naphtho[1,2-b] pyran;

(PCDC-9) 3-phenyl-3-(4-(4-phenylpiperazin-1-yl)phenyl)-13,13-dimethyl-6-methoxy-7-(4-(4-(4'-octyloxy-biphenyl-4-carbonyloxy)phenyl)piperazin-1-yl)-3H,13H-indeno[2',3':3,4]naphtho[1,2-b]pyran;

(PCDC-10) 3-phenyl-3-(4-(4-phenyl-piperazin-1-yl)phenyl)-13,13-dimethyl-6-methoxy-7-(4-(4-(4-hexyloxyphenylcarbonyloxy)phenyl)piperazin-1-yl)-3H,13H-indeno [2',3':3,4]naphtho[1,2-b]pyran;

(PCDC-11) 3-phenyl-3-(4-(4-phenyl-piperazin-1-yl)phenyl)-13,13-dimethyl-6-methoxy-7-(4-(4-(4-(2-fluorobenzoyloxy)benzoyloxy)phenyl)piperazin-1-yl)-3H,13H-indeno[2',3':3,4]naphtho[1,2-b]pyran;

(PCDC-12) 3-phenyl-3-(4-(pyrrolidin-1-yl)phenyl)-13-hydroxy-13-ethyl-6-methoxy-7-(4-(4-(4-hexylbenzoyloxy) phenyl)piperazin-1-yl)-3H,13H-indeno[2',3':3,4]naphtho [1,2-b]pyran;

(PCDC-13) 3-phenyl-3-(4-(pyrrolidin-1-yl)phenyl)-13,13-dimethyl-6-methoxy-7-(4-(4-hexylbenzoyloxy)benzoyloxy)-3H,13H-indeno[2',3':3,4]naphtho[1,2-b]pyran;

(PCDC-14) 3-phenyl-3-(4-(pyrrolidin-1-yl)phenyl)-13,13-dimethyl-6-methoxy-7-(4-(4-(4-hexylbenzoyloxy)benzoyloxy)benzoyloxy)-3H,13H-indeno[2',3':3,4]naphtho [1,2-b]pyran;

(PCDC-15) 3-phenyl-3-(4-(4-methoxyphenyl)-piperazin-1-yl))phenyl)-13,13-dimethyl-6-methoxy-7-(4-(4-(3-phenylprop-2-ynoyloxy)phenyl)piperazin-1-yl)-3H,13H-indeno[2',3':3,4]naphtho[1,2-b]pyran;

(PCDC-16) 3-(4-methoxyphenyl)-3-(4-(4-methoxyphenyl) piperazin-1-yl)phenyl)-13-ethyl-13-hydroxy-6-methoxy-7-(4-(4-(4-hexylbenzoyloxy)phenyl)piperazin-1-yl)-3H, 13H-indeno[2',3':3,4]naphtho[1,2-b]pyran;

(PCDC-17) 3-phenyl-3-{4-(pyrrolidin-1-yl)phenyl)-13-[17-(1,5-dimethyl-hexyl)-10,13-dimethyl-2,3,4,7,8,9,10,11, 12,13,14,15,16,17-tetradecahydro-1H-cyclopenta[a] phenanthren-3-yloxy]-13-ethyl-6-methoxy-7-(4-(17-(1,5-dimethyl-hexyl)-10,13-dimethyl-2,3,4,7,8,9,10,11,12,13, 14,15,16,17-tetradecahydro-1H-cyclopenta[a]

phenanthren-3-yloxycarbonyloxy]-piperidin-1-yl)-3H, 13H-indeno[2',3':3,4]naphtho[1,2-b]pyran;

(PCDC-18) 3-phenyl-3-(4-{4-[17-(1,5-dimethyl-hexyl)-10, 13-dimethyl-2,3,4,7,8,9,10,11,12,13,14,15,16,17-tetradecahydro-1H-cyclopenta[a]phenanthren-3-yloxycarbonyloxy]-piperidin-1-yl}-phenyl)-13-ethyl-13-hydroxy-6-methoxy-7-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-)-3H,13H-indeno[2',3':3,4]naphtho[1,2-b]pyran;

(PCDC-19) 3-phenyl-3-{4-(pyrrolidin-1-yl)phenyl}-13,13-dimethyl-6-methoxy-7-(4-(4-(4-(3-phenyl-3-{4-(pyrrolidin-1-yl)phenyl}-13,13-dimethyl-6-methoxy-indeno[2',3':3,4]naphtho[1,2-b]pyran-7-yl)-piperidin-1-yl)oxycarbonyl)phenyl)phenyl)carbonyloxy)-3H,13H-indeno[2',3':3,4]naphtho[1,2-b]pyran;

(PCDC-20) 3-{2-methylphenyl}-3-phenyl-5-(4-(4'-(trans-4-pentylcyclohexyl)-[1,1-biphenyl]-4-ylcarboxamido)phenyl)-3H-naphtho[1,2-b]pyran;

(PCDC-21) 3-{4-[4-(4-methoxy-phenyl)-piperazin-1-yl]-phenyl}-3-phenyl-7-(4-(4'-(trans-4-pentylcyclohexyl)-[1,1'-biphenyl]-4-ylcarboxamido)phenyl)-3H-naphtho[2,1-b]pyran;

(PCDC-22) 3-{4-[4-(4-methoxy-phenyl)-piperazin-1-yl]-phenyl}-3-phenyl-7-(4-phenyl-(phen-1-oxy)carbonyl)-3H-naphtho[2,1-b]pyran;

(PCDC-23) 3-{4-[4-(4-methoxy-phenyl)-piperazin-1-yl]-phenyl}-3-phenyl-7-(N-(4-((4-dimethylamino)phenyl)diazenyl)phenyl)carbamoyl-3H-naphtho[2,1-b]pyran;

(PCDC-24) 2-phenyl-2-{4-[4-(4-methoxy-phenyl)-piperazin-1-yl]-phenyl}-benzofuro[3',2':7,8]benzo[b]pyran;

(PCDC-25) 2-phenyl-2-{4-[4-(4-methoxy-phenyl)-piperazin-1-yl]-phenyl}-7-(4-(4'-(trans-4-pentylcyclohexyl)-[1,1-biphenyl]-4-ylcarboxamido)phenyl)-benzothieno[3',2':7,8]benzo[b]pyran;

(PCDC-26) 7-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}-2-phenyl-2-(4-pyrrolidin-1-yl-phenyl)-6-methoxycarbonyl-2H-benzo[b]pyran;

(PCDC-27) 2-phenyl-2-{4-[4-(4-methoxy-phenyl)-piperazin-1-yl]-phenyl}-9-hydroxy-8-methoxycarbonyl-2H-naphtho[1,2-b]pyran;

(PCDC-28) 2-phenyl-2-{4-[4-(4-methoxy-phenyl)-piperazin-1-yl]-phenyl}-9-hydroxy-8-(N-(4-butyl-phenyl))carbamoyl-2H-naphtho[1,2-b]pyran;

(PCDC-29) 2-phenyl-2-{4-[4-(4-methoxy-phenyl)-piperazin-1-yl]-phenyl}-9-hydroxy-8-(4-(4'-(trans-4-pentylcyclohexyl)-[1,1'-biphenyl]-4-ylcarboxamido)phenyl)-2H-naphtho[1,2-b]pyran;

(PCDC-30) 1,3,3-trimethyl-6'-(4-ethoxycarbonyl)-piperidin-1-yl)-spiro[indoline-2,3'-3H-naphtho[2,1-b][1,4]oxazine];

(PCDC-31) 1,3,3-trimethyl-6'-(4-[N-(4-butylphenyl)carbamoyl]-piperidin-1-yl)-spiro[indoline-2,3'-3H-naphtho[2,1-b][1,4]oxazine];

(PCDC-32) 1,3,3-trimethyl-6'-(4-(4-methoxyphenyl)piperazin-1-yl)-spiro[indoline-2,3'-3H-naphtho[2,1-b][1,4]oxazine];

(PCDC-33) 1,3,3-trimethyl-6'-(4-(4'-(trans-4-pentylcyclohexyl)-[1,1'-biphenyl]-4-ylcarboxamido)phenyl)-spiro[indoline-2,3'-3H-naphtho[2,1-b][1,4]oxazine];

(PCDC-34) 1,3,3,5,6-pentamethyl-7'-(4-(4'-(trans-4-pentylcyclohexyl)-[1,1'-biphenyl]-4-ylcarboxamido)phenyl))-spiro[indoline-2,3'-3H-naphtho[2,1-b][1,4]oxazine];

(PCDC-35) 1,3-diethyl-3-methyl-5-methoxy-6'-(4-(4'-Hexyloxy-biphenyl-4-carbonyloxy)-piperidin-1-yl)-spiro[indoline-2,3'-3H-naphtho[2,1-b][1,4]oxazine];

(PCDC-36) 1,3-diethyl-3-methyl-5-[4-(4-pentadecafluoro-heptyloxy-phenylcarbamoyl)-benzyloxy]-6'-(4-(4'-hexyloxy-biphenyl-4-carbonyloxy)-piperidin-1-yl)-spiro[indoline-2,3'-3H-naphtho[2,1-b][1,4]oxazine];

(PCDC-37) 2-phenyl-2-{4-[4-(4-methoxy-phenyl)-piperazin-1-yl]-phenyl}-5-carbomethoxy-8-(N-(4-phenyl)phenyl)carbamoyl-2H-naphtho[1,2-b]pyran;

(PCDC-38) 2-phenyl-2-{4-[4-(4-methoxy-phenyl)-piperazin-1-yl]-phenyl}-5-carbomethoxy-8-(N-(4-phenyl)phenyl)carbamoyl-2H-fluoantheno[1,2-b]pyran;

(PCDC-39) 2-phenyl-2-{4-[4-(4-methoxy-phenyl)-piperazin-1-yl]-phenyl}-5-carbomethoxy-11-(4-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}phenyl)-2H-fluoantheno[1,2-b]pyran;

(PCDC-40) 1-(4-carboxybutyl)-6-(4-(4-propylphenyl)carbonyloxy)phenyl)-3,3-dimethyl-6'-(4-ethoxycarbonyl)-piperidin-1-yl)-spiro[(1,2-dihydro-9H-dioxolano[4',5':6,7]indoline-2,3'-3H-naphtho[2,1-b][1,4]oxazine];

(PCDC-41) 1-(4-carboxybutyl)-6-(4-(4-propylphenyl)carbonyloxy)phenyl)-3,3-dimethyl-7'-(4-ethoxycarbonyl)-piperidin-1-yl)-spiro[(1,2-dihydro-9H-dioxolano[4',5':6,7]indoline-2,3'-3H-naphtho[1,2-b][1,4]oxazine];

(PCDC-42) 1,3-diethyl-3-methyl-5-(4-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}phenyl)-6'-(4-(4'-hexyloxy-biphenyl-4-carbonyloxy)-piperidin-1-yl)-spiro[indoline-2,3'-3H-naphtho[2,1-b][1,4]oxazine];

(PCDC-43) 1-butyl-3-ethyl-3-methyl-5-methoxy-7'-(4-(4'-Hexyloxy-biphenyl-4-carbonyloxy)-piperidin-1-yl)-spiro[indoline-2,3'-3H-naphtho[1,2-b][1,4]oxazine];

(PCDC-44) 2-phenyl-2-{4-[4-(4-methoxy-phenyl)-piperazin-1-yl]-phenyl}-5-methoxycarbonyl-6-methyl-2H-9-(4-(4-propylphenyl)carbonyloxy)phenyl)-(1,2-dihydro-9H-dioxolano[4',5':6,7]) naphtho[1,2-b]pyran;

(PCDC-45) 3-(4-methoxyphenyl)-3-(4-(4-methoxyphenyl)piperazin-1-yl)phenyl)-13-ethyl-13-hydroxy-6-methoxy-7-(4-(4-propylphenyl)carbonyloxy)phenyl)-3H,13H-[1,2-dihydro-9H-dioxolano[4",5":6,7][indeno[2',3':3,4]naphtho[1,2-b]pyran;

(PCDC-46) 3-phenyl-3-(4-(4-methoxyphenyl)piperazin-1-yl)phenyl)-13-ethyl-13-hydroxy-6-methoxy-7-(4-(4-hexylphenyl)carbonyloxy)phenyl)-3H,13H-[1,2-dihydro-9H-dioxolano[4",5":5,6][indeno[2',3':3,4]]naphtho[1,2-b]pyran;

(PCDC-47) 4-(4-((4-cyclohexylidene-1-ethyl-2,5-dioxopyrrolin-3-ylidene)ethyl)-2-thienyl)phenyl-(4-propyl)benzoate;

(PCDC-48) 4-(4-((4-adamantan-2-ylidene-1-(4-(4-hexylphenyl)carbonyloxy)phenyl)-2,5-dioxopyrrolin-3-ylidene)ethyl)-2-thienyl)phenyl-(4-propyl)benzoate;

(PCDC-49) 4-(4-((4-adamantan-2-ylidene-2,5-dioxo-1-(4-(4-(4-propylphenyl)piperazinyl)phenyl)pyrrolin-3-ylidene)ethyl)-2-thienyl)phenyl(4-propyl)benzoate;

(PCDC-50) 4-(4-((4-adamantan-2-ylidene-2,5-dioxo-1-(4-(4-(4-propylphenyl)piperazinyl)phenyl)pyrrolin-3-ylidene)ethyl)-1-methylpyrrol-2-yl)phenyl (4-propyl)benzoate;

(PCDC-51) 4-(4-((4-adamantan-2-ylidene-2,5-dioxo-1-(4-{17-(1,5-dimethyl-hexyl)-10,13-dimethyl-2,3,4,7,8,9,10,11,12,13,14,15,16,17-tetradecahydro-1H-cyclopenta[a]

phenanthren-3-yloxycarbonyloxy}phenyl)pyrrolin-3-ylidene)ethyl)-1-methylpyrrol-2-yl)phenyl (4-propyl) benzoate;

(PCDC-52) 4-(4-methyl-5,7-dioxo-6-(4-(4-(4-propylphenyl)piperazinyl)phenyl)spiro[8,7a-dihydrothiapheno[4,5-f]isoindole-8,2'-adamentane]-2-yl)phenyl(4-propyl)phenyl benzoate;

(PCDC-53) N-(4-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}phenyl-6,7-dihydro-4-methyl-2-phenylspiro(5,6-benzo[b]thiophenedicarboxyimide-7,2-tricyclo[3.3.1.1]decane);

(PCDC-54) N-cyanomethyl-6,7-dihydro-2-(4-(4-(4-propylphenyl)piperazinyl)phenyl)-4-methylspiro(5,6-benzo[b]thiophenedicarboxyimide-7,2-tricyclo[3.3.1.1]decane);

(PCDC-55) N-phenylethyl-6,7-dihydro-2-(4-(4-(4-hexylbenzoyloxy)phenyl)piperazin-1-yl)phenyl-4-methylspiro(5,6-benzo[b]thiophenedicarboxyimide-7,2-tricyclo[3.3.1.1]decane);

(PCDC-56) N-phenylethyl-6,7-dihydro-2-(4-(4-(4-hexylbenzoyloxy)phenyl)piperazin-1-yl)phenyl-4-cyclopropylspiro(5,6-benzo[b]thiophenedicarboxyimide-7,2-tricyclo[3.3.1.1]decane);

(PCDC-57) N-phenylethyl-6,7-dihydro-2-(4-(4-(4-hexylbenzoyloxy)phenyl)piperazin-1-yl)phenyl-4-cyclopropyl spiro(5,6-benzo[b]furodicarboxyimide-7,2-tricyclo[3.3.1.1]decane);

(PCDC-58) N-cyanomethyl-6,7-dihydro-4-(4-(4-(4-hexylbenzoyloxy)phenyl)piperazin-1-yl)phenyl-2-phenylspiro(5,6-benzo[b]thiophenedicarboxyimide-7,2-tricyclo[3.3.1.1]decane);

(PCDC-59) N-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyl-6,7-dihydro-2-(4-methoxyphenyl)phenyl-4-methylspiro(5,6-benzo[b]thiophenedicarboxyimide-7,2-tricyclo[3.3.1.1]decane);

(PCDC-60) N-cyanomethyl-2-(4-(6-(4-butylphenyl)carbonyloxy-(4,8-dioxabicyclo[3.3.0]oct-2-yl))oxycarbonyl)phenyl-6,7-dihydro-4-cyclopropylspiro(5,6-benzo[b]thiophenedicarboxyimide-7,2-tricyclo[3.3.1.1]decane);

(PCDC-61) 6,7-dihydro-N-methoxycarbonylmethyl-4-(4-(6-(4-butylphenyl)carbonyloxy-(4,8-dioxabicyclo[3.3.0]oct-2-yl))oxycarbonyl)phenyl-2-phenylspiro(5,6-benzo[b]thiophenedicarboxyimide-7,2-tricyclo[3.3.1.1]decane); and (PCDC-62) 3-phenyl-3-(4-pyrrolidinylphenyl)-13,13-dimethyl-6-methoxy-7-(4-(4-(4-(4-(6-(4-(4-(4-onylphenylcabonyloxy)phenyl)oxycarbonyl)phenoxy)hexyloxy)phenyl)piperazin-1-yl)indeno[2',3':3,4]naphtho[1,2-b]pyran.

With some further embodiments, the photochromic-dichroic compounds of the photochromic articles of the present invention, can be chosen from the following:

(PCDC-a1) 3,3-Bis(4-methoxyphenyl)-10-[4-(4-(trans-4-pentylcyclohexyl)benzamido)phenyl]-13,13-dimethyl-12-bromo-3,13-dihydro-indeno[2',3':3,4]naphtho[1,2-b]pyran;

(PCDC-a2) 3,3-Bis(4-methoxyphenyl)-10-[4-((trans-4-pentylcyclohexyl)phenoxy)carbonyl) phenyl]-6,13,13-trimethyl-3,13-dihydro-indeno[2',3':3,4]naphtho[1,2-b]pyran;

(PCDC-a3) 3-(4-Fluorophenyl)-3-(4-piperidinophenyl)-10-[4-(4-(4-(trans-4-pentylcyclohexyl)phenyl)benzamido)phenyl]-6-trifluromethyl-11,13,13-trimethyl-3,13-dihydro-indeno[2',3':3,4]naphtho[1,2-b]pyran;

(PCDC-a4) 3,3-Bis(4-methoxyphenyl)-10-[4-(4-(trans-4-pentylcyclohexyl)benzamido)phenyl]-5,7-difluoro-13,13-dimethyl-3,13-dihydro-indeno[2',3':3,4]naphtho[1,2-b]pyran;

(PCDC-a5) 3-(4-Methoxyphenyl)-3-(4-piperidinophenyl)-10-[4-(4-(4-(trans-4-pentylcyclohexyl)phenyl)benzamido)phenyl]-5,7-difluoro-13,13-dimethyl-3,13-dihydro-indeno[2',3':3,4]naphtho[1,2-b]pyran;

(PCDC-a6) 3-(4-Methoxyphenyl)-3-(4-morpholinophenyl)-10-[4-(4-(4-(trans-4-pentylcyclohexyl)phenyl)benzamido)phenyl]-5,7-difluoro-13,13-dimethyl-3,13-dihydro-indeno[2',3':3,4]naphtho[1,2-b]pyran;

(PCDC-a7) 3-(4-Fluorophenyl)-3-(4-piperidinophenyl)-10-[4-((4-(trans-4-pentylcyclohexyl)phenoxy)carbonyl)phenyl]-12-bromo-5,7-difluoro-13,13-dimethyl-3,13-dihydro-indeno[2',3':3,4]naphtho[1,2-b]pyran;

(PCDC-a8) 3-Phenyl-3-(4-piperidinophenyl)-10-[4-(4-(trans-4-pentylcyclohexyl)phenyl)benzamido)phenyl]-12-bromo-5,7-difluoro-13,13-dimethyl-3,13-dihydro-indeno[2',3':3,4]naphtho[1,2-b]pyran;

(PCDC-a9) 3-Phenyl-3-(4-piperidinophenyl)-10-[4-((4-(trans-4-pentylcyclohexyl)phenoxy)carbonyl)phenyl]-12-bromo-5,7-difluoro-13,13-dimethyl-3,13-dihydro-indeno[2',3':3,4]naphtho[1,2-b]pyran;

(PCDC-a10) 3-(4-Fluorophenyl)-3-(4-piperidinophenyl)-10-[4-(4-(4-(trans-4-pentylcyclohexyl)phenyl)benzamido)phenyl]-12-bromo-13,13-dimethyl-3,13-dihydro-indeno[2',3':3,4]naphtho[1,2-b]pyran;

(PCDC-a 11) 3,3-Bis(4-methoxydinophenyl)-10-[4-(4-(4-(trans-4-pentylcyclohexyl)phenyl)benzamido)phenyl]-12-bromo-6,7-dimethoxy-11,13,13-trimethyl-3,13-dihydro-indeno[2',3':3,4]naphtho[1,2-b]pyran;

(PCDC-a12) 3,3-Bis(4-methoxyphenyl)-10-[4-(4-(4-(trans-4-pentylcyclohexyl)phenyl)benzamido)phenyl]-6-trifluromethyl-12-bromo-13,13-dimethyl-3,13-dihydro-indeno[2',3':3,4]naphtho[1,2-b]pyran;

(PCDC-a13) 3,3-Bis(4-methoxyphenyl)-10,12-bis[4-(4-(4-(trans-4-pentylcyclohexyl)phenyl)benzamido)phenyl]-6-trifluromethyl-13,13-dimethyl-3,13-dihydro-indeno[2',3':3,4]naphtho[1,2-b]pyran;

(PCDC-a14) 3,3-Bis(4-methoxyphenyl)-10-[4-(4-(4-(trans-4-pentylcyclohexyl)phenyl)benzamido)phenyl]-5,7-difluoro-13,13-dimethyl-3,13-dihydro-indeno[2',3':3,4]naphtho[1,2-b]pyran;

(PCDC-a15) 3,3-Bis(4-methoxyphenyl)-10-[4-(4-(4-(trans-4-pentylcyclohexyl)phenyl)benzamido)phenyl]-6-trifluromethyl-13,13-dimethyl-3,13-dihydro-indeno[2',3':3,4]naphtho[1,2-b]pyran;

(PCDC-a16) 3,3-Bis(4-methoxyphenyl)-10-[4-(4-(4-(trans-4-pentylcyclohexyl)phenyl)benzamido)phenyl]-5,7-difluoro-12-bromo-13,13-dimethyl-3,13-dihydro-indeno[2',3':3,4]naphtho[1,2-b]pyran;

(PCDC-a17) 3-(4-Fluorophenyl)-3-(4-morpholinophenyl)-10-[4-(4-(4-(trans-4-pentylcyclohexyl)phenyl)benzamido)phenyl]-6-trifluoromethyl-13-methyl-13-butyl-3,13-dihydro-indeno[2',3':3,4]naphtho[1,2-b]pyran;

(PCDC-a18) 3-(4-Fluorophenyl)-3-(4-morpholinophenyl)-10-[4-(4-(4-(trans-4-pentylcyclohexyl)phenyl)benzamido)phenyl]-5,7-difluoro-12-bromo-13,13-dimethyl-3,13-dihydro-indeno[2',3':3,4]naphtho[1,2-b]pyran;

(PCDC-a19) 3-Phenyl-3-(4-methoxyphenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;

(PCDC-a20) 3-Phenyl-3-(4-morpholinophenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;

(PCDC-a21) 3,3-Bis(4-fluorophenyl)-10-[4-(4-(4-(trans-4-pentylcyclohexyl)phenyl)benzamido)phenyl]-6-trifluoromethyl-12-bromo-13,13-dimethyl-3,13-dihydro-indeno[2',3':3,4]naphtho[1,2-b]pyran;

(PCDC-a22) 3,3-Bis(4-fluorophenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;

(PCDC-a23) 3-(4-Methoxyphenyl)-3-(4-butoxyphenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;

(PCDC-a24) 3-(4-Fluorophenyl)-13,13-dimethyl-3-(4-morpholinophenyl)-10-(4-(4'-(trans-4-pentylcyclohexyl)-[1,1'-biphenyl]-4-ylcarboxamido)phenyl)-6-(trifluoromethyl)-3,13-dihydro-indeno[2',3':3,4]naphtho[1,2-b]pyran;

(PCDC-a25) 3-(4-Butoxyphenyl)-3-(4-fluorophenyl)-13,13-dimethyl-10-(4-(4'-(trans-4-pentylcyclohexyl)-[1,1'-biphenyl]-4-ylcarboxamido)phenyl)-6-(trifluoromethyl)-3,13-dihydro-indeno[2',3':3,4]naphtho[1,2-b]pyran;

(PCDC-a26) 3-(4-(4-(4-Methoxyphenyl)piperazin-1-yl)phenyl)-13,13-dimethyl-10-(4-(4'-(trans-4-pentylcyclohexyl)-[1,1'-biphenyl]-4-ylcarboxamido)phenyl)-3-phenyl-6-(trifluoromethyl)-3,13-dihydro-indeno[2',3':3,4]naphtho[1,2-b]pyran;

(PCDC-a27) 3-(4-Butoxyphenyl)-3-(4-fluorophenyl)-13,13-dimethyl-10-(4-((((trans,trans-4'-pentyl-[1,1'-bi(cyclohexan)]-4-yl)oxy)carbonyl)phenyl)-6-(trifluoromethyl)-3,13-dihydro-indeno[2',3':3,4]naphtho[1,2-b]pyran;

(PCDC-a28) 3-(4-Fluorophenyl)-13-hydroxy-13-methyl-10-(4-(4'-(trans-4-pentylcyclohexyl)-[1,1'-biphenyl]-4-ylcarboxamido)phenyl)-3-(4-butoxyphenyl)-6-(trifluoromethyl)-3,13-dihydro indeno[2',3':3,4]naphtho[1,2-b]pyran;

(PCDC-a29) 3-(4-Methoxyphenyl)-13,13-dimethyl-10-(4-(4'-(trans-4-pentylcyclohexyl)-[1,1'-biphenyl]-4-ylcarboxamido)phenyl)-3-(4-(trifluoromethoxy)phenyl)-6-(trifluoromethyl)-3,13-dihydro-indeno[2',3':3,4]naphtho[1,2-b]pyran;

(PCDC-a30) 3,3-Bis(4-hydroxyphenyl)-10-[4-(4-(4-(trans-4-pentylcyclohexyl)phenyl)benzamido)phenyl]-6-trifluromethyl-13,13-dimethyl-3,13-dihydro-indeno[2',3':3,4]naphtho[1,2-b]pyran;

(PCDC-a31) 3-(4-morpholinophenyl)-3-phenyl-13,13-dimethyl-10-(4-(4'-(trans-4-pentylcyclohexyl)-[1,1'-biphenyl]-4-ylcarboxamido)phenyl)-6-(trifluoromethyl)-3,13-dihydro-indeno[2',3':3,4]naphtho[1,2-b]pyran;

(PCDC-a32) 3-(4-morpholinophenyl)-3-(4-fluorophenyl)-13,13-dimethyl-10-(4-(4'-(trans-4-pentylcyclohexyl)-[1,1'-biphenyl]-4-ylcarboxamido)phenyl)-6-(trifluoromethyl)-3,13-dihydro-indeno[2,3':3,4]naphtho[1,2-b]pyran;

(PCDC-a40) 12-Bromo-3-(4-butoxyphenyl)-3-(4-fluorophenyl)-13,13-dimethyl-10-(4-((4'-(trans-4-pentylcyclohexyl)-[1,1'-biphenyl]-4-carbonyl)oxy)benzamido)-6-(trifluoromethyl)-3,13-dihydro-indeno[2',3':3,4]naphtho[1,2-b]pyran;

(PCDC-a41) 3-(4-Butoxyphenyl)-5,7-dichloro-11-methoxy-3-(4-methoxyphenyl)-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;

(PCDC-a42) 3-(4-Butoxyphenyl)-3-(4-fluorophenyl)-13,13-dimethyl-10-(4-((4'-(trans-4-pentylcyclohexyl)-[1,1'-biphenyl]-4-carbonyl)oxy)benzamido)-6-(trifluoromethyl)-3,13-dihydro-indeno[2',3':3,4]naphtho[1,2-b]pyran;

(PCDC-a43) 5,7-Dichloro-3,3-bis(4-hydroxyphenyl)-11-methoxy-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;

(PCDC-a44) 6,8-Dichloro-3,3-bis(4-hydroxyphenyl)-11-methoxy-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;

(PCDC-a45) 3-(4-Butoxyphenyl)-5,8-difluoro-3-(4-fluorophenyl)-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;

(PCDC-a46) 3-(4-Butoxyphenyl)-3-(4-fluorophenyl)-13,13-dimethyl-10-(4-(4'-(trans-4-pentylcyclohexyl)-[1,1'-biphenyl]-4-carbonyl)piperazin-1-yl)-6-(trifluoromethyl)-3,13-dihydro-indeno[2',3':3,4]naphtho[1,2-b]pyran;

(PCDC-a47) 3-(4-Morpholinophenyl)-3-(4-methoxyphenyl)-10,7-bis[4-(4-(4-(trans-4-pentylcyclohexyl)phenyl)benzamido)phenyl]-5-fluoro-13,13-dimethyl-3,13-dihydro-indeno[2',3':3,4]naphtho[1,2-b]pyran;

(PCDC-a48) 3-(4-Morpholinophenyl)-3-(4-methoxyphenyl)-10-[4-(4-(4-(trans-4-pentylcyclohexyl)phenyl)benzamido)-2-(trifluoromethyl)phenyl]-13,13-dimethyl-3,13-dihydro-indeno[2',3':3,4]naphtho[1,2-b]pyran;

(PCDC-a49) 3,3-Bis(4-methoxyphenyl)-10-[4-(4-(4-(trans-4-pentylcyclohexyl)phenyl)benzamido)-2-(trifluoromethyl)phenyl]-13,13-dimethyl-3,13-dihydro-indeno[2',3':3,4]naphtho[1,2-b]pyran;

(PCDC-a50) 3-(4-Morpholinophenyl)-3-(4-methoxyphenyl)-10-[4-(4-(4-(trans-4-pentylcyclohexyl)phenyl)benzamido)-2-(trifluoromethyl)phenyl]-13,13-dimethyl-3,13-dihydro-indeno[2',3':3,4]naphtho[1,2-b]pyran;

(PCDC-a51) 3,3-Bis(4-methoxyphenyl)-13,13-dimethyl-10-(2-methyl-4-(trans-4-(((trans-4-pentylcyclohexyl)biphenyl-4-yloxy)carbonyl)cyclohexanecarboxamido)phenyl)-3,13-dihydro-indeno[2',3':3,4]naphtho[1,2-b]pyran;

(PCDC-a52) 3-(4-(4-(4-Butylphenyl)piperazin-1-yl)phenyl)-3-(4-methoxyphenyl)-13,13-dimethyl-10-(4-(4'-(trans-4-pentylcyclohexyl)biphenyl-4-ylcarboxamido)-2-(trifluoromethyl)phenyl)-3,13-dihydro-indeno[2',3':3,4]naphtho[1,2-b]pyran;

(PCDC-a53) 3-(4-(4-(4-Butylphenyl)piperazin-1-yl)phenyl)-3-(4-methoxyphenyl)-13,13-dimethyl-10-(2-methyl-4-(4'-(trans-4-pentylcyclohexyl)biphenyl-4-ylcarboxamido)phenyl)-7-(4-(trans-4-pentylcyclohexyl)benzamido)phenyl)-3,13-dihydro-indeno[2',3':3,4]naphtho[1,2-b]pyran;

(PCDC-a54) 3-(4-Methoxyphenyl)-13,13-dimethyl-7,10-bis(4-(4'-(trans-4-pentylcyclohexyl)biphenyl-4-ylcarboxamido)phenyl)-3-phenyl-3,13-dihydro-indeno[2',3':3,4]naphtho[1,2-b]pyran;

(PCDC-a55) 3-p-Tolyl-3-(4-methoxyphenyl)-6-methoxy-13,13-dimethyl-7-(4'-(trans,trans-4'-pentylbi(cyclohexane-4-)carbonyloxy)biphenylcarbonyloxy)-10-(4-(4'-(trans-4-pentylcyclohexyl)biphenyl-4-ylcarboxamido)phenyl)-3,13-dihydro-indeno[2',3':3,4]naphtho[1,2-b]pyran;

(PCDC-a56) 10-(4-(((3S,8S,9S,10R,13R,14S,17R)-10,13-Dimethyl-17-((R)-6-methylheptan-2-yl)-2,3,4,7,8,9,10,11,12,13,14,15,16,17-tetradecahydro-1H-cyclopenta[a]phenanthren-3-yloxy)carbonyl)piperazin-1-yl)-3-(4-methoxyphenyl)-13,13-dimethyl-3-(4-morpholinophenyl)-3,13-dihydro-indeno[2',3':3,4]naphtho[1,2-b]pyran;

(PCDC-a57) 6-Methoxy-3-(4-methoxyphenyl)-13,13-dimethyl-3-(4((S)-2-methylbutoxy)phenyl)-10-(4-(4'-(trans-4-pentylcyclohexyl)biphenyl-4-ylcarboxamido)phenyl)-3,13-dihydro-indeno[2',3':3,4]naphtho[1,2-b]pyran;

(PCDC-a58) 6-Methoxy-3-(4-methoxyphenyl)-13,13-dimethyl-3-(4-((S)-2-methylbutoxy)phenyl)-7-(4'-(trans,trans-4'-pentylbi(cyclohexane-4-)carbonyloxy)biphenylcarbonyloxy)-10-(4-(4'-(trans-4-pentylcyclohexyl)biphenyl-4-ylcarboxamido)phenyl)-3,13-dihydro-indeno[2',3':3,4]naphtho[1,2-b]pyran; and (PCDC-a59) 6-Methoxy-3-(4-methoxyphenyl)-13,13-dimethyl-3-(4-((S)-2-methylbutoxy)phenyl)-10-(4-(((3R,3aS,6S,6aS)-6-(4'-(trans-4-pentylcyclohexyl)biphenylcarbonyloxy)hexahydrofuro[3,2-b]furan-3-yloxy)carbonyl)phenyl)-3,13-dihydro-indeno[2',3':3,4]naphtho[1,2-b]pyran.

With some further embodiments, the photochromic-dichroic compounds of the photochromic articles of the present invention, can be chosen from the following:

(PCDC-b1) 3-(4-fluorophenyl)-3-(4-(piperidin-1-yl)phenyl)-13-methoxy-13-ethyl-6-methoxy-7-(4'-((4-(trans-4-pentylcyclohexyl)benzoyl)oxy)-[1,1'-biphenyl]-4-carbonyloxy)-3,13-dihydro-indeno[2',3':3,4]naphtho[1,2-b]pyran;

(PCDC-b2) 3-(4-fluorophenyl)-3-(4-(piperidin-1-yl)phenyl)-13-methoxy-13-ethyl-6-methoxy-7-(4-(4'-(4-(trans-4-pentylcyclohexyl)-[1,1'-biphenyl]-4-carbonyloxy)benzoyloxy))-3,13-dihydro-indeno[2',3':3,4]naphtho[1,2-b]pyran;

(PCDC-b3) 3,3-bis(4-methoxyphenyl)-13-methoxy-13-ethyl-6-methoxy-7-(4'-((4-(trans-4-pentylcyclohexyl)benzoyl)oxy)-[1,1'-biphenyl]-4-carbonyloxy)-3,13-dihydro-indeno[2',3':3,4]naphtho[1,2-b]pyran;

(PCDC-b4) 3,3-bis(4-methoxyphenyl)-13-methoxy-13-ethyl-6-methoxy-7-(4-(4'-(4-(trans-4-pentylcyclohexyl)-[1,1'-biphenyl]-4-carbonyloxy)benzoyloxy))-3,13-dihydro-indeno[2',3':3,4]naphtho[1,2-b]pyran;

(PCDC-b5) 3-(4-fluorophenyl)-3-(4-(piperidin-1-yl)phenyl)-13-methoxy-13-ethyl-6-methoxy-7-(4'-(4-(trans-4-pentylcyclohexyl)-[1,1'-biphenyl]-4-carbonyloxy))-3,13-dihydro-indeno[2',3':3,4]naphtho[1,2-b]pyran;

(PCDC-b6) 3,3-bis(4-methoxyphenyl)-13-methoxy-13-ethyl-6-methoxy-7-((trans,trans)-4'-pentyl-[1,1'-bi(cyclohexane)]-4-carbonyloxy)-3,13-dihydro-indeno[2',3':3,4]naphtho[1,2-b]pyran;

(PCDC-b7) 3,3-bis(4-fluorophenyl)-13-methoxy-13-ethyl-6-methoxy-7-(4'-(4'-(trans-4-pentylcyclohexyl)-[1,1'-biphenyl]-4-carbonyloxy)-[1,1'-biphenyl]-4-carbonyloxy)-3,13-dihydro-indeno[2',3':3,4]naphtho[1,2-b]pyran;

(PCDC-b8) 3-(4-methoxyphenyl)-3-(4-(piperidin-1-yl)phenyl)-13-methoxy-13-ethyl-6-methoxy-7-(4'-(4'-(trans-4-pentylcyclohexyl)-[1,1'-biphenyl]-4-carbonyloxy)-[1,1'-biphenyl]-4-carbonyloxy)-3,13-dihydro-indeno[2',3':3,4]naphtho[1,2-b]pyran;

(PCDC-b9) 3-(4-methoxyphenyl)-3-(4-morpholinophenyl)-13-methoxy-13-ethyl-6-methoxy-7-(4'-(4'-(trans-4-pentylcyclohexyl)-[1,1'-biphenyl]-4-carbonyloxy)-[1,1'-biphenyl]-4-carbonyloxy)-3,13-dihydro-indeno[2',3':3,4]naphtho[1,2-b]pyran;

(PCDC-b10) 3-(4-(4-methoxyphenyl)piperazin-1-yl)-3-phenyl-13-methoxy-13-ethyl-6-methoxy-7-(4'-(4-(2-hydroxyethoxy)benzoyloxy)-[1,1'-biphenyl]-4-carbonyloxy)-[1,1'-biphenyl]-4-carbonyloxy)-3,13-dihydro-indeno[2',3':3,4]naphtho[1,2-b]pyran;

(PCDC-b11) 3,3-bis(4-methoxyphenyl)-13-methoxy-13-ethyl-6-methoxy-7-(3-phenylpropioloyloxy)-3,13-dihydro-indeno[2',3':3,4]naphtho[1,2-b]pyran;

(PCDC-b12) 3,3-bis(4-methoxyphenyl)-13-methoxy-13-ethyl-6-methoxy-7-(2-methyl-4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;

(PCDC-b13) 3,3-bis(4-methoxyphenyl)-6,13-dimethoxy-7-(4-(4-(trans,trans-4'-pentyl-[1,1'-bi(cyclohexane)]-4-carbonyloxy)phenyl)piperazin-1yl)-13-trifluoromethyl-3,13-dihydro-indeno[2',3':3,4]naphtho[1,2-b]pyran;

(PCDC-b14) 3,3-bis(4-methoxyphenyl)-6-methoxy-7-(4-(4-(trans,trans-4'-pentyl-[1,1'-bi(cyclohexane)]-4-carbonyloxy)phenyl)piperazin-1yl)-13-hydroxy-13-trifluoromethyl-3,13-dihydro-indeno[2',3':3,4]naphtho[1,2-b]pyran;

(PCDC-b15) 3,3-bis(4-methoxyphenyl)-6,7-di(4-(4-(trans,trans-4'-pentyl-[1,1'-bi(cyclohexane)]-4-carbonyloxy)phenyl)piperazin-1yl)-13-methoxy-13-trifluoromethyl-3,13-dihydro-indeno[2',3':3,4]naphtho[1,2-b]pyran;

(PCDC-b16) 3,3-bis(4-methoxyphenyl)-6-methoxy-7-(4-(4-((trans,trans)-4'-pentyl-[1,1'-bi(cyclohexane)]-4-carbonyloxy)phenyl)piperazin-1-yl)-13-fluoro-13-trifluoromethyl-3,13-dihydro-indeno[2',3':3,4]naphtho[1,2-b]pyran;

(PCDC-b17) 3-(4-fluorophenyl)-3-(4-(piperidin-1-yl)phenyl)-7-(2-methyl-4-(4'-(trans-4-pentylcyclohexyl)-[1,1'-biphenyl]-4-ylcarboxamido)phenyl)-11-trifluoromethyl-13,13-dimethyl-3,13-dihydro-indeno[2',3':3,4]naphtho[1,2-b]pyran;

(PCDC-b18) 3-(4-butoxyphenyl)-3-(4-methoxyphenyl)-7-(2-methyl-4-(4'-(trans-4-pentylcyclohexyl)-[1,1'-biphenyl]-4-ylcarboxamido)phenyl)-11-trifluoromethyl-13,13-dimethyl-3,13-dihydro-indeno[2',3':3,4]naphtho[1,2-b]pyran;

(PCDC-b19) 3-(4-(N-morpholinyl)phenyl)-3-phenyl-7-(4-(4'-(trans-4-pentylcyclohexyl)-[1,1'-biphenyl]-4-ylcarboxamido)phenyl)-10,12-difluoro-13,13-dimethyl-3,13-dihydro-indeno[2',3':3,4]naphtho[1,2-b]pyran;

(PCDC-b20) 3-(4-fluorophenyl)-3-(4-(piperidin-1-yl)phenyl)-7-(4-(4'-(trans-4-pentylcyclohexyl)-[1,1'-biphenyl]-4-ylcarboxamido)phenyl)-10,12-difluoro-13,13-dimethyl-3,13-dihydro-indeno[2',3':3,4]naphtho[1,2-b]pyran;

(PCDC-b21) 3,3-bis(4-methoxyphenyl)-6-methoxy-7-(2-methyl-4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b22) 3,3-bis(4-methoxyphenyl)-6-methoxy-7-(4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b23) 3,3-bis(4-methoxyphenyl)-6-methoxy-7-(2-methyl-4-(4-(4-(trans-4-pentylcyclohexyl)benzamido)phenyl)phenyl)-10,12-di(trifluoromethyl)-13,13-dimethyl-3,13-dihydro-indeno[2',3':3,4]naphtho[1,2-b]pyran;

(PCDC-b24) 3,3-b is(4-methoxyphenyl)-6-methoxy-7-(2-methyl-4-(4-(4-(trans-4-pentylcyclohexyl)benzamido)benzamido)phenyl)-10,12-di(trifluoromethyl)-13,13-dimethyl-3,13-dihydro-indeno[2',3':3,4]naphtho[1,2-b]pyran;

(PCDC-b25) 3-(4-methoxyphenyl)-3-phenyl-6-methoxy-7-(2-methyl-4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b26) 3-(4-methoxyphenyl)-3-phenyl-6-methoxy-7-(2-methyl-4-(4-(4-(trans-4-pentylcyclohexyl)benzamido)phenyl)phenyl)-10,12-di(trifluoromethyl)-13,13-dimethyl-3,13-dihydro-indeno[2',3':3,4]naphtho[1,2-b]pyran;

(PCDC-b27) 3-(4-methoxyphenyl)-3-phenyl-6-methoxy-7-(2-methyl-4-(((trans,trans)-4'-pentyl-[1,1'-bi(cyclohexane)]-4-carboxamido)benzamido)phenyl)-10,12-di(trifluoromethyl)-13,13-dimethyl-3,13-dihydro-indeno[2',3':3,4]naphtho[1,2-b]pyran;

(PCDC-b28) 3-(4-methoxyphenyl)-3-phenyl-6-methoxy-7-(2-methyl-4-(((4'-(trans-4-pentylcyclohexyl)-[1,1'-biphenyl]-4-yl)oxy)carbonyl)cyclohexanecarboxamido)phenyl)-10,12-di(trifluoromethyl)-13,13-dimethyl-3,13-dihydro-indeno[2',3':3,4]naphtho[1,2-b]pyran;

(PCDC-b29) 3-(4-N-morpholinylphenyl)-3-phenyl-6-methoxy-7-(2-methyl-4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b30) 3-(4-N-morpholinophenyl)-3-phenyl-6-methoxy-7-(2-methyl-4-(((4'-(trans-4-pentylcyclohexyl)-[1,1'-biphenyl]-4-yl)oxy)carbonyl)cyclohexanecarboxamido)phenyl)-10,12-di(trifluoromethyl)-13,13-dimethyl-3,13-dihydro-indeno[2',3':3,4]naphtho[1,2-b]pyran;

(PCDC-b31) 3-(4-N-morpholinophenyl)-3-phenyl-6-methoxy-7-(4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b32) 3-(4-N-morpholinophenyl)-3-(4-methoxyphenyl)-6-methoxy-7-(2-methyl-4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b33) 3-(4-N-morpholinophenyl)-3-(4-methoxyphenyl)-6-methoxy-7-(4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b34) 3-phenyl-3-(4-(piperidin-1-yl)phenyl)-6-methoxy-7-(4-(4-(trans-4-pentylcyclohexyl)benzamido)-2-(trifluoromethyl)phenyl)-10,12-di(trifluoromethyl)-13,13-dimethyl-3,13-dihydro-indeno[2',3':3,4]naphtho[1,2-b]pyran;

(PCDC-b35) 3,3-bis(4-fluorophenyl)-6-methoxy-7-(4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b36) 3,3-bis(4-fluorophenyl)-6-methoxy-7-(trans-4-(4'-(trans-4-pentylcyclohexyl)-[1,1'-biphenyl]-4-yloxycarbonyl)cyclohexanecarbonyloxy)-10,12-di(trifluoromethyl)-13,13-dimethyl-3,13-dihydro-indeno[2',3':3,4]naphtho[1,2-b]pyran;

(PCDC-b37) 3-(4-(piperidin-1-yl)phenyl)-3-phenyl-6-methoxy-7-(trans-4-(4'-(trans-4-pentylcyclohexyl)-[1,1'-biphenyl]-4-yloxycarbonyl)cyclohexanecarbonyloxy)-10,12-di(trifluoromethyl)-13,13-dimethyl-3,13-dihydro-indeno[2',3':3,4]naphtho[1,2-b]pyran;

(PCDC-b38) 3-(4-(N-morpholino)phenyl)-3-phenyl-6-methoxy-7-(trans-4-(4'-(trans-4-pentylcyclohexyl)-[1,1'-biphenyl]-4-yloxycarbonyl)cyclohexanecarbonyloxy)-10,12-di(trifluoromethyl)-13,13-dimethyl-3,13-dihydro-indeno[2',3':3,4]naphtho[1,2-b]pyran;

(PCDC-b39) 3-(4-(N-morpholino)phenyl)-3-phenyl-6-methoxy-7-(4-(4-((trans,trans)-4'-pentyl-[1,1'-bi(cyclohexane)]-4-carbonyloxy)phenyl)benzoyloxy)-10,12-di(trifluoromethyl)-13,13-dimethyl-3,13-dihydro-indeno[2',3':3,4]naphtho[1,2-b]pyran;

(PCDC-b40) 3,3-bis(4-methoxyphenyl)-6-methoxy-7-(4-(4-((trans,trans)-4'-pentyl-[1,1'-bi(cyclohexane)]-4-carbonyloxy)phenyl)benzoyloxy)-10,12-di(trifluoromethyl)-13,13-dimethyl-3,13-dihydro-indeno[2',3':3,4]naphtho[1,2-b]pyran;

(PCDC-b41) 3-(4-fluorophenyl)-3-(4-(piperidin-1-yl)phenyl)-6-methoxy-7-(4-(4-((trans, trans)-4'-pentyl-[1,1'-bi(cyclohexane)]-4-carbonyloxy)phenyl)benzoyloxy)-10,12-di(trifluoromethyl)-13,13-dimethyl-3,13-dihydro-indeno[2',3':3,4]naphtho[1,2-b]pyran;

(PCDC-b42) 3-(4-fluorophenyl)-3-(4-(piperidin-1-yl)phenyl)-6-methoxy-7-(trans-4-(4'-(trans-4-pentylcyclohexyl)-[1,1'-biphenyl]-4-yloxycarbonyl)cyclohexanecarbonyloxy)-10,12-di(trifluoromethyl)-13,13-dimethyl-3,13-dihydro-indeno[2',3':3,4]naphtho[1,2-b]pyran;

(PCDC-b43) 3,3-bis(4-methoxyphenyl)-6,13-dimethoxy-7-(trans-4-(4'-(trans-4-pentylcyclohexyl)-[1,1'-biphenyl]-4-yloxycarbonyl)cyclohexanecarbonyloxy)-13-ethyl-3,13-dihydro-indeno[2',3':3,4]naphtho[1,2-b]pyran;

(PCDC-b44) 3,3-bis(4-methoxyphenyl)-6-methoxy-7-(4-(4-(trans,trans-4'-pentyl-[1,1'-bi(cyclohexane)]-4-carbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b45) 3,3-bis(4-hydroxyphenyl)-6-methoxy-7-(4-(4-(trans,trans-4'-pentyl-[1,1'-bi(cyclohexane)]-4-carbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b46) 3,3-bis(4-fluorophenyl)-6-methoxy-7-(4-(4-(trans,trans-4'-pentyl-[1,1'-bi(cyclohexane)]-4-carbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b47) 3-(4-methoxyphenyl)-3-(4-N-morpholinophenyl)-6-methoxy-7-(4-(4-(trans,trans-4'-pentyl-[1,1'-bi(cyclohexane)]-4-carbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b48) 3,3-bis(4-methoxyphenyl)-6-methoxy-7-(4-(4-(trans-4-(4'-(trans-4-pentylcyclohexyl)-[1,1'-biphenyl]-4-yloxycarbonyl)cyclohexanecarbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b49) 3,3-bis(4-methoxyphenyl)-6-methoxy-7-(4-(4-(trans-4-(4-(trans-4-pentylcyclohexyl)-phenyloxycarbonyl)-cyclohexanecarbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b50) 3,3-bis(4-methoxyphenyl)-7-(4-(4-(trans-4-pentylcyclohexyl)phenoxycarbonyl)phenyl)-11-methyl-13,13-dimethyl-3,13-dihydro-indeno[2',3':3,4]naphtho[1,2-b]pyran;

(PCDC-b51) 3-(4-fluorophenyl)-3-(4-(piperidin-1-yl)phenyl)-6-methyl-7-(4-(4'-(trans-4-pentylcyclohexyl)-[1,1'-biphenyl]-4-ylcarboxamido)phenyl)-11-trifluoromethyl-13,13-dimethyl-3,13-dihydro-indeno[2',3':3,4]naphtho[1,2-b]pyran;

(PCDC-b52) 3,3-bis(4-hydroxyphenyl)-6-methyl-7-(4'-(trans-4-pentylcyclohexyl)-[1,1'-biphenyl]-4-ylcarboxamido)phenyl)-11-trifluoromethyl-13,13-dimethyl-3,13-dihydro-indeno[2',3':3,4]naphtho[1,2-b]pyran;

(PCDC-b53) 3,3-bis(4-methoxyphenyl)-6-methoxy-7-(4-(4-(trans,trans-4'-pentyl-[1,1'-bi(cyclohexane)]-4-carbonyloxy)phenyl)piperazin-1-yl)-11-trifluoromethyl-13,13-dimethyl-3,13-dihydro-indeno[2',3':3,4]naphtho[1,2-b]pyran;

(PCDC-b54) 3-(4-(4-methoxyphenyl)piperazin-1-yl)-3-phenyl-6-methoxy-7-(4-((4-(trans-4-propylcyclohexyl)phenoxy)carbonyl)phenyloxycarbonyl)-13,13-dimethyl-3,13-dihydro-indeno[2',3':3,4]naphtho[1,2-b]pyran; and (PCDC-b55) 3,3-bis(4-methoxyphenyl)-7-(4-([1,1':4',1''-terphenyl]-4-ylcarbamoyl)piperazin-1-yl)-6,13-dimethoxy-13-trifluoromethyl-3,13-dihydro-indeno[2',3':3,4]naphtho[1,2-b]pyran.

More generally, the photochromic-dichroic compounds of the photochromic articles of the present invention include: (a) at least one photochromic group (PC), which can be chosen from, for example, pyrans, oxazines, and fulgides; and (b) at least one lengthening agent or group attached to the photochromic group. Such photochromic-dichroic compounds are described in detail in U.S. Pat. No. 7,342,112 B1 at column 5, line 35 to column 14, line 54; and Table 1, the cited portions of which are incorporated by reference herein. Other suitable photochromic compounds and reaction schemes for their preparation can be found in U.S. Pat. No. 7,342,112 B1 at column 23, line 37 to column 78, line 13, the cited portions of which are incorporated by reference herein.

The photochromic-dichroic layer can include a single layer or multiple layers each including a photochromic-dichroic compound that can be the same or different. The photochromic-dichroic layer can be formed by art-recognized methods including, but not limited to: lamination, such as of one or more plastic sheets or films; in-mold formation, such as in-mold coating; film casting; and coating methods. With some embodiments the photochromic-dichroic layer is formed from a photochromic-dichroic coating composition. The photochromic-dichroic coating composition can be a curable photochromic-dichroic coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; or actinic radiation, such as in the case of ultraviolet light curable coating compositions.

The photochromic-dichroic layer typically includes an organic matrix, such as a thermoplastic organic matrix and/or a crosslinked organic matrix. At least a portion of the organic matrix of the photochromic-dichroic layer can in some embodiments include anisotropic materials, such as liquid crystal materials, additives, oligomers, and/or polymers, as will be discussed in further detail herein. Additionally or alternatively to an organic matrix, the photochromic-dichroic layer can include an inorganic matrix, including, for example, silane linkages, siloxane linkages and/or titanate linkages. The organic matrix of the photochromic-dichroic layer can include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The photochromic-dichroic layer can have any suitable thickness. With some embodiments, the photochromic-dichroic layer has a thickness of from 0.5 to 50 microns, such as from 1 to 45 microns, or from 2 to 40 microns, or from 5 to 30 microns, or from 10 to 25 microns.

With some embodiments, the photochromic-dichroic layer, of the photochromic article, further includes a phase-separated polymer that includes: a matrix phase that is at least partially ordered; and a guest phase that is at least partially ordered. The guest phase includes the photochromic-dichroic compound, and the photochromic-dichroic compound is at least partially aligned with at least a portion of the guest phase.

In accordance with further embodiments of the present invention, the photochromic-dichroic layer further includes an interpenetrating polymer network that includes: an anisotropic material that is at least partially ordered, and a polymeric material. The anisotropic material includes the photochromic-dichroic compound, and the photochromic-dichroic compound is at least partially aligned with at least a portion of the anisotropic material.

With some embodiments of the present invention, the photochromic-dichroic layer also includes an anisotropic material. As used herein the term "anisotropic" means having at least one property that differs in value when measured in at least one different direction. Accordingly, "anisotropic materials" are materials that have at least one property that differs in value when measured in at least one different direction. Non-limiting examples of anisotropic materials that can be included in the photochromic-dichroic layer include, but are not limited to, those liquid crystal materials as described further herein with regard to the optional alignment layer of the photochromic articles of the present invention.

With some embodiments, the photochromic-dichroic layer: (i) includes liquid crystal oligomers and/or polymers prepared at least in part from the monomeric mesogenic compounds; and/or (ii) includes the mesogenic compounds, in each case as disclosed in Table 1 of U.S. Pat. No. 7,910,019 B2 at columns 43-90 thereof, which disclosure is incorporated herein by reference.

In accordance with some embodiments of the present invention, the photochromic-dichroic compound, of the photochromic-dichroic layer, can be at least partially aligned by interaction with the anisotropic material, which itself is at least partially ordered. For example, although not limiting herein, at least a portion of the photochromic-dichroic compound can be aligned such that the long-axis of the photochromic-dichroic compound in the dichroic state is essentially parallel to the general direction of the anisotropic material. Further, although not required, the photochromic-dichroic compound can be bound to or reacted with at least a portion of the at least partially ordered anisotropic material.

Methods of ordering, or introducing order into, the anisotropic material of the photochromic-dichroic layer include, but are not limited to, exposing the anisotropic material to at least one of a magnetic field, an electric field, linearly polarized ultraviolet radiation, linearly polarized infrared radiation, linearly polarized visible radiation, and a shear force. Alternatively or additionally, the anisotropic material can be at least partially ordered by aligning at least a portion of the anisotropic material with another material or structure. For example, the anisotropic material can be at least partially ordered by aligning the anisotropic material with an alignment layer (or an orientation facility) such as, but not limited to, those alignment layers as described in further detail herein below.

By ordering at least a portion of the anisotropic material, it is possible to at least partially align at least a portion of the photochromic-dichroic compound that is contained within or otherwise connected to the anisotropic material of the photochromic-dichroic layer. Although not required, the photochromic-dichroic compound can be at least partially aligned while in an activated state. With some embodiments, ordering of the anisotropic material and/or aligning the photochromic-dichroic compound can occur prior to, during, or after application of the photochromic-dichroic layer over the primer layer.

The photochromic-dichroic compound and the anisotropic material can be aligned and ordered during application of the photochromic-dichroic layer over the primer layer. For example, the photochromic-dichroic layer can be applied using a coating technique that introduces a shear force to the anisotropic material during application, such that the anisotropic material becomes at least partially ordered generally parallel to the direction of the applied shear force. For purposes of non-limiting illustration, a solution or mixture (optionally in a solvent or carrier) including the photochromic-dichroic compound and the anisotropic material can be curtain coated over the primer layer, such that shear forces are introduced to the materials being applied due to relative movement of the surface of the substrate with respect to the materials being applied. An example of a coating process that can introduce at least sufficient shear forces is a curtain coating process. The shear forces can cause at least a portion of the anisotropic material to be ordered in a general direction that is substantially parallel to the direction of the movement of the surface. As discussed above, by ordering at least a portion of the anisotropic material in this manner, at least a portion of the photochromic-dichroic compound can be aligned. In addition, and optionally, by exposing at least a portion of the photochromic-dichroic compound to actinic radiation during the curtain coating process, so as to convert the photochromic-dichroic compound to an activated state, at least partial alignment of the photochromic-dichroic compound while in the activated state can also be achieved.

The photochromic-dichroic compound and the anisotropic material can be aligned and ordered after application of the photochromic-dichroic layer over the primer layer. For example, a solution or mixture of the photochromic-dichroic compound and the anisotropic material (optionally in a solvent or carrier) can be spin-coated over at least a portion of the primer layer. Thereafter, at least a portion of the anisotropic material can be ordered, for example, by exposing the anisotropic material to a magnetic field, an electric field, linearly polarized ultraviolet radiation, linearly polarized infrared radiation, linearly polarized visible radiation, and/or a shear force. Alternatively or additionally, the anisotropic material can be at least partially ordered by alignment thereof with another material or structure, such as an alignment layer.

The photochromic-dichroic compound and the anisotropic material can be aligned and ordered prior to application of the photochromic-dichroic layer over the primer layer. For example, a solution or mixture (optionally in a solvent or carrier) of the photochromic-dichroic compound and the anisotropic material can be applied over an ordered polymeric sheet to form a layer thereover. Thereafter, at least a portion of the anisotropic material can be allowed to align with the underlying ordered polymeric sheet. The polymeric sheet can be subsequently applied over the primer layer by, for example, art-recognized laminating or bonding methods. Alternatively, the ordered photochromic-dichroic layer can be transferred from the polymeric sheet to/over the primer layer by art-recognized method, such as hot stamping.

With some embodiments, the photochromic-dichroic layer can include a phase-separated polymer that includes: a matrix phase; and a guest phase distributed in the matrix phase. The matrix phase can include an at least partially ordered liquid crystal polymer. The guest phase can include the at least partially ordered anisotropic material and at least a portion of the photochromic-dichroic compound, which can be at least partially aligned. The at least partially aligned photochromic-dichroic compound can be at least partially aligned by interaction with the at least partially ordered anisotropic material.

With some embodiments, a phase-separating polymer system including, a matrix phase forming material that includes a liquid crystal material, and a guest phase forming material that includes the anisotropic material and the photochromic-dichroic compound, is applied over the primer layer. After applying the phase-separating polymer system, at least portion of the liquid crystal material of the matrix phase and at least a portion of the anisotropic material of the guest phase are at least partially ordered, such that at least a portion of the photochromic-dichroic compound is aligned with at least a portion of the at least partially ordered anisotropic material of the guest phase. Methods of ordering the matrix phase forming material and the guest phase forming material of the phase-separating polymer system include, but are not limited to, exposing the applied layer to at least one of: a magnetic field, an electric field, linearly polarized infrared radiation, linearly polarized ultraviolet radiation, linearly polarized visible radiation, and a shear force. Alternatively or additionally, ordering the matrix phase forming material and the guest phase forming material can include alignment thereof by interaction with an underlying alignment layer, as described in further detail herein.

After ordering the matrix phase forming material and the guest phase forming material, the guest phase forming material can be separated from the matrix phase forming material by polymerization induced phase separation and/or solvent induced phase separation. Although the separation of the matrix and guest phase forming materials is described herein in relation to the guest phase forming material separating from the matrix phase forming material, it should be appreciated that this language is intended to cover any separation between the two phase forming materials. That is, this language is intended to cover separation of the guest phase forming material from the matrix phase forming material and separation of the matrix phase forming material from the guest phase forming material, as well as, simultaneous separation of both phase forming materials and any combination thereof.

According to some embodiments, the matrix phase forming material can include a liquid crystal material chosen form liquid crystal monomers, liquid crystal pre-polymers, and liquid crystal polymers. The guest phase forming material can, with some embodiments, include a liquid crystal material chosen from liquid crystal mesogens, liquid crystal monomers, and liquid crystal polymers and pre-polymers. Examples of such materials include, but are not limited to, those described above, and further herein with regard to the optional alignment layer.

With some embodiments, the phase-separating polymer system can include, a mixture of a matrix phase forming material that includes a liquid crystal monomer, a guest phase forming material that includes liquid crystal mesogens and the photochromic-dichroic compound. With this embodiment, causing the guest phase forming material to separate from the matrix phase forming material can include polymerization induced phase-separation. Typically, the liquid crystal monomer of the matrix phase can be polymerized and thereby separated from at least a portion of the liquid crystal mesogens of the guest phase forming material. Examples of polymerization methods include, but are not limited to, photo-induced polymerization and thermally-induced polymerization.

With some further embodiments, the phase-separating polymer system can include, a mixture of a matrix phase forming material that includes a liquid crystal monomer, a guest phase forming material that includes a low viscosity liquid crystal monomer having a different functionality from the liquid crystal monomer of the matrix phase, and the photochromic-dichroic compound. As used herein, the term "low viscosity liquid crystal monomer," refers to a liquid crystal monomer mixture or solution that is freely flowing at room temperature. Typically, causing the guest phase forming material to separate from the matrix phase forming material includes polymerization induced phase-separation. For example, at least a portion of the liquid crystal monomer of the matrix phase can be polymerized under conditions that do not cause the liquid crystal monomer of the guest phase to polymerize. During polymerization of the matrix phase forming material, the guest phase forming material typically separates from the matrix phase forming material. Thereafter, the liquid crystal monomer of the guest phase forming material can be polymerized in a separate polymerization process.

The phase-separating polymer system can include, with some embodiments, a solution in at least one common solvent of a matrix phase forming material that includes a liquid crystal polymer, a guest phase forming material that includes a liquid crystal polymer that is different from the liquid crystal polymer of the matrix phase forming material, and the photochromic-dichroic compound. Causing the guest phase forming material to separate from the matrix phase forming material typically includes solvent induced phase-separation. Typically, at least a portion of the common solvent is evaporated from the mixture of liquid crystal polymers, thereby causing the two phases to separate from each other.

With further embodiments, the photochromic-dichroic layer can include an interpenetrating polymer network. The at least partially ordered anisotropic material and a polymeric material can form an interpenetrating polymer network, in which at least a portion of the polymeric material interpenetrates with at least a portion of the at least partially ordered anisotropic material. As used herein the term "interpenetrating polymer network" means an entangled combination of polymers, at least one of which is cross-linked, that are not bonded to each other. Thus, as used herein, the term interpenetrating polymer network includes semi-interpenetrating polymer networks. For example, see L. H. Sperling, *Introduction to Physical Polymer Science*, John Wiley & Sons, New York (1986) at page 46. In addition, at least a portion of the at least one at least partially aligned photochromic-dichroic compound can be at least partially aligned with the at least partially ordered anisotropic material. Still further, the polymeric material can be isotropic or anisotropic, provided that, on the whole, the photochromic-dichroic layer is anisotropic. Methods of forming such photochromic-dichroic layers are described in more detail herein below.

According to some embodiments, the anisotropic material can be adapted to allow the photochromic-dichroic compound to switch from a first state to a second state at a desired rate. In general, conventional photochromic compounds can undergo a transformation from one isomeric form to another in response to actinic radiation, with each isomeric form having a characteristic absorption spectrum. The photochromic-dichroic compounds of the photochromic articles of the present invention undergo a similar isomeric transformation. Without intending to be bound by any theory, the rate or speed at which this isomeric transformation (and the reverse transformation) occurs depends, in part, upon the properties of the local environment surrounding the photochromic-dichroic compound (i.e., the "host"). Although not limiting herein, it is believed based on the evidence at hand that the rate of transformation of the photochromic-dichroic compound depends, in part, upon the flexibility of the chain segments of the host, and more particularly on the mobility or viscosity of the chain segments of the host. Correspondingly it is believed, without intending to be bound by any theory, that the rate of transformation of the photochromic-dichroic compound is generally faster in hosts having flexible chain segments than in hosts having stiff or rigid chain segments. As such, and in accordance with some embodiments, when the anisotropic material is a host, the anisotropic material can be adapted to allow the photochromic-dichroic compound to transform between various isomeric states at desired rates. For example, the anisotropic material can be adapted by adjusting the molecular weight and/or the crosslink density of the anisotropic material.

With some embodiments, the photochromic-dichroic layer includes a phase-separated polymer that includes a matrix phase including a liquid crystal polymer, and guest phase distributed within the matrix phase. The guest phase can include the anisotropic material. Typically, a majority of the photochromic-dichroic compound can be contained within the guest phase of the phase-separated polymer. As previously discussed, because the transformation rate of the photochromic-dichroic compound depends, in part, on the host in which it is contained, the rate of transformation of the photochromic-dichroic compound depends, substantially, on the properties of the guest phase.

With some embodiments, and as discussed in further detail herein, the photochromic articles of the present invention can include an alignment layer (also referred to as an alignment or orientation facility) that is interposed between the primer layer and the photochromic-dichroic compound layer. The phase-separated polymer of the photochromic-dichroic layer, can include a matrix phase, at least a portion of which is at least partially aligned with the alignment layer, and a guest phase including an anisotropic material, in which the guest phase is dispersed within the matrix phase. At least a portion of the anisotropic material of the guest phase can be at least partially aligned with at least portion of the alignment layer, and the photochromic-dichroic compound can be at least partially aligned with at least a portion of the anisotropic material. In addition, the matrix phase of the phase-separated polymer can include a liquid crystal polymer, and the anisotropic material of the guest phase can be chosen from liquid crystal polymers and liquid crystal mesogens. Non-limiting examples of such materials are set forth in detail above. When including a phase-separated polymer as described, the photochromic-dichroic layer can be substantially haze-free. Haze is defined as the percentage of transmitted light that deviates from the incident beam by more than 2.5 degrees on average according to ASTM D 1003 Standard Test Method of Haze and Luminous Transmittance of Transparent Plastics. An example of an instrument on which haze measurements according to ASTM D 1003 can be made is Haze-Gard Plus™ made by BYK-Gardener.

In accordance with some embodiments, the photochromic-dichroic compound can be encapsulated or overcoated with an anisotropic material having relatively flexible chain segments, such as a liquid crystal material, and thereafter dispersed or distributed in another material having relatively rigid chain segments. The encapsulating anisotropic material can be at least partially ordered. For example, the encapsulated photochromic-dichroic compound can be dispersed or distributed in a liquid crystal polymer having relatively rigid chain segments and thereafter the mixture can be applied to a substrate to form the photochromic-dichroic layer.

With further embodiments, the photochromic-dichroic layer can be a polymeric sheet that contains a photochromic-dichroic compound. The polymeric sheet can be uniaxially or biaxially stretched. Stretching of the polymeric sheet typically results in alignment and ordering of the photochromic-dichroic material therein. The photochromic-dichroic layer can, with some embodiments, include two or more polymeric sheets each containing a photochromic-dichroic compound, in which each sheet can be stretched in the same direction or in different (e.g., orthogonal) directions.

Examples of polymeric sheets that can be used as or to form the photochromic-dichroic layer include, but are not limited to, stretched (e.g., uniaxially or biaxially stretched) polymer sheets, ordered liquid crystal polymer sheets, and photo-oriented polymer sheets. Examples of polymeric materials, other than liquid crystal materials and photo-orientation materials that can be used in forming polymeric sheets of the photochromic-dichroic layer include, but are not limited to: polyvinyl alcohol, polyvinyl chloride, polyurethane, polyacrylate, and polycaprolactam. Non-limiting examples of methods of at least partially ordering polymeric sheets are described below in more detail.

In accordance with some embodiments, the photochromic-dichroic layer can be formed by applying at least one anisotropic material over the primer layer, imbibing the photochromic-dichroic compound into the previously applied anisotropic material, ordering the anisotropic material, and aligning the photochromic-dichroic compound with at least a portion of the ordered anisotropic material. The anisotropic material can be ordered before, during or after inhibition with the photochromic-dichroic compound. The photochromic-dichroic compound can be aligned while in an activated state, with some embodiments.

Imbibing the photochromic-dichroic compound into the previously applied anisotropic material can involve, with some embodiments, applying a solution or mixture of the photochromic-dichroic compound in a carrier to the previously applied anisotropic material, and allowing the photochromic-dichroic compound to diffuse into the anisotropic material, for example with or without heating. The previously applied anisotropic material can be part of a phase-separated polymer coating, as describe above.

The photochromic articles of the present invention include a primer layer (e.g., primer layer 14 of FIG. 1). The primer layer can include a single layer or multiple layers each including a first photochromic compound that can be the same or different. The primer layer typically includes an organic matrix, such as a thermoplastic organic matrix and/or a crosslinked organic matrix. Additionally or alternatively to an organic matrix, the primer layer can include an inorganic matrix, including, for example, silane linkages, siloxane linkages and/or titanate linkages. The organic matrix can include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The primer layer can be formed by art-recognized methods including, but not limited to: lamination, such as of one or more plastic sheets or films; in-mold formation, such as in-mold coating; film casting; and coating methods. Typically, the primer layer is formed from a primer coating composition. The primer coating composition can be a curable primer coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; or actinic radiation, such as in the case of ultraviolet light curable coating compositions.

The primer layer can have any suitable thickness. With some embodiments, the primer has a thickness of from 0.5 microns to 20 microns, such as from 1 to 10 microns, or from 2 to 8 microns, or from 3 to 5 microns, inclusive of the recited values.

With some embodiments, the primer layer includes an organic matrix that includes urethane linkages. In accordance with some embodiments, the primer layer containing urethane linkages is formed from a curable coating composition that includes: a (meth)acrylate copolymer having active hydrogen functionality selected from hydroxyl, thiol, primary amine, secondary amine, and combinations thereof; blocked isocyanate, such as diisocyanate and/or triisocyanate blocked with a suitable blocking or leaving group, such as, 3,5-dimethyl pyrazole; and one or more additives, including, but not limited to, adhesion promoters, coupling agents, ultraviolet light absorbers, thermal stabilizers, catalysts, free radical scavengers, plasticizers, flow additives, and/or static tints or static dyes (i.e., tints or dyes that are not photochromic).

Examples of (meth)acrylate monomers from which the active hydrogen functional (meth)acrylate copolymer can be prepared include, but are not limited to, $C_1$-$C_{20}$ (meth)acrylates, $C_1$-$C_{20}$ (meth)acrylates having at least one active hydrogen group selected from hydroxyl, thiol, primary amine, and secondary amine. The $C_1$-$C_{20}$ groups of the (meth)acrylates can be selected from, for example, $C_1$-$C_{20}$ linear alkyl, $C_3$-$C_{20}$ branched alkyl, $C_3$-$C_{20}$ cycloalkyl, $C_3$-$C_{20}$ fused ring polycycloalkyl, $C_5$-$C_{20}$ aryl, and $C_{10}$-$C_{20}$ fused ring aryl.

Additional polyols that can be used in the primer coating compositions from which the primer layer is prepared include, but are not limited to, art-recognized materials, such as described in U.S. Pat. No. 7,465,414 at column 15, line 22 through column 16, line 62, which disclosure is incorporated herein by reference. Isocyanates that can be used in the primer coating compositions from which the primer layer is prepared include, but are not limited to, art-recognized materials, such as described in U.S. Pat. No. 7,465,414 at column 16, line 63 through column 17, line 38, which disclosure is incorporated herein by reference. Catalysts that can be used in the primer coating compositions from which the primer layer is prepared include, but are not limited to, art-recognized materials, such as described in U.S. Pat. No. 7,465,414 at column 17, lines 39-62, which disclosure is incorporated herein by reference.

The primer layer can include further additives that enhance the performance of the first photochromic compound. Such further additives can include, but are not limited to, ultraviolet light absorbers, stabilizers, such as hindered amine light stabilizers (HALS), antioxidants, e.g., polyphenolic antioxidants, asymmetric diaryloxalamide (oxanilide) compounds, singlet oxygen quenchers, e.g., a nickel ion complex with an organic ligand, and mixtures and/or combinations of such photochromic performance enhancing additive materials.

The primer layer can be applied over the substrate by art-recognized methods including, but not limited to, spray application, spin coating, doctor (or draw-down) blade application, and curtain application.

The primer layer can include at least partial hydrolysates of coupling agents, and mixtures thereof. As used herein "coupling agent" means a material having at least one group capable of reacting, binding and/or associating with a group on at least one surface. With some embodiments, a coupling agent can serve as a molecular bridge at the interface of at least two surfaces that can be similar or dissimilar surfaces. Coupling agents, with further embodiments, can be monomers, oligomers, pre-polymers and/or polymers. Such materials include, but are not limited to, organo-metallics such as silanes, titanates, zirconates, aluminates, zirconium aluminates, hydrolysates thereof and mixtures thereof. As used herein the phrase "at least partial hydrolysates of coupling agents" means that at least some to all of the hydrolyzable groups on the coupling agent are hydrolyzed.

In addition or alternatively to coupling agents and/or hydrolysates of coupling agents, the primer layer can include other adhesion enhancing ingredients. For example, although not limiting herein, the primer layer can further include an adhesion-enhancing amount of an epoxy-containing material. Adhesion-enhancing amounts of an epoxy-containing materials when included in the primer layer, can improve the adhesion of a subsequently applied coating or layer. A class of an epoxy (or oxirane) functional adhesion promoters that can be included in compositions from which the primer layer is formed include, but are not limited to, oxirane-functional-alkyl-trialkoxysilanes, such as gamma-glycidoxypropyltrimethoxysilane, and beta-(3,4-epoxycyclohexyl)ethyltrimethoxysilane.

The first photochromic compound of the primer layer can be selected from art-recognized photochromic compounds. With some embodiments, the first photochromic compound is selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline) naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

The first photochromic compound of the primer layer can, with some embodiments, be selected from certain indeno-fused napthopyran compounds, such as described in U.S. Pat. No. 6,296,785, at column 3, lines 66 through column 10, line 51, which disclosure is incorporated herein by reference.

More particular examples of indeno-fused naphthopyran compounds from which the first photochromic compound can be selected include, but are not limited to:
- (P-a) 3,3-di(4-methoxyphenyl)-6,7,10,11-tetramethoxy-13,13-dimethyl-3H,13H-indeno[2',3':3,4]naphtho[1,2-b]pyran;
- (P-b) 3-phenyl-3-(4-morpholinophenyl)-6,7,10,11-tetramethoxy-13,13-dimethyl-3H,13H-indeno[2',3':3,4]naphtho[1,2-b]pyran;
- (P-c) 3,3-di(4-methoxyphenyl)-6,7,10,11-tetramethoxy-13-hydroxy-13-ethyl-3H,13H-indeno[2',3':3,4]naphtho[1,2-b]pyran;
- (P-d) 3,3-di(4-methoxyphenyl)-6,7,11-trimethoxy-13,13-dimethyl-3H,13H-indeno[2',3':3,4]naphtho[1,2-b]pyran;
- (P-e) 3,3-di(4-methoxyphenyl)-6-methoxy-13-hydroxy-13-ethyl-3H,13H-indeno[2',3':3,4]naphtho[1,2-b]pyran;
- (P-f) 3,3-di(4-methoxyphenyl)-6,7,10,11-tetramethoxy-13,13-diethyl-3H,13H-indeno[2',3':3,4]naphtho[1,2-b]pyran;
- (P-g) 3,3-di(4-methoxyphenyl)-6-morpholino-13-phenyl-3H,13H-indeno[2',3':3,4]naphtho[1,2-b]pyran;
- (P-h) 3-(4-methoxyphenyl)-3-(4-morpholinophenyl)-6,11-dimethoxy-13-hydroxy-13-phenyl-3H,13H-indeno[2',3':3,4]naphtho[1,2-b]pyran;
- (P-i) 3-(4-methoxyphenyl)-3-(4-morpholinophenyl)-6,11-dimethoxy-13,13-dimethyl-3H,13H-indeno[2',3':3,4]naphtho[1,2-b]pyran;
- (P-j) 3-(4-methoxyphenyl)-3-(4-dimethylaminophenyl)-6,11-dimethoxy-13,13-dimethyl-3H,13H-indeno[2',3':3,4]naphtho[1,2-b]pyran;
- (P-k) 3,3-di(4-methoxyphenyl)-6,7,8-trimethoxy-13-phenyl-3H,13H-indeno[2',3':3,4]naphtho[1,2-b]pyran;
- (P-l) 3-(4-methoxyphenyl)-3-(4-morpholinophenyl)-6,7,10,11-tetramethoxy-13-hydroxy-13-ethyl-3H,13H-indeno[2',3':3,4]naphtho[1,2-b]pyran;
- (P-m) 3-(4-methoxyphenyl)-3-(4-morpholinophenyl)-6,7,10,11-tetramethoxy-13-hydroxy-13-butyl-3H,13H-indeno[2',3':3,4]naphtho[1,2-b]pyran;
- (P-n) 3-(4-morpholinophenyl)-3-phenyl-6,11-dimethoxy-13-hydroxy-13-ethyl-3H,13H-indeno[2',3':3,4]naphtho[1,2-b]pyran;
- (P-o) 3-(4-methoxyphenyl)-3-(4-(2-hydroxyethoxy)phenyl-6,11-dimethoxy-13,13-dimethyl-3H,13H-indeno[2',3':3,4]naphtho[1,2-b]pyran;
- (P-p) 3-(4-morpholinophenyl)-3-phenyl-6,11-dimethoxy-13-hydroxy-13-butyl-3H,13H-indeno[2',3':3,4]naphtho[1,2-b]pyran;
- (P-q) 3-(4-methoxyphenyl)-3-(4-morpholinophenyl)-6-methoxy-13-hydroxy-13-ethyl-3H,13H-indeno[2',3':3,4]naphtho[1,2-b]pyran;
- (P-r) 3-(4-methoxyphenyl)-3-(4-morpholinophenyl)-6-diethylamino-13-ethyl-13-methoxy-3H,13H-indeno[2',3':3,4]naphtho[1,2-b]pyran;
- (P-s) 3-(4-methoxyphenyl)-3-(4-morpholinophenyl)-6,11-dimethoxy-13-hydroxy-13-methyl-3H,13H-indeno[2',3':3,4]naphtho[1,2-b]pyran;
- (P-t) 3-(4-methoxyphenyl)-3-(4-morpholinophenyl)-6,7,8-trimethoxy-13-methoxy-13-methyl-3H,13H-indeno[2',3':3,4]naphtho[1,2-b]pyran; and combinations of two or more thereof.

The first photochromic compound of the primer layer can with some further embodiments be selected from one or more indeno-fused naphthopyran compounds having a pi-conjugation extending group, such as a halogen or halogen substituted group, bonded to the 11-position of the indeno-fused naphthopyran. Examples of indeno-fused naphthopyran compounds having a pi-conjugation extending bonded to the 11-position thereof include, but are not limited to, those disclosed in United States Patent Application Publication No. US 2011/0049445 A1 at paragraphs [0030] through [0080].

More particular examples of indeno-fused naphthopyran compounds having a pi-conjugation extending bonded to the 11-position thereof, from which the first photochromic compound of the primer layer can be selected include, but are not limited to:
- (P-i) 3,3-di(4-methoxyphenyl)-6-methoxy-11-(4-trifluoromethyl)phenyl-13,13-dimethyl-3H,13H-indeno[2',3':3,4]naphtho[1,2-b]pyran;
- (P-ii) 3,3-di(4-methoxyphenyl)-6,7-dimethoxy-11-(3,5-bis(trifluoromethyl)phenyl)-13,13-dimethyl-3H,13H-indeno[2',3':3,4]naphtho[1,2-b]pyran;
- (P-iii) 3,3-di(4-methoxyphenyl)-6,7-dimethoxy-11-(2-trifluoromethyl)phenyl-13,13-diethyl-3H,13H-indeno[2',3':3,4]naphtho[1,2-b]pyran;
- (P-iv) 3,3-di-(4-methoxyphenyl)-6-methoxy-7-piperidino-11-(4-trifluoromethyl)phenyl-13,13-dimethyl-3H,13H-indeno[2',3':3,4]naphtho[1,2-b]pyran;
- (P-v) 3-(4-methoxyphenyl)-3-(4-morpholinophenyl)-6-methoxy-11-(4-trifluoromethyl)phenyl-13,13-dimethyl-3H,13H-indeno[2',3':3,4]naphtho[1,2-b]pyran;
- (P-vi) 3-(4-methoxyphenyl)-3-(4-morpholinophenyl)-6-methoxy-7-piperidino-11-(4-trifluoromethyl)phenyl-13,13-dimethyl-3H,13H-indeno[2',3':3,4]naphtho[1,2-b]pyran;

(P-vii) 3-(4-methoxyphenyl)-3-(4-morpholinophenyl)-6-methoxy-7-morpholino-11-(4-trifluoromethyl)phenyl-13,13-dimethyl-3H,13H-indeno[2',3':3,4]naphtho[1,2-b]pyran;

(P-viii) 3,3-di(4-hydroxyphenyl)-6,7-dimethoxy-11-(3,5-bis(trifluoromethyl)phenyl)-13,13-dimethyl-3H,13H-indeno[2',3':3,4]naphtho[1,2-b]pyran;

(P-ix) 3,3-di-(4-methoxyphenyl-6-methoxy-7-morpholino-11-(4-trifluoromethyl)phenyl-13,13-dimethyl-3H,13H-indeno[2',3':3,4]naphtho[1,2-b]pyran;

(P-x) 3,3-bis(4-methoxyphenyl)-7-methoxy-11-(2-trifluoromethyl)phenyl-13,13-dimethyl-3H,13H-indeno[2',3':3,4]naphtho[1,2-b]pyran;

(P-xi) 3-(4-methoxyphenyl)-3-(2-hydroxyethoxy)phenyl-6-methoxy-7-piperidino-11-(4-trifluoromethyl)phenyl-13,13-dimethyl-3H,13H-indeno[2',3':3,4]naphtho[1,2-b]pyran;

(P-xii) 3-phenyl-3'-(4-morpholinophenyl)-11-(4-trifluoromethyl)phenyl-13,13-dimethyl-3H,13H-indeno[2',3':3,4]naphtho[1,2-b]pyran;

(P-xiii) 3-(4-morpholinophenyl)-3-phenyl-11-(2-trifluoromethyl)-phenyl-13,13-dimethyl-3H,13H-indeno[2',3':3,4]naphtho[1,2-b]pyran;

(P-xiv) 3-(4-butoxyphenyl)-3-(4-methoxyphenyl)-6,7-dimethoxy-11-(3-(trifluoromethyl)pyridin-2-yl)-13,13-dimethyl-3H,13H-indeno[2',3':3,4]naphtho[1,2-b]pyran; and combinations of two or more thereof.

The first photochromic compound of the primer layer, with some embodiments, can be covalently bonded to the matrix, such as the organic matrix, of the primer layer. With some embodiments, the first photochromic compound can include one or more reactive groups, such as one or more polymerizable groups. With some embodiments, the first photochromic compound can be selected from 2H-1-naphtho[1,2-b]pyrans, 3H-naphtho[2,1-b]pyrans and/or indeno[2,1-f]naphtho[1,2-b]pyrans each having at least one functional group that is capable of forming a covalent bond with another functional group, such as at least one polymerizable group, such as at least one polyalkoxylated substituent of from 1 to 50 alkoxy units per substituent which is end-capped (or terminated) with a polymerizable group. Examples of such photochromic compounds from which the first photochromic compound can be selected include, but are not limited to, those disclosed in U.S. Pat. No. 6,113,814, at column 2, line 52 through column 8, line 40, which disclosure is incorporated herein by reference.

More particular examples of photochromic compounds having reactive functionality from which the first photochromic compound of the primer layer can be selected include, but are not limited to:

(P-a') 2,2-bis(4-methoxyphenyl)-5-(2-hydroxyethoxycarbonyl)-8-phenyl-[2H-]-naphtho[1,2-b]pyran;

(P-b') 2,2-bis(4-methoxyphenyl)-5-(2-(2-hydroxyethoxy)ethoxycarbonyl)-8-phenyl-[2H]-naphtho[1,2-b]pyran;

(P-c') 3,3-di(4-methoxyphenyl)-6,11-dimethoxy-13-methyl-13-(2-(2-hydroxyethoxy)ethoxy)-3H,13H-indeno[2',3':3,4]naphtho[1,2-b]pyran (P-d') 3,3-di(4-methoxyphenyl)-6,11-dimethoxy-13-methyl-13-(2-(2-(2-(2-hydroxyethoxy)ethoxy)ethoxy)ethoxy)-3H,13H-indeno[2',3':3,4]naphtho[1,2-b]pyran (P-e') 3-(4-(2-hydroxyethoxy)phenyl)-3-(4-morpholinophenyl)-6-methoxy-11-(4-trifluoromethylphenyl)-13,13-dimethyl-3H,13H-indeno[2',3':3,4]naphtho[1,2-b]pyran (P-f') 3-(4-(2-(2-(2-hydroxyethyoxy)ethoxy)ethoxy)phenyl)-3-phenyl-9-methoxycarbonyl-8-methoxy-[3H]-naphtho[2,-1-b]pyran; and combinations of two or more thereof.

The photochromic articles of the present invention include a topcoat layer (e.g., topcoat layer 20 of FIG. 1). The topcoat layer can include a single layer or multiple layers each including a second photochromic compound that can be the same or different. The topcoat layer typically includes an organic matrix, such as a thermoplastic organic matrix and/or a crosslinked organic matrix. Additionally or alternatively to an organic matrix, the topcoat layer can include an inorganic matrix, including, for example, silane linkages, siloxane linkages and/or titanate linkages. The organic matrix can include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The topcoat layer can be formed by art-recognized methods including, but not limited to: lamination, such as of one or more plastic sheets or films; in-mold formation, such as in-mold coating; film casting; and coating methods typically, the topcoat layer is formed from a topcoat coating composition. The topcoat coating composition can be a curable topcoat coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; or actinic radiation, such as in the case of ultraviolet light curable coating compositions.

The topcoat layer can have any suitable thickness. With some embodiments, the topcoat has a thickness of from 0.5 microns to 10 microns, such as from 1 to 8 microns, or from 2 to 5 microns, inclusive of the recited values.

With some embodiments, the topcoat layer includes an organic matrix formed from a radiation-cured acrylate-based composition, and correspondingly, the topcoat layer can be described as an acrylate-based topcoat layer.

The acrylate-based topcoat layer can be prepared using (meth)acrylate monomers and/or (meth)acrylic acid monomers. The (meth)acrylate monomers can include one, two, three, four, or five (meth)acrylate groups. Additional co-polymerizable monomers, such as epoxy monomers, e.g., monomers containing a epoxy (or oxirane) functionality, monomers containing both (meth)acrylate and epoxy functionalities, etc., can also be present in the formulation to prepare the (meth)acrylate-based topcoat layer. The monomers used to prepare the (meth)acrylate-based topcoat layer include a plurality, e.g., a major amount, i.e., more than 50 weight percent, of (meth)acrylate monomers; hence the designation "(meth)acrylate-based topcoat layer." The formulations used to prepare the (meth)acrylate-based topcoat layer can also contain components having at least one isocyanate (—NCO) group, e.g., organic monoisocyanates, organic diisocyanates, and organic triisocyanates, whereby urethane linkages can be incorporated into the topcoat layer.

The (meth)acrylate-based topcoat layer typically possesses physical properties including, for example, transparency, adherence to the underlying photochromic-dichroic layer, resistance to removal by aqueous alkali metal hydroxide, compatibility with an optional abrasion-resistant coating, such as a hardcoat, applied to its surface, and scratch resistance. With some embodiments, the (meth)acrylate-based topcoat layer has a hardness that is greater than that of the photochromic-dichroic layer.

Radiation curing of (meth)acrylate-based polymeric systems can be achieved with, for example, electron beam curing (EB) and/or ultraviolet light (UV) radiation. Ultraviolet curing typically requires the presence of at least one photoinitiator, whereas curing by EB techniques does not require a photoinitiator. With the exception of the presence or absence of the photoinitiator, the (meth)acrylate-based formulations, which are cured by either UV or EB radiation technology, can otherwise be identical.

Radiation-curable (meth)acrylate-based polymeric systems are well known in the polymeric art, and any such system may be used to produce the (meth)acrylate-based top coat layer of the photochromic article of the present invention. In accordance with some embodiments, the (meth)acrylate-based topcoat layer is formed from a composition that includes a combination or miscible blend of one or more free-radical initiated (meth)acrylate monomers and/or (meth)acrylate oligomers, and one or more cationic initiated epoxy monomers. When this blend of monomers is cured, a (meth)acrylate-based topcoat layer, in the form of a polymerizate, is formed and includes an interpenetrating network of polymer components.

Examples of (meth)acrylate monomers that can be included in compositions from which the (meth)acrylate-based topcoat layer can be formed, include, but are not limited to, polyfunctional (meth)acrylates having, for example, 1, 2, 3, 4, or 5 (meth)acrylate groups, and monofunctional (meth) acrylates, e.g., a monomer containing a single (meth)acrylate group, hydroxy-substituted (meth)acrylates and alkoxysilyl alkylacrylates, such as trialkoxysilylpropylmethacrylate. Other reactive monomers/diluents, such as monomers containing an ethylenic functional group (other than the (meth) acrylate monomers) can also be present.

Compositions from which the (meth)acrylate-based topcoat layer can be formed, and methods of applying and curing such compositions, are disclosed at column 16, line 14 through column 25, line 3 of U.S. Pat. No. 7,452,611 B2, which disclosure is incorporated herein by reference.

Compositions from which the topcoat layer is formed can include one or more additives, including, but not limited to, adhesion promoters, coupling agents, ultraviolet light absorbers, thermal stabilizers, catalysts, free radical scavengers, plasticizers, flow additives, and/or static tints or static dyes (i.e., tints or dyes that are not photochromic).

With some embodiments, the compositions from which the (meth)acrylate-based topcoat layer can be formed, can further include an adhesion promoter. The adhesion promoter can be selected from, for example, organo-silanes, such as aminoorganosilanes, organic titanate coupling agents, organic zirconate coupling agents, and combinations thereof. Examples of adhesion promoters, which can be included in the compositions from which the acrylate-based topcoat layer can be formed, include, but are not limited to, those disclosed at column 5, line 52 through column 8, line 19 of U.S. Pat. No. 7,410,691 B2, which disclosure is incorporated herein by reference.

The topcoat layer, with some embodiments, includes an ultraviolet light absorber and/or a second photochromic compound. With some embodiments, the topcoat layer includes an ultraviolet light absorber, and is free of the second photochromic compound. With some further embodiments, the topcoat layer includes both an ultraviolet light absorber and the second photochromic compound. With some additional embodiments, the topcoat layer includes the second photochromic compound, and is free of an ultraviolet light absorber. The ultraviolet light absorber can be selected from one or more art-recognized classes of ultraviolet light absorbers, including, but not limited to: hindered amines, which can include, for example, one or more 2,2,6,6-tetramethyl N-substituted piperidine groups; benzophenones; and/or benzotriazoles. The ultraviolet light absorber is typically present in at least an effective amount, such as from 0.1 to 10 percent by weight, or 0.2 to 5 percent by weight, or from 0.3 to 3 percent by weight, based on the total solids weight of the coating composition from which the topcoat layer is prepared.

The second photochromic compound can in some embodiments be selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

The second photochromic compound of the topcoat layer, with some embodiments, can be covalently bonded to the matrix, such as the organic matrix, of the topcoat layer. With some embodiments, the second photochromic compound can include one or more reactive groups, such as one or more polymerizable groups. With some embodiments, the second photochromic compound can include at least one functional group that is capable of forming a covalent bond with another functional group, such as at least one polymerizable group, such as at least one polyalkoxylated substituent of from 1 to 50 alkoxy units per substituent which is end-capped (or terminated) with a polymerizable group.

The second photochromic compound, in accordance with some additional embodiments, includes at least one ring-opened cyclic monomer. Examples of ring-opening cyclic monomers include, but are not limited to, cyclic esters, cyclic carbonates, cyclic ethers, and cyclic siloxanes. More particular examples of ring-opening cyclic monomers include, but are not limited to, e-caprolactone and 6-valerolactone.

Photochromic compounds that include at least one ring-opened cyclic monomer, from which the second photochromic compound can be selected, include, but are not limited to, those disclosed at column 2, line 32 through column 6, line 60 of U.S. Pat. No. 7,465,415 B2, which disclosure is incorporated herein by reference. More particular examples of photochromic compounds having at least one ring-opened monomer covalently bonded thereto, from which the second photochromic compound can be selected, include, but are not limited to, those disclosed at columns 86 through 103, and represented by Formulas 17 through 28 of U.S. Pat. No. 7,465,415 B2, which disclosure is incorporated herein by reference.

Examples of ring-opening cyclic monomers that can be used to form photochromic compounds having at least one ring-opened monomer covalently bonded thereto, from which the second photochromic compound can be selected, include, but are not limited to, those disclosed at column 10, line 43 through column 12, lines 26 of U.S. Pat. No. 7,465,415 B2, which disclosure is incorporated herein by reference. Examples of photochromic initiators that can be reacted with ring-opening cyclic monomers so as to form photochromic compounds having at least one ring-opened monomer covalently bonded thereto, from which the second photochromic compound can be selected, include, but are not limited to, those disclosed in Table 1 at columns 14 through 59 of U.S. Pat. No. 7,465,415 B2, which disclosure is incorporated herein by reference.

More particular examples of photochromic initiators that can be reacted with ring-opening cyclic monomers (including, but not limited to, cyclic esters, cyclic carbonates, cyclic ethers, and/or cyclic siloxanes as discussed above) so as to form photochromic compounds having at least one ring-opened monomer covalently bonded thereto, from which the second photochromic compound of the topcoat layer can be selected, include, but are not limited to, the following:

(TC-1) 3,3-di(4-methoxyphenyl)-5-methoxycarbonyl-6-phenyl-8,9-dimethoxy-2H-naphtho[1,2-b]pyran;
(TC-2) 3,3-di(4-methoxyphenyl)-5-methoxycarbonyl-6-(4-methoxyphenyl)-2H-naphtho[1,2-b]pyran;
(TC-3) 3-(4-(2-hydroxyethoxy)phenyl)-3-(4-fluorophenyl)-5-methoxycarbonyl-6-(4-methoxyphenyl)-2H-naphtho[1,2-b]pyran;
(TC-4) 3-phenyl-3-(4-ethoxyphenyl)-6-methoxy-5-methoxycarbonyl-2H-naphtho[1,2-b]pyran;
(TC-5) 3-(4-methoxyphenyl)-3-(4-fluorophenyl)-7-methyl-5-methoxycarbonyl-2H-naphtho[1,2-b]pyran;
(TC-6) 3-phenyl-3-(4-(2-hydroxyethoxy)phenyl)-6-methoxy-13,13-dimethyl-3H,13H-indeno[2',3':3,4]naphtho[1,2-b]pyran
(TC-7) 3-phenyl-3-(4-methoxyphenyl)-6-methoxy-13-(2-hydroxyethyl) 3H,13H-indeno[2',3':3,4]naphtho[1,2-b]pyran;
(TC-8) 3-phenyl-3-(4-morpholinophenyl)-6,7-dimethoxy-13-hydroxymethyl-13-(2-hydroxyethyl)-3H,13H-indeno[2',3':3,4]naphtho[1,2-b]pyran;
(TC-9) 2,2-diphenyl-5-(2,3-dihydroxy)propoxycarbonyl-8-methyl-2H-naphtho[1,2-b]pyran;
(TC-10) 2-(4-(2-(2-hydroxyethoxy)ethoxy)ethoxy)phenyl)-2-phenyl-5-methoxycarbonyl-6-methyl-9-methoxy-2H-naphtho[1,2-b]pyran;
(TC-11) 2,2-diphenyl-5-(2-(2-hydroxyethoxy)ethoxycarbonyl)-8-methyl-2H-naphtho[1,-2-b]pyran;
(TC-12) 2,2-di(4-methoxyphenyl)-5-(2-(2-(2-hydroxyethoxy)ethoxy)ethoxycarbonyl)-6-phenyl-2H-naphtho[1,2-b]pyran;
(TC-13) 3,3-di(4-methoxyphenyl)-6-morpholino-3H-naphtho[2,1-b]pyran;
(TC-14) 3,3-di(4-methoxyphenyl)-6-phenyl-3H-naphtho[2,1-b]pyran;
(TC-15) 3,3-diphenyl-5-hydroxy-6-(2-hydroxyphenyl)-3H-naphtho[2,1-b]pyran; and combinations of two or more thereof.

The photochromic articles of the present invention can include, with some embodiments, an alignment layer that is interposed between the primer layer and the photochromic-dichroic layer. With reference to FIG. 1 photochromic article 2 includes an alignment layer 50 that is interposed between primer layer 14 and photochromic-dichroic layer 17. The alignment layer can also be referred to herein as an orientation facility. The photochromic-dichroic compound of the photochromic-dichroic layer can be at least partially aligned by interaction with the underlying alignment layer.

As used herein the term "alignment layer" means a layer that can facilitate the positioning of one or more other structures that are exposed, directly and/or indirectly, to at least a portion thereof. As used herein the term "order" means bring into a suitable arrangement or position, such as aligning with another structure or material, or by some other force or effect. Thus, as used herein the term "order" encompasses both contact methods of ordering a material, such as by aligning with another structure or material, and non-contact methods of ordering a material, such as by exposure to an external force or effect. The term order also encompasses combinations of contact and non-contact methods.

For example, the photochromic-dichroic compound that is at least partially aligned by interaction with the alignment layer can be at least partially aligned such that the long-axis of the photochromic-dichroic compound in the activated state is essentially parallel to at least the first general direction of the alignment layer. With some embodiments, the photochromic-dichroic compound that is at least partially aligned by interaction with the alignment layer is bound to or reacted with the alignment layer. As used herein with reference to order or alignment of a material or structure, the term "general direction" refers to the predominant arrangement or orientation of the material, compound or structure. Further, it will be appreciated by those skilled in the art that a material, compound or structure can have a general direction even though there is some variation within the arrangement of the material, compound or structure, provided that the material, compound or structure has at least one predominate arrangement.

The alignment layer can, with some embodiments, have at least a first general direction. For example, the alignment layer can include a first ordered region having a first general direction and at least one second ordered region adjacent the first ordered region having a second general direction that is different from the first general direction. Further, the alignment layer can have a plurality of regions, each of which has a general direction that is the same or different from the remaining regions so as to form a desired pattern or design. The alignment layer can include, for example, a coating including an at least partially ordered alignment medium, an at least partially ordered polymer sheet, an at least partially treated surface, Langmuir-Blodgett films, and combinations thereof.

The alignment layer can include, with some embodiments, a coating that includes an at least partially ordered alignment medium. Examples of suitable alignment media that can be used in conjunction with the alignment layer include, but are not limited to, photo-orientation materials, rubbed-orientation materials, and liquid crystal materials. Methods of ordering at least a portion of the alignment medium are described herein below in further detail.

The alignment medium of the alignment layer can be a liquid crystal material, and the alignment layer can be referred to as a liquid crystal alignment layer. Liquid crystal materials, because of their structure, are generally capable of being ordered or aligned so as to take on a general direction. More specifically, because liquid crystal molecules have rod- or disc-like structures, a rigid long axis, and strong dipoles, liquid crystal molecules can be ordered or aligned by interaction with an external force or another structure such that the long axis of the molecules takes on an orientation that is generally parallel to a common axis. For example, it is possible to align the molecules of a liquid crystal material with a magnetic field, an electric field, linearly polarized infrared radiation, linearly polarized ultraviolet radiation, linearly polarized visible radiation, or shear forces. It is also possible to align liquid crystal molecules with an oriented surface. For example, liquid crystal molecules can be applied to a surface that has been oriented, for example by rubbing, grooving, or photo-alignment methods, and subsequently aligned such that the long axis of each of the liquid crystal molecules takes on an orientation that is generally parallel to the general direction of orientation of the surface. Examples of liquid crystal materials suitable for use as alignment media include, but are not limited to, liquid crystal polymers, liquid crystal pre-polymers, liquid crystal monomers, and liquid crystal mesogens. As used herein the term "pre-polymer" means partially polymerized materials.

Classes of liquid crystal monomers that are suitable for use in conjunction with the alignment layer include, but are not limited to, mono- as well as multi-functional liquid crystal monomers. The liquid crystal monomers can, with some embodiments, be selected from cross-linkable liquid crystal monomers, such as photocross-linkable liquid crystal monomers. As used herein the term "photocross-linkable" means a material, such as a monomer, a pre-polymer or a polymer, that can be cross-linked on exposure to actinic radiation. For example, photocross-linkable liquid crystal monomers include, but are not limited to, those liquid crystal monomers that are cross-linkable on exposure to ultraviolet radiation and/or visible radiation, either with or without the use of polymerization initiators.

Examples of cross-linkable liquid crystal monomers, that can be included in the alignment layer, include, but are not limited to, liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers and blends thereof. Examples of photocross-linkable liquid crystal monomers, that can be included in the alignment layer, include, but are not limited to, liquid crystal monomers having functional groups chosen from acrylates, methacrylates, alkynes, epoxides, thiols, and blends thereof.

Liquid crystal polymers and pre-polymers, that can be included in the alignment layer, include, but are not limited to, main-chain liquid crystal polymers and pre-polymers and side-chain liquid crystal polymers and pre-polymers. With main-chain liquid crystal polymers and pre-polymers, rod- or disc-like liquid crystal mesogens are primarily located within the polymer backbone. With side-chain liquid crystal polymers and pre-polymers, the rodor disc-like liquid crystal mesogens primarily are located within the side chains of the polymer. Additionally, the liquid crystal polymer or pre-polymer can be cross-linkable, and further can be photocross-linkable.

Examples of liquid crystal polymers and pre-polymers, that can be included in the alignment layer, include, but are not limited to, main-chain and side-chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Examples of photocross-linkable liquid crystal polymers and pre-polymers, that can be included in the alignment layer, include, but are not limited to, those polymers and pre-polymers having functional groups chosen from acrylates, methacrylates, alkynes, epoxides, thiols, and blends thereof.

Liquid crystal mesogens, that can be included in the alignment layer, include, but are not limited to, thermotropic liquid crystal mesogens and lyotropic liquid crystal mesogens. Additional classes of liquid crystal mesogens, that can be included in the alignment layer, include, but are not limited to, columatic (or rod-like) liquid crystal mesogens and discotic (or disc-like) liquid crystal mesogens.

Examples of photo-orientation materials, that can be included in the alignment layer, include, but are not limited to, photo-orientable polymer networks. More specific examples of photo-orientable polymer networks include, but are not limited to, azobenzene derivatives, cinnamic acid derivatives, coumarine derivatives, ferulic acid derivatives, and polyimides. With some embodiments, the alignment layer can include an at least partially ordered photo-orientable polymer network chosen from azobenzene derivatives, cinnamic acid derivatives, coumarine derivatives, ferulic acid derivatives, and/or polyimides. Examples of cinnamic acid derivatives, that can be included in the alignment layer, include, but are not limited to, polyvinyl cinnamate and polyvinyl esters of paramethoxycinnamic acid.

As used herein the term "rubbed-orientation material" means a material that can be at least partially ordered by rubbing at least a portion of a surface of the material with another suitably textured material. For example, the rubbed-orientation material can be rubbed with a suitably textured cloth or a velvet brush. Examples of rubbed-orientation materials, that can be included in the alignment layer, include, but are not limited to, (poly)imides, (poly)siloxanes, (poly)acrylates, and (poly)coumarines. With some embodiments, the alignment layer can include a polyimide, and the alignment layer can be rubbed with a velvet or a cotton cloth so as to at least partially order at least a portion of the surface of the alignment layer.

With some embodiments, the alignment layer can include an at least partially ordered polymer sheet. For example, a sheet of polyvinyl alcohol can be at least partially ordered by stretching (e.g., uniaxially stretching) the sheet, and thereafter the stretched sheet can be bonded to the at least a portion a surface of the optical substrate to form the orientation facility. Alternatively, the ordered polymer sheet can be made by a method that at least partially orders the polymer chains during fabrication, for example, by extrusion. Further, the at least partially ordered polymer sheet can be formed by casting or otherwise forming a sheet of a liquid crystal material and thereafter at least partially ordering the sheet for example, but exposing the sheet to a magnetic field, an electric field, and/or a shear force. Still further, the at least partially ordered polymer sheet can be made using photo-orientation methods. For example, a sheet of a photo-orientation material can be formed, for example by casting, and thereafter at least partially ordered by exposure to linearly polarized ultraviolet radiation.

The alignment layer of the photochromic articles of the present invention can include an at least partially treated surface. As used herein, the term "treated surface" refers to at least a portion of a surface that has been physically altered to create at least one ordered region on least a portion of the surface. Examples of treated surfaces include, but are not limited to, rubbed surfaces, etched surfaces, and embossed surfaces. Further, the treated surfaces can be patterned, for example using a photolithographic or an interferographic process. With some embodiments, the surface of the alignment layer can be a treated surface selected from, for example, chemically etched surfaces, plasma etched surfaces, nanoetched surfaces (such as surfaces etched using a scanning tunneling microscope or an atomic force microscope), laser etched surfaces, and/or electron-beam etched surfaces.

In accordance with some embodiments, when the alignment layer includes a treated surface, the treated surface can be formed by depositing a metal salt (such as a metal oxide or metal fluoride) onto at least a portion of a surface (e.g., a surface of the alignment layer itself, or a surface of the primer layer), and thereafter etching the deposit to form the treated surface. Art-recognized methods of depositing a metal salt include, but are not limited to, plasma vapor deposition, chemical vapor deposition, and sputtering. Etching can be undertaken in accordance with art-recognized methods, such as those described previously herein.

As used herein the term "Langmuir-Blodgett films" means one or more at least partially ordered molecular films on a surface. Langmuir-Blodgett films can be formed, for example, by dipping a substrate into a liquid one or more times so that it is at least partially covered by a molecular film and then removing the substrate from the liquid such that, due to the relative surface tensions of the liquid and the substrate, the molecules of the molecular film are at least partially ordered in substantially one (or a single) general direction. As used herein, the term molecular film refers to monomolecular films (i.e., monolayers) as well as films comprising more than one monolayer.

The photochromic articles of the present invention can, with some embodiments, further include an alignment transfer material interposed between the alignment layer and the photochromic-dichroic layer. The alignment transfer material can be aligned by interaction with the alignment layer, and correspondingly the photochromic-dichroic compound can be aligned by interaction with the alignment transfer material. The alignment transfer material can, with some embodiments, facilitate the propagation or transfer of a suitable arrangement or position from the alignment layer to the photochromic-dichroic compound of the photochromic-dichroic layer.

Examples of alignment transfer materials include, but are not limited to, those liquid crystal materials described above in connection with the alignment media disclosed herein. It is possible to align the molecules of a liquid crystal material with an oriented surface. For example, a liquid crystal material can be applied to a surface that has been oriented and subsequently aligned such that the long axis of the liquid crystal molecules adopts an orientation that is generally parallel to the same general direction of orientation of the surface. The liquid crystal material of the alignment transfer material can be at least partially ordered by alignment with the alignment layer, such that the long axis of the molecules of the liquid crystal material are generally parallel to, for example, a first general direction of the orientation facility. In this manner, the general direction of the alignment layer can be transferred to the liquid crystal material, which in turn can transfer the general direction to another structure or material. Further, if the alignment layer includes a plurality of regions having general directions that together form a design or pattern, that design or pattern can be transferred to the liquid crystal material by aligning the liquid crystal material with the various regions of the alignment layer. Additionally, although not required, according to various non-limiting embodiments disclosed herein, at least a portion of the liquid crystal material of the alignment transfer material can be exposed to at least one of, a magnetic field, an electric field, linearly polarized infrared radiation, linearly polarized ultraviolet radiation, and linearly polarized visible radiation while being at least partially aligned with at least a portion of the alignment layer.

The photochromit articles of the present invention can, with some embodiments, include a hard coat layer that resides over the topcoat layer. With reference to FIG. 1, photochromic article 2 includes a hard coat layer 53 that resides over topcoat layer 20. The hard coat layer can include a single layer or multiple layers.

The hard coat layer can be selected from abrasion-resistant coatings including organo silanes, abrasion-resistant coatings including radiation-cured acrylate-based thin films, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. With some embodiments, the hard coat layer can include a first coating of a radiation-cured acrylate-based thin film and a second coating including an organo-silane. Non-limiting examples of commercial hard coating products include SIL-VUE® 124 and HI-GARD® coatings, available from SDC Coatings, Inc. and PPG Industries, Inc., respectively.

The hard coat layer can be selected from art-recognized hard coat materials, such as organo-silane abrasion-resistant coatings. Organo-silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hard coatings and which disclosures are incorporated herein by reference. Reference is also made to U.S. Pat. Nos. 4,731,264, 5,134,191, 5,231,156 and International Patent Publication WO 94/20581 for disclosures of organo-silane hard coatings, which disclosures are also incorporated herein by reference. The hard coat layer can be applied by those coating methods as described previously herein with regard to the primer layer, such as spin coating.

Other coatings that can be used to form the hard coat layer, include, but are not limited to, polyfunctional acrylic hard coatings, melamine-based hard coatings, urethane-based hard coatings, alkyd-based coatings, silica sol-based hard coatings or other organic or inorganic/organic hybrid hard coatings.

The hard coat layer, with some embodiments, is selected from organo-silane type hard coatings. Organo-silane type hard coatings from which the hard coat layer of the photochromic articles of the present invention can be selected include, but are not limited to, those disclosed at column 24, line 46 through column 28, line 11 of U.S. Pat. No. 7,465,414 B2, which disclosure is incorporated herein by reference.

The photochromic articles of the present invention can include additional coatings, such as antireflective coatings. With some embodiments, an antireflective coating can be applied over the hard coat layer. Examples of antireflective coatings are described in U.S. Pat. No. 6,175,450 and International Patent Publication WO 00/33111, the disclosures of which are incorporated herein by reference.

In accordance with further embodiments of the present invention, the photochromic articles of the present invention can be selected from ophthalmic articles or elements, display articles or elements, windows, mirrors, packaging material such as shrinkwrap, and active and passive liquid crystal cell articles or elements.

Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

Examples of display articles, elements and devices include, but are not limited to, screens, monitors, and security elements, including without limitation, security marks and authentication marks.

Examples of windows include, but are not limited to, automotive and aircraft transparencies, filters, shutters, and optical switches.

With some embodiments, the photochromic article can be a security element. Examples of security elements include, but are not limited to, security marks and authentication marks that are connected to at least a portion of a substrate, such as: access cards and passes, e.g., tickets, badges, identification or membership cards, debit cards, etc.; negotiable instruments and non-negotiable instruments e.g., drafts, checks, bonds, notes, certificates of deposit, stock certificates, etc.; government documents, e.g., currency, licenses, identification cards, benefit cards, visas, passports, official certificates, deeds etc.; consumer goods, e.g., software, compact discs ("CDs"), digital-video discs ("DVDs"), appliances, consumer electronics, sporting goods, cars, etc.; credit cards; and merchandise tags, labels and packaging.

With further embodiments, the security element can be connected to at least a portion of a substrate chosen from a transparent substrate and a reflective substrate. Alternatively, according to further embodiments in which a reflective substrate is required, if the substrate is not reflective or sufficiently reflective for the intended application, a reflective material can be first applied to at least a portion of the substrate before the security mark is applied thereto. For example, a reflective aluminum coating can be applied to the at least a portion of the substrate prior to forming the security element thereon. Additionally or alternatively, the security element can be connected to at least a portion of a substrate chosen from untinted substrates, tinted substrates, photochromic substrates, tinted-photochromic substrates, linearly polarizing, circularly polarizing substrates, and elliptically polarizing substrates.

Furthermore, security elements according to the aforementioned embodiments can further include one or more other coatings or films or sheets to form a multi-layer reflective security element with viewing angle dependent characteristics, such as described in U.S. Pat. No. 6,641,874.

The present invention is more particularly described in the following examples, which are intended to be illustrative only, since numerous modifications and variations therein will be apparent to those skilled in the art. Unless otherwise specified, all parts and all percentages are by weight.

EXAMPLES

Part 1 describes the preparation of the primer layer formulation (PLF). Part 2 describes the preparation of the liquid crystal alignment formulation (LCAF). Part 3 describes the preparation of the coating layer formulation (CLF). Part 4 describes the preparation of the topcoat layer formulation (TLF). Part 5 describes the procedures used for preparing the substrate and stack of coatings listed in Table 1. Part 6 describes the photochromic performance tests including the absorption ratio and optical response measurements reported in Table 1 for Comparative Examples (CE) 1 to 4 and Examples 1 to 4.

Part 1—Preparation of the PLF

Into a suitable container equipped with a magnetic stir-bar the following materials were added in the amounts indicated:
Polyacrylate polyol (14.69 g) (Composition D of Example 1 in U.S. Pat. No. 6,187,444, which polyol disclosure is incorporated herein by reference, except that in Charge 2, the styrene was replaced with methyl methacrylate and 0.5% by weight, based on the total monomer weight, of triphenyl phosphite was added);
Polyalkylenecarbonate diol (36.70 g) POLYMEG® 1000 from Great Lakes Chemical Corp;
DESMODUR® PL 340 (48.23 g) from Bayer Material Science;
TRIXENE® BI 7960 (34.39 g) from Baxenden;
Polyether modified polydimethylsiloxane (0.08 g) BYK®-333 from BYK-Chemie, USA;
Urethane catalyst (1.00 g) KKAT® 348 from King Industries;
Gamma-Glycidoxypropyltrimethoxysilane (3.96 g) A-187 from Momentive Performance Materials;
Light stabilizer (8.07 g) TINUVIN® 928 from Ciba Specialty Chemicals;
AROMATIC 100 (36.00 g) a mixture of high temperature boiling solvents available from Texaco; and
1-Methyl-2-pyrrolidinone (61.88 g) from Sigma-Aldrich).

The mixture was stirred at room temperature for 2 hrs to yield a solution having about 46.82 weight % final solids based on the total weight of the solution. To this solution was added with mixing the following 3 photochromic compounds in approximately equal amounts to a total amount of 5 weight percent, based on the total weight of resin solids indicated:

Photochromic Compound—1 (PC-1) is an indenonaphthopyran which was prepared according to the procedures of U.S. Pat. No. 6,113,814, which disclosure is incorporated herein by reference, and which upon exposure to ultraviolet light (UV) demonstrated an activated bluish green color. A UV spectrum was obtained on a photochromic test square containing PC-1 prepared as described in Part A of Example 10 of U.S. Pat. No. 6,113,814. A Varian Cary 4000 UV-Visible spectrophotometer was used with the following values in the method (unless otherwise noted): range=800-275 nm; ave. time.=0.100 s; data interval=1.100; and scan rate=660 nm/min. A simple average of the absorption values between 340 and 380 nm was determined to be 4.6. The first unactivated terminal minimum absorbance wavelength, determined as described herein for FIG. 3, was determined to be 422±2 nm.

PC-2, is an indenonaphthopyran which was prepared according to the procedures of U.S. Patent Publication 2006/0228557, which disclosure is incorporated herein by reference, and which upon exposure to ultraviolet light (UV) demonstrated an activated purplish red color. A UV spectrum was obtained on a photochromic test square containing PC-2 following the procedure done for PC-1. The average of the absorption values between 340 and 380 nm was determined to be 2.2. The first unactivated terminal minimum absorbance wavelength was determined to be 430±2 nm.

PC-3 is an indenonaphthopyran which was, prepared according to the procedures of U.S. Patent Publication 2011/0042629, which disclosure is incorporated herein by reference, and which upon exposure to ultraviolet light (UV) demonstrated an activated yellowish brown color. A UV spectrum was obtained on a photochromic test square containing PC-3 following the procedure done for PC-1 except that ½ of the amount of photochromic compound was used. The average of the absorption values between 340 and 380 nm was determined to be 3.5. The first unactivated terminal minimum absorbance wavelength was determined to be 425±2 nm.

The combination of PC-1, PC-2 and PC-3 in the primer produced an activated gray color. The unactivated absorption spectrum of the primer is shown as graph 23 of FIG. 1. The absorption spectrum of graph 23 was prepared from the photochromic containing PLF described above coated onto a substrate and determined using a Varian Cary 4000 UV-Visible spectrophotometer with the following values: range=800-275 nm; ave. time.=0.100 s; data interval=1.100; and scan rate=660 nm/min. The substrate (a finished single vision 6 base lens 70 mm in diameter made of CR-39® monomer (FSVL)) that was prepared as described in Part 5 and was coated only with the PLF and heated for 1 hour at 125° C. and then 105° C. for 3 hours. PLF without photochromic compounds was prepared for use in Examples 1 and 2 and Comparative Examples 1 and 2.

Part 2—Preparation of LCAF

A solution of a photoalignment material of the type described in U.S. patent application Ser. No. 12/959,467 filed on Dec. 3, 2010, which application is incorporated herein by reference, was prepared by adding 6 weight percent of the photoalignment material to cyclopentanone, based on the total weight of the solution. Also included were a purple dye at a level of about 0.02 weight percent, and a bluish-purple dye at a level of about 0.04 weight percent, both based on the total solution weight of the photoalignment material.

Part 3—Preparation of the CLF

The liquid crystal monomers (LCM) materials in the CLF were prepared as follows:

LCM-1 is 1-(6-(6-(6-(6-(6-(6-(6-(6-(8-(4-(4-(4-(8-acryloyloxyhexylloxy)benzoyloxy)phenyloxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexan-1-ol which was prepared according to the procedures described in Example 17 of U.S. Pat. No. 7,910,019, which liquid crystal monomer disclosure is incorporated herein by reference.

LCM-2 is commercially available RM257 reported to be 4-(3-acryloyloxypropyloxy)-benzoic acid 2-methyl-1,4-phenylene ester, available from EMD Chemicals, Inc., having the molecular formula of $C_{33}H_{32}O_{10}$.

LCM-3 1-(6-(4-(4-(trans-4-pentylcyclohexyl)phenoxycarbonyl)phenoxy)hexyloxy)-2-methylprop-2-en-1-one prepared according to the procedure of Example 1 in U.S. Pat. No. 7,910,019, except that n=0, which disclosure is incorporated herein by reference.

LCM-4 is 1-(6-(6-(6-(6-(6-(6-(6-(8-(4-(4-(4-hexyloxybenzoyloxy)phenoxycarbonyl)-phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one prepared according to the procedures of U.S. Pat. No. 7,910,019, which disclosure is incorporated herein by reference.

CLF was prepared as follows:

To a suitable flask containing a mixture of anisole (3.99 g) and BYK®-322 additive 0.004 g, reported to be an aralkyl modified poly-methyl-alkyl-siloxane available from BYK Chemie, USA), was added LCM-1 (1.08 g), LCM-2 (2.4 g), LCM-3 (1.08 g), LCM-4 (1.44 g), 4-methoxyphenol (0.006 g), and IRGACURE® 819 (0.09 g, a photoinitiator available from Ciba-Geigy Corporation). The resulting mixture containing 60 weight percent monomer solids, based on the total weight of the mixture, was stirred for 2 hours at 80° C. and cooled to about 26° C. A mixture of photochromic/dichroic dyes that produced an activated gray color included the following:

PC-4 is an indenonaphthopyran which was prepared according to the procedures of U.S. Patent Publication 2011/0129678, which disclosure is incorporated herein by reference, which upon exposure to ultraviolet light (UV) demonstrated an activated blue-green color and was used at a level of about 15 percent of the total dye amount. A UV spectrum was obtained on a photochromic test square containing PC-4 following the procedure done for PC-1. The average of the absorption values between 340 and 380 nm was determined to be 4.9. The first unactivated terminal minimum absorbance wavelength was determined to be 415±2 nm.

PC-5 is an indenonaphthopyran which was prepared according to the procedures of U.S. Patent Publication 2011/0129678, which disclosure is incorporated herein by reference, which upon exposure to ultraviolet light (UV) demonstrated an activated blue color and was used at a level of about 25 percent of the total dye amount. A UV spectrum was obtained on a photochromic test square containing PC-5 following the procedure done for PC-1. The average of the absorption values between 340 and 380 nm was determined to be 4.4. The first unactivated terminal minimum absorbance wavelength was determined to be 415±2 nm.

PC-6 is an indenonaphthopyran which was prepared according to the procedures of U.S. Patent Publication 2011/0129678, which disclosure is incorporated herein by reference, which upon exposure to ultraviolet light (UV) demonstrated an activated blue color and was used at a level of about 27 percent of the total dye amount. A UV spectrum was obtained on a photochromic test square containing PC-6 following the procedure done for PC-1. The average of the absorption values between 340 and 380 nm was determined to be 4.9. The first unactivated terminal minimum absorbance wavelength was determined to be 424±2 nm.

PC-7 is an indenonaphthopyran which was prepared according to the procedures of U.S. Patent Publication 2011/0143141, which disclosure is incorporated herein by reference, which upon exposure to ultraviolet light (UV) demonstrated an activated yellow color and was used at a level of about 23 percent of the total dye amount. A UV spectrum was obtained on a photochromic test square containing PC-7 following the procedure done for PC-1. The average of the absorption values between 340 and 380 nm was determined to be 4.4. The first unactivated terminal minimum absorbance wavelength was determined to be 415±2 nm.

PC-8 is an indenonaphthopyran which was prepared according to the procedures of U.S. Patent Publication 2011/0143141, which disclosure is incorporated herein by reference, which upon exposure to ultraviolet light (UV) demonstrated an activated blue color and was used at a level of about 10 percent of the total dye amount. A UV spectrum was obtained on a photochromic test square containing PC-8 following the procedure done for PC-1. The average of the absorption values between 340 and 380 nm was determined to be 4.3. The first unactivated terminal minimum absorbance wavelength was determined to be 415±2 nm.

The photochromic compounds PC-4, 5, 6, 7 and 8 were added to the CLF solutions of Example 1 and 3 and Comparative Examples 1 and 3 at a total level of 13 weight percent and to Examples 2 and 4 and CE 2 and 4 at a level of 6.5 weight percent, all based on the total weight of the solution. The unactivated absorption spectrum for the CLF containing 6.5 weight percent photochromic compounds is included as graph 32 of FIG. 1. The spectrum was prepared using the same spectrophotometer and procedure described for the preparation of graph 23 of FIG. 1. The FSVL substrate was prepared as described in Part 5 and coated with the LCAF which was at least partially aligned prior to application of the CLF, all done as described in the Coating Procedures for the Liquid Crystal Alignment Layer and Coating Layer of Part 5.

Part 4: Preparation of the TLF

The TLF was prepared as follows:

In a 50 mL amber glass bottle equipped with a magnetic stir-bar following materials were added:

Hydroxy methacrylate (1.242 g) from Sigma-Aldrich;
Neopentyl glycol diacrylate (13.7175 g) SR247 from Sartomer;
Trimethylolpropane trimethacrylate (2.5825 g) SR350 from Sartomer;
DESMODUR® PL 340 (5.02 g) from Bayer Material Science;
IRGACURE®-819 (0.0628 g) from Ciba Speciality Chemicals;
DAROCUR® TPO (0.0628 g; from Ciba Speciality Chemicals,
Polybutyl acrylate (0.125 g),
3-Aminopropylpropyltrimethoxysilane (1.4570 g) A-1100 from Momentive Performance Materials; and 200 proof absolute anhydrous Ethanol (1.4570 g) from Pharmaco-Aaper.

The mixture was stirred at room temperature for 2 hrs. To the TLF used for Examples 1 to 4, PC-9 was added at a level of 1 weight percent, based on the total solution weight. PC-9 is a 2H-naphthopyran compound which was prepared according to the procedures of U.S. Pat. No. 5,458,814, which patent is incorporated herein by reference, and which upon exposure to ultraviolet light (UV) demonstrated an activated red color. A UV spectrum was obtained on a photochromic test square containing PC-9 following the procedure done for PC-1 except that a Varian Cary 300 was used at the following settings—range 700-275, avg. time 0.100s, data interval 1.100 and scan rate 450 nm/min. The average of the absorption values between 340 and 380 nm was determined to be 1.9. The first unactivated terminal minimum absorbance wavelength was determined to be 384±2 nm.

The unactivated absorption spectrum for the TLF containing 1.0 weight percent of a PC-9 is included as graph 41 of FIG. 1. The spectrum was prepared using the same spectrophotometer and procedure described for the preparation of graph 23 of FIG. 1. The FSVL substrate was prepared as described in Part 5 and coated only with the TLF using the Coating Procedure for the Topcoat Layer of Part 5.

Part 5:—Procedures Used for Preparing the Substrate and Coating Stacks Reported in Table 1

Substrate Preparation

Finished single vision lenses (6 base, 70 mm) prepared from CR-39® monomer were used as substrates. Each substrate was cleaned by wiping with a tissue soaked with acetone and dried with a stream of air and corona treated by passing on a conveyor belt in Tantec EST Systems Serial No. 020270 Power Generator HV 2000 series corona treatment equipment with a high voltage transformer. The substrates were exposed to corona generated by 53.99 KV, 500 Watts while traveling on a conveyor at a belt speed 3 ft/min.

Coating Procedure for the Primer Layer

The PLF was applied to the test substrates by spin-coating on a portion of the surface of the test substrate by dispensing approximately 1.5 mL of the solution. A spin processor from Laurell Technologies Corp. (WS-400B-6NPP/LITE) was used for spin coating the substrates at 976 revolutions per minute (rpm) for 4 seconds, followed by 1501 rpm for 2 seconds, followed by 2500 rpm for 1 second. Afterwards, the coated substrates were placed in an oven maintained at 125° C. for 60 minutes. The coated substrates were cooled to about 26° C. The substrate was corona treated by passing on a conveyor belt in Tantec EST Systems Serial No. 020270 Power Generator HV 2000 series corona treatment equipment with a high voltage transformer. The dried primer layers were exposed to corona generated by 53.00 KV, 500 Watts while traveling on a conveyor at a belt speed 3 ft/min.

Coating Procedure for the Liquid Crystal Alignment Layer

The LCAF was applied to the test substrates by spin-coating on a portion of the surface of the test substrate by dispensing approximately 1.0 mL of the solution and spinning the substrates at 800 revolutions per minute (rpm) for 3 seconds, followed by 1,000 rpm for 7 seconds, followed by 2,500 rpm for 4 seconds. A spin processor from Laurell Technologies Corp. (WS-4006-6NPP/LITE) was used for spin coating. Afterwards, the coated substrates were placed in an oven maintained at 120° C. for 30 minutes. The coated substrates were cooled to about 26° C.

The dried photoalignment layer on each of the substrates was at least partially ordered by exposure to linearly polarized ultraviolet radiation. The light source was oriented such that the radiation was linearly polarized in a plane perpendicular to the surface of the substrate. The amount of ultraviolet radiation that each photoalignment layer was exposed to was measured using a UV Power Puck™ High energy radiometer from EIT Inc (Serial No. 2066) and was as follows: UVA 0.018 W/cm2 and 5.361 J/cm2; UVB 0 W/cm2 and 0 J/cm2; UVC 0 W/cm2 and 0 J/cm2; and UVV 0.005 W/cm2 and 1.541 J/cm2. After ordering at least a portion of the photoorientable polymer network, the substrates were cooled to about 26° C. and kept covered.

Coating Procedure for the Coating Layer

The CLF was spin coated at a rate of 400 revolutions per minute (rpm) for 6 seconds, followed by 800 rpm for 6 seconds onto the at least partially ordered photoalignment materials on the test substrates. Each coated substrate was placed in an oven at 60° C. for 30 minutes. Afterwards they were cured under two ultraviolet lamps in the UV Curing Oven Machine designed and built by Belcan Engineering in nitrogen atmosphere while running on a conveyor belt at 2 ft/min speed at peak intensity of 0.388 Watts/cm2 of UVA and 0.165 Watts/cm2 of UVV and UV dosage of 7.386 Joules/cm2 of UVA and 3.337 Joules/cm2 of UVV. If the coated substrate was going to receive a topcoat layer the cured layer was exposed to corona generated by 53.00 KV, 500 Watts while traveling on a conveyor at a belt speed 3 ft/min. If the coated substrate was not going to receive a topcoat layer, the post curing was completed at 105° C. for 3 hours.

Coating Procedure for the Topcoat Layer

The TLF was spin coated at a rate of 1,400 revolutions per minute (rpm) for 7 seconds onto the cured CLF coated substrates. Afterwards the substrates were cured under two ultraviolet lamps in the UV Curing Oven Machine designed and built by Belcan Engineering in nitrogen atmosphere while running on a conveyor belt at 6 ft/min speed at peak intensity of 1.887 Watts/cm2 of UVA and 0.694 Watts/cm2 of UVV and UV dosage of 4.699 Joules/cm2 of UVA and 1.787 Joules/cm2 of UVV. Post curing was completed at 105° C. for 3 hours.

Part 6—Photochromic Performance Tests Including Absorption Ratio and Optical Response Measurements Prior to response testing on an optical bench, the substrates were conditioned by exposing them to 365 nm ultraviolet light for 10 minutes at a distance of about 14 cm from the source in order to pre-activate the photochromic molecules. The UVA irradiance at the sample was measured with a Licor Model Li-1800 spectroradiometer and found to be 22.2 Watts per square meter. The samples were then placed under a high intensity halogen lamp (500 W, 120 V) for about 10 minutes at a distance of about 36 cm from the lamp in order to bleach, or inactivate, the photochromic compound in the samples. The illuminance at the sample was measured with the Licor spectroradiometer and found to be 21.9 Klux. The samples were exposed to yellow fluorescent lamps for 30 minutes to provide further visible light bleaching. The samples were then kept in a dark environment for at least 1 hour prior to testing in order to cool and continue to fade back to a ground state.

An optical bench was used to measure the optical properties of the coated substrates and derive the absorption ratio and photochromic properties. Each test sample was placed on the optical bench with an activating light source (a Newport/Oriel Model 66485 300-Watt Xenon arc lamp fitted with a UNIBLITZ® VS-25 high-speed computer controlled shutter that momentarily closed during data collection so that stray light would not interfere with the data collection process, a SCHOTT® 3 mm KG-2 band-pass filter, which removed short wavelength radiation, neutral density filter(s) for intensity attenuation and a condensing lens for beam collimation)

positioned at a 30° to 35° angle of incidence to the surface of the test sample. The arc lamp was equipped with a light intensity controller (Newport/Oriel model 68950).

A broadband light source for monitoring response measurements was positioned in a perpendicular manner to a surface of the test sample. Increased signal of shorter visible wavelengths was obtained by collecting and combining separately filtered light from a 100-Watt tungsten halogen lamp (controlled by a constant voltage powder supply) with a split-end, bifurcated fiber optical cable. Light from one side of the tungsten halogen lamp was filtered with a SCHOTT® KG1 filter to absorb heat and a HOYA® B-440 filter to allow passage of the shorter wavelengths. The other side of the light was either filtered with a SCHOTT® KG1 filter or unfiltered. The light was collected by focusing light from each side of the lamp onto a separate end of the split-end, bifurcated fiber optic cable, and subsequently combined into one light source emerging from the single end of the cable. A 4" or 6" light pipe was attached to the single end of the cable to insure proper mixing. The broad band light source was fitted with a UNIBLITZ® VS-25 high-speed computer controlled shutter that momentarily opened during data collection.

Polarization of the light source was achieved by passing the light from the single end of the cable through a Moxtek, PROFLUX® Polarizer held in a computer driven, motorized rotation stage (Model M-061-PD from Polytech, PI or equivalent). The monitoring beam was set so that the one polarization plane)(0°) was perpendicular to the plane of the optical bench table and the second polarization plane)(90°) was parallel to the plane of the optical bench table. The samples were run in air, at 23° C.±0.1° C. maintained by a temperature controlled air cell.

To align each sample, a second polarizer was added to the optical path. The second polarizer was set to 90° of the first polarizer. The sample was placed in an air cell in a self-centering holder mounted on a rotation stage. A laser beam (Coherent—ULN 635 diode laser) was directed through the crossed polarizers and sample. The sample was rotated (in 3° steps as coarse moves and in 0.1° steps as fine moves) to find the minimum transmission. At this point the sample was aligned either parallel or perpendicular to the Moxtek polarizer and the second polarizer as well as the diode laser beam was removed from the optical path. The sample was aligned within ±0.5° prior to any activation.

To conduct the measurements, each test sample was exposed to 6.7 W/m$^2$ of UVA from the activating light source for 10 to 20 minutes to activate the photochromic compound. An International Light Research Radiometer (Model IL-1700) with a detector system (Model SED033 detector, B Filter, and diffuser) was used to verify exposure at the beginning of each day. Light from the monitoring source that was polarized to the 0° polarization plane was then passed through the coated sample and focused into a 1" integrating sphere, which was connected to an OCEAN OPTICS® S2000 spectrophotometer or equivalent using a single function fiber optic cable. The spectral information, after passing through the sample, was collected using OCEAN OPTICS® OOIBase32 and OOIColor software, and PPG propriety software. While the photochromic material was activated, the position of the polarizing sheet was rotated back and forth to polarize the light from the monitoring light source to the 90° polarization plane and back. Data was collected for approximately 600 to 1200 seconds at 5-second intervals during activation. For each test, rotation of the polarizers was adjusted to collect data in the following sequence of polarization planes: 0°, 90°, 90°, 0°, etc.

Absorption spectra were obtained and analyzed for each test sample using the Igor Pro software (available from WaveMetrics). The change in the absorbance in each polarization direction for each test sample was calculated by subtracting out the 0 time (i.e., unactivated) absorption measurement for the samples at each wavelength tested. Average absorbance values were obtained in the region of the activation profile where the photochromic response of the photochromic compound was saturated or nearly saturated (i.e., the regions where the measured absorbance did not increase or did not increase significantly over time) for each sample by averaging absorbance at each time interval in this region. The average absorbance values in a predetermined range of wavelengths corresponding $\lambda_{max-vis}$+/−5 nm were extracted for the 0° and 90° polarizations, and the absorption ratio for each wavelength in this range was calculated by dividing the larger average absorbance by the small average absorbance. For each wavelength extracted, 5 to 100 data points were averaged. The average absorption ratio for the photochromic compound was then calculated by averaging these individual absorption ratios.

Change in optical density (ΔOD) from the bleached state to the darkened state was determined by establishing the initial transmittance, opening the shutter from the xenon lamp to provide ultraviolet radiation to change the test lens from the bleached state to an activated (i.e., darkened) state. Data was collected at selected intervals of time, measuring the transmittance in the activated state, and calculating the change in optical density according to the formula: ΔOD=log(% Tb/% Ta), where % Tb is the percent transmittance in the bleached state, % Ta is the percent transmittance in the activated state and the logarithm is to the base 10. Measurements were made at a weighted wavelength range corresponding to CIE Y, described in CIE Technical Report, Colorimetry, CIE 15:2004, 3$^{rd}$ Edition, published by the Commission Internationale De L'Eclairage, Vienna, Austria, which publication is incorporated herein by reference.

The fade half life (T½) is the time interval in seconds for the ΔOD of the activated form of the photochromic compounds in the test samples to reach one half the ΔOD measured after fifteen minutes, or after saturation or near-saturation was achieved, at room temperature after removal of the source of activating light, e.g., by closing the shutter. The results for Examples 1-4 and CE 1-4 are listed in Table 1. For Example 1-4, the ΔOD of each was greater than that for CE 1-4 and the % Transmission of the activated substrate (% Ta) was less than that for CE 1-4, as desired. The presence of the photochromic compounds in both the primer layer and topcoat layer in Examples 3 and 4 demonstrated a greater ΔOD and lesser % Ta than the Examples 1 and 2 and as well as the CE 1-4. An "X" in the columns of Table 1 indicates the presence of photochromic compounds in the Primer and/or Topcoat layer.

TABLE 1

Photochromic Performance and Absorption Ratios for the Coating Stacks of Examples 1-4 and CE 1-4

| Sample Identification | Primer Layer + PC Present | Coating Layer wt % PC | Topcoat Layer + PC Present | % Ta | Δ OD Photopic | T½ (sec) | AR |
|---|---|---|---|---|---|---|---|
| Example 1 | | 13 | X | 21.8 | 0.59 | 217 | 3.70 |
| CE-1 | | 13 | | 23.0 | 0.57 | 193 | 4.33 |
| Example 2 | | 6.5 | X | 31.2 | 0.45 | 139 | 3.43 |
| CE-2 | | 6.5 | | 32.2 | 0.43 | 125 | 4.11 |

TABLE 1-continued

Photochromic Performance and Absorption Ratios for the Coating Stacks of Examples 1-4 and CE 1-4

| Sample Identification | Primer Layer + PC Present | Coating Layer wt % PC | Topcoat Layer + PC Present | % Ta | Δ OD Photopic | T½ (sec) | AR |
|---|---|---|---|---|---|---|---|
| Example 3 | X | 13 | X | 14.5 | 0.76 | 235 | 2.72 |
| CE-3 | X | 13 | | 16.2 | 0.71 | 209 | 3.26 |
| EXAMPLE 4 | X | 6.5 | X | 13.4 | 0.81 | 204 | 1.97 |
| CE-4 | X | 6.5 | | 13.6 | 0.80 | 183 | 2.16 |

The present invention has been described with reference to specific details of particular embodiments thereof. It is not intended that such details be regarded as limitations upon the scope of the invention except insofar as and to the extent that they are included in the accompanying claims.

We claim:

1. A photochromic article comprising:
   a substrate;
   a primer layer comprising a first photochromic compound, said primer layer being positioned over said substrate, and said first photochromic compound having a first unactivated state absorbance of greater than 0 at all wavelengths from 340 nm to 380 nm, and a first unactivated state terminal minimum absorbance wavelength of greater than 380 nm; and
   a coating layer comprising a photochromic-dichroic compound, said coating layer being positioned over said primer layer, and said photochromic-dichroic compound having a second unactivated state absorbance of greater than 0 over at least a portion of wavelengths from 340 nm to 380 nm, and a second unactivated state terminal minimum absorbance wavelength of greater than 340 nm,
   wherein said second unactivated state terminal minimum absorbance wavelength is less than or equal to said first unactivated state terminal minimum absorbance wavelength.

2. The photochromic article of claim 1, wherein said second unactivated state terminal minimum absorbance wavelength is greater than 380 nm.

3. The photochromic article of claim 1, wherein said second unactivated state absorbance of greater than 0 is at all wavelengths from 340 nm to 380 nm, and said second unactivated state terminal minimum absorbance wavelength is greater than 380 nm.

4. The photochromic article of claim 1, wherein said first unactivated state terminal minimum absorbance wavelength is greater than 380 nm and less than or equal to 450 nm, and said second unactivated state terminal minimum absorbance wavelength is greater than 340 nm and less than or equal to 450 nm.

5. The photochromic article of claim 1, wherein said second unactivated state terminal minimum absorbance wavelength is less than said first unactivated state terminal minimum absorbance wavelength.

6. The photochromic article of claim 1, wherein said photochromic article has an unactivated state percent transmittance of less than 5% at all wavelengths from 340 nm to 380 nm.

7. The photochromic article of claim 1, wherein said primer layer further comprises an organic matrix comprising polyurethane linkages.

8. The photochromic article of claim 1, wherein said photochromic-dichroic compound is at least partially aligned.

9. The photochromic article of claim 1, wherein said photochromic-dichroic layer further comprises a phase-separated polymer comprising,
   a matrix phase that is at least partially ordered, and
   a guest phase that is at least partially ordered,
   wherein said guest phase comprises said photochromic-dichroic compound, and said photochromic-dichroic compound is at least partially aligned with at least a portion of said guest phase.

10. The photochromic article of claim 1, wherein said photochromic-dichroic layer further comprises an interpenetrating polymer network comprising,
    an anisotropic material that is at least partially ordered, and
    a polymeric material,
    wherein said anisotropic material comprises said photochromic-dichroic compound, and said photochromic-dichroic compound is at least partially aligned with at least a portion of said anisotropic material.

11. The photochromic article of claim 1, wherein said photochromic-dichroic layer further comprises at least one additive selected from dyes, alignment promoters, kinetic enhancing additives, photoinitiators, thermal initiators, polymerization inhibitors, solvents, light stabilizers, heat stabilizers, mold release agents, rheology control agents, leveling agents, free radical scavengers, and adhesion promoters.

12. The photochromic article of claim 1, wherein said photochromic-dichroic layer further comprises at least one dichroic material chosen from azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone and (poly)anthroquinones, anthropyrimidinones, iodine and iodates.

13. The photochromic article of claim 1, wherein said first photochromic compound and said photochromic-dichroic compound are each independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

14. The photochromic article of claim 1 further comprising an alignment layer interposed between said primer layer and said photochromic-dichroic layer, and said photochromic-dichroic compound is at least partially aligned.

15. The photochromic article of claim 1, wherein the substrate is selected from untinted substrates, tinted substrates, photochromic substrates, tinted-photochromic substrates, and linearly polarizing substrates.

16. The photochromic article of claim 1, wherein said photochromic article has an activated state optical density that is greater than a control activated state optical density of a control photochromic article comprising said substrate and said coating layer in the absence of said primer layer.

17. The photochromic article of claim 16, wherein said activated state optical density and said control activated state optical density are each determined from 410 nm to 800 nm.

18. The photochromic article of claim 1, wherein said photochromic-dichroic layer further comprises an anisotropic material.

19. The photochromic article of claim 18, wherein said anisotropic material comprises a liquid crystal material.

20. The photochromic article of claim 1 further comprising a topcoat layer comprising an ultraviolet light absorber, wherein said topcoat layer resides over said photochromic-dichroic layer.

21. The photochromic article of claim 20 further comprising a hard coat layer, wherein said hard coat layer resides over said topcoat layer.

22. The photochromic article of claim 1, wherein said photochromic article is selected from ophthalmic articles, display articles, windows, mirrors, and active liquid crystal cell articles, and passive liquid crystal cell articles.

23. The photochromic article of claim 22, wherein said photochromic article is selected from ophthalmic articles, and said ophthalmic articles are selected from corrective lenses, non-corrective lenses, contact lenses, intra-ocular lenses, magnifying lenses, protective lenses, and visors.

24. The photochromic article of claim 22, wherein said photochromic article is selected from display articles, and said display articles are selected from screens, monitors, and security elements.

25. A photochromic article comprising:
a substrate;
a primer layer comprising a first photochromic compound, said primer layer being positioned over said substrate, and said first photochromic compound having a first unactivated state absorbance of greater than 0 at all wavelengths from 340 nm to 380 nm, and a first unactivated state terminal minimum absorbance wavelength of greater than 380 nm; and
a coating layer comprising a photochromic-dichroic compound, said coating layer being positioned over said primer layer, and said photochromic-dichroic compound having a second unactivated state absorbance of greater than 0 over at least a portion of wavelengths from 340 nm to 380 nm, and a second unactivated state terminal minimum absorbance wavelength of greater than 340 nm,
a topcoat layer comprising a second photochromic compound, said topcoat layer being positioned over said photochromic-dichroic layer, and said second photochromic compound having a third unactivated state absorbance of greater than 0 over at least a portion of wavelengths from 330 nm to 380 nm, and a third unactivated state terminal minimum absorbance wavelength that is greater than 330 nm,
wherein said third unactivated state terminal minimum absorbance wavelength is less than said second unactivated state terminal minimum absorbance wavelength, and said second unactivated state terminal minimum absorbance wavelength is less than or equal to said first terminal minimum absorbance wavelength.

26. The photochromic article of claim 25, wherein said second unactivated state terminal minimum absorbance wavelength is greater than 380 nm.

27. The photochromic article of claim 25, wherein said second unactivated state absorbance of greater than 0 is at all wavelengths from 340 nm to 380 nm, and said second unactivated state terminal minimum absorbance wavelength is greater than 380 nm.

28. The photochromic article of claim 25, wherein said second unactivated state terminal minimum absorbance wavelength is less than said first unactivated state terminal minimum absorbance wavelength.

29. The photochromic article of claim 25, wherein said photochromic article has an unactivated state percent transmittance of less than 5% at all wavelengths from 340 nm to 380 nm.

30. The photochromic article of claim 25, wherein said first photochromic compound, said photochromic-dichroic compound, and said second photochromic compound are each independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

31. The photochromic article of claim 25, wherein said topcoat layer further comprises an ultraviolet light absorber.

32. The photochromic article of claim 25 wherein,
said first unactivated state terminal minimum absorbance wavelength is greater than 380 nm and less than or equal to 450 nm,
said second unactivated state terminal minimum absorbance wavelength is greater than 340 nm and less than or equal to 450 nm, and
said third unactivated state terminal minimum absorbance wavelength is greater than 330 nm and less than 380 nm.

33. The photochromic article of claim 32 wherein,
said third unactivated state absorbance is greater than 0 over at least a portion of wavelengths from 330 nm to less than 370 nm, and
said third unactivated state terminal minimum absorbance wavelength is greater than 330 nm and less than 370 nm.

* * * * *